(12) United States Patent
Kerr

(10) Patent No.: US 11,023,652 B2
(45) Date of Patent: Jun. 1, 2021

(54) PRESENTATION SYSTEM AND METHOD

(71) Applicant: SmartSuite Tech Inc., Portland, OR (US)

(72) Inventor: Aaron W. Kerr, Portland, OR (US)

(73) Assignee: SmartSuite Tech Inc., Portland, OR (US)

( * ) Notice: Subject to any disclaimer, the term of this patent is extended or adjusted under 35 U.S.C. 154(b) by 246 days.

(21) Appl. No.: 16/036,886

(22) Filed: Jul. 16, 2018

(65) Prior Publication Data
US 2020/0019588 A1      Jan. 16, 2020

(51) Int. Cl.
| | |
|---|---|
| *G06F 40/103* | (2020.01) |
| *G06F 3/0481* | (2013.01) |
| *G06F 3/0485* | (2013.01) |
| *G06F 3/0484* | (2013.01) |
| *G06F 40/169* | (2020.01) |

(52) U.S. Cl.
CPC .......... *G06F 40/103* (2020.01); *G06F 3/0485* (2013.01); *G06F 3/04817* (2013.01); *G06F 3/04842* (2013.01); *G06F 40/169* (2020.01); *G06F 2203/04805* (2013.01)

(58) Field of Classification Search
CPC .................................................. G06F 17/211
See application file for complete search history.

(56) References Cited

U.S. PATENT DOCUMENTS

| | | | | |
|---|---|---|---|---|
| 5,917,480 | A * | 6/1999 | Tafoya et al. ............. | G06T 1/00 |
| 8,977,965 | B1 * | 3/2015 | Ehlen et al. ............. | G06F 3/00 |
| 9,875,221 | B1 * | 1/2018 | VanBlon et al. ........ | G06F 17/30 |
| 2002/0140724 | A1 * | 10/2002 | Qureshi et al. ........ | H04N 5/222 |
| 2003/0160813 | A1 * | 8/2003 | Raju ......................... | G09G 5/00 |
| 2005/0193323 | A1 * | 9/2005 | Coulomb et al. ....... | G06F 17/24 |
| 2010/0077319 | A1 * | 3/2010 | Xu et al. .................. | G06F 3/01 |
| 2010/0114991 | A1 * | 5/2010 | Chaudhary et al. .... | G06F 17/30 |

(Continued)

OTHER PUBLICATIONS

Andrew Childress; How to Add Speaker Notes to PowerPoint in 60 Seconds, posted at business.tutsplus.com, © 2018 Envato Pty Ltd., [online], [site visited Dec. 12, 2018], published Jan. 27, 2017, 9 pages, available from Internet, <URL: https://business.tutsplus.com/tutorials/how-to-add-speaker-notes-to-powerpoint--cms-27976>.

(Continued)

*Primary Examiner* — James J Debrow
(74) *Attorney, Agent, or Firm* — Howard Russell

(57) ABSTRACT

Click-controllable, computer-enabled system for enabling of creating, editing, saving, and displaying of speaker notes pages adaptable for use by a plurality of different speakers, each speaker having differing eyesight capabilities for viewing relatively smaller text, comprising: a speaker notes pages editing subsystem for enabling editing, preferably previewing, and saving of the font size and/or font color of a less-than-complete portion of speaker notes, and a speaker notes pages presentation subsystem, for click advancement and recession access by a speaker during a presentation to provide for more than a single page of speaker notes per slide, each click-accessible speaker notes page being associated with a corresponding presentation slide and/or a corresponding animation/build, if any, each click by a user advancing to one or more of, one of a plurality of next speaker notes pages for a given slide, a new associated slide and/or an animation/build.

18 Claims, 28 Drawing Sheets

(56) References Cited

U.S. PATENT DOCUMENTS

2015/0199308 A1\* 7/2015 Cooper et al. ...... G06F 17/2247
2015/0378995 A1\* 12/2015 Brown et al. ........... G06F 17/30
2019/0158586 A1\* 5/2019 Anders et al. ........ G06F 3/0483

OTHER PUBLICATIONS

Bettercloud Monitor, How to Use Speaker Notes in Google Slides, posted at bettercloud.com, Copyright © 2018 BetterCloud Monitor, [online], [site visited Nov. 14, 2018], published Jan. 17, 2017, 5 pages, available from Internet, <URL: https://www.bettercloud.com/monitor/the-academy/use-speaker-notes-google-slides/>.

Andrew Childress, How to Add Presenter Notes in Keynote in 60 Seconds, posted at business.tutsplus.com, © 2018 Envato Pty Ltd., [online], [site visited Dec. 12, 2018], published Jun. 14, 2018, 13 pages, available from Internet, <URL: https://business.tutsplus.com/tutorials/add-presenter-notes-in-keynote--cms-31190>.

\* cited by examiner

PRESENTATION SYSTEM AND METHOD

FIELD OF THE INVENTION

The present invention relates in general to slides and speaker notes presentation systems and software methods for speakers, otherwise referred to herein as presenters, to speak and present to audiences, and more particularly to a system and method for creating, editing, saving, formatting, previewing, displaying, using, laying out, and presenting of speaker notes pages together as a plug-in with, or as an integrated part of, a slide creating, editing, and presenting system.

BACKGROUND OF THE INVENTION

There are known popular presentation systems and software, such as Microsoft's PowerPoint® presentation system typically used in Windows environments, Apple's Keynote® presentation system for Mac and iOS environments, or Google's Slides presentation system for use with a web interface. The foregoing presentation software makers also provide versions of their presentation applications which are usable on mobile devices, and in some cases which are also usable in other, less-typically-used, environments. Thus, for example, Microsoft PowerPoint is available in an iOS environment.

Reference is now made to prior-art related systems and methods for presentation and display of slides and speaker notes, examples of which are shown in FIGS. 1-3 and 6, and referring to prior-art editing and a printout of speaker notes, examples of which are shown in FIGS. 4 and 5. Prior-art speaker notes creation, formatting and display systems and methods on the market today have been more difficult to use than necessary, and they have lacked more user-friendly "what-you-see-is-what-you-get" (WYSIWYG) type preview, edit, display and print features as these relate to speaker notes creation and display.

Currently, while it has been possible to highlight certain speaker notes text, users of the aforementioned presentation system software also have not been given the capability to have changed the font color of the speaker notes from black and white at all. This has been an important limitation, since such would have allowed different, multiple, speakers on the same presentation to have used different colors of fonts in order to have been able to have easily identified who was to have been speaking.

But perhaps most importantly, prior art slides and speaker notes presentation systems have had a very cumbersome and hard-to-use feature, relative to a fundamental architecture and data structure of such prior-art systems, in that speakers have had to manually scroll through essentially one long speaker notes page for each slide. This has made it so that speakers have not been easily able to tell how long their speaker notes have been for a particular slide, and it has also made it so that using such prior-art software for presenting in a venue to audiences as shown and illustrated herein has been made more stressful and difficult.

As an example of the extra keystrokes needed to accomplish some limited types of edits to speaker notes available to speakers in edit mode, with a version of Microsoft's PowerPoint presentation application, in order to have increased the font size of the speaker notes for just some of the slides (i.e., so that one or more speakers would have been able to have read the speaker notes easily on a speaker notes monitor during the presentation), or to have added highlighting of certain words of the speaker notes for a presentation (i.e., for another speaker co-presenter), the speaker, or an assistant setting up the presentation, has had to take the following extra steps:

1) accessed the edit mode feature of the application—which mode, incidentally, is not the same mode as is used by speakers or their assistants during presentations;
2) clicked on "view";
3) clicked on "outline view";
4) clicked on "notes";
5) right clicked on the pane that contains the thumbnail images of the slide desired for editing (or clicked directly on a thumbnail of the slide desired for editing);
6) clicked "show text formatting";
7) made the desired edits; and
8) re-saved the file.

All of this additional effort has been expended many times for many presentations by presenters, or their assistants, for example in edit mode of PowerPoint in order to have been able to have formatted the speaker notes in these ways to accommodate last minute requests by speakers. Note that the foregoing described prior-art method is not user friendly and has not easily provided a way that the speaker, or assistant, could have made and saved for later reference last-minute edits right on the spot. Thus, for example, it is known that once PowerPoint has been closed after enlargement of text has been accomplished, for example during showmode, or presentation mode, such enlargement edits have not been saved, and such enlargement edits would have been lost, unless the more lengthy procedure described had been followed. This fact, in turn, has made it more difficult for speakers, and their assistants to make last-minute edits, or configurations, to speaker notes—especially considering that a final draft of the speaker notes may have still been awaited from another speaker.

And while there have been some limited presentation mode edits able to have been made, namely having enlarged all speaker note text for a given presentation, or highlighting some speaker note text, this limited functionality of prior art systems has not allowed the more robust editing demanded by common situations encountered by speakers and their assistants, namely the ability to easily enlarge just some of the speaker notes. Multiply the effort described above by the average number of times this has happened for each presentation, and then by the total number of presentations that have been given, and this has led to very large numbers of hours spent editing and re-editing presentation speaker notes.

In rushed, high-emotional-pressure-filled, environments, where new presentation equipment perhaps unfamiliar to the speaker or assistant has been used, this extra effort has been repeated many times, and has led to greatly increased stress for speakers, and their assistants, often right before the show has had to go on before sometimes thousands of audience members. Thus, there really has been needed for years an improved system and method of easily implementing and saving last-minute speaker notes changes in a way that easily allows different font-sizes and colors for different speakers having different eyesight capabilities for reading smaller speaker notes text. Further, such an improved system has been needed for years which fundamentally alters the need for speakers to scroll through a long page of speaker notes.

Assuming a speaker had been even able to have accomplished such an increase in the font size of the speaker notes by following the many steps described above in an edit mode and re-saved presentation file, perhaps even having saved the speaker notes in a separate file, certainly this has not been user friendly and has not allowed for last-minute easy changes to the file by other speakers. Thus, for example, to have attempted to alleviate this very difficult situation of accommodating last-minute, and sorely-needed speaker notes font-size changes, there has actually developed a common practice among speakers, and their assistants, to have created two separate presentation files, wherein a first such file has been comprised of the substantive slides content to have been shown to the audience and on a speaker viewable confidence monitor, and wherein the second such file has been comprised only of the speaker notes re-typed into slides format, and in a separate file, requiring a separate computer for running the show for a separate monitor. In such a case, as illustrated with a slide show version of speaker notes 38 shown on a separate monitor 37 in FIG. 3, the two different presentation files have had different sets of graphics with different aspect ratios, etc., and undoubtedly many thousands of dollars have been spent for back-stage assistants to create such accommodation files for enabling speakers having differing eyesight and speaker notes characteristics preferences.

This resolution has had the drawback that it has been inefficient, but perhaps more importantly this resolution has been difficult to make sure that the two separate presentation files on two separate computers (with backups for each) have always been in sync for the speaker. Thus, responsive to the difficulty of this resolution, there has developed a practice of having employed an additional back-stage assistant for verifying that the slides and notes presentation files (i.e., two different slide shows) have been in sync. This has been necessary so that the speaker would not have lost his or her place in the notes and presentation slides while giving the presentation. In other words, this has not been an effective or efficient solution because it has still been very confusing to speakers and their assistants to try and keep straight what slide the speaker should have been on given the speaker notes presented.

And this situation has been exacerbated by the stress of speaking generally, attempting to keep everything, the presentation, the slides, and the speaker notes, all in sync (including the addition of two back-up computers—for a total of four computers to operate the presentation—one each for the original and backup presentation slides, and one each for the original and backup speaker notes files in a separate slide show presentation) so that the speaker's presentation hasn't become mixed up. And this, in turn, has put a lot of stress on back-stage assistants, thus oftentimes requiring an additional back-stage assistant referred to above operating another speaker notes monitor, again, just to keep the slides and speaker notes in sync.

Thus, such a dual file work-around has not been easily usable, and it has added to the stress of presentations, since the person operating the speaker notes monitor has had to manually ensure that the speaker notes and the slides have been in sync, or properly correlated, throughout the presentation. The complexity of such need for correlation may be summed up with a table as follows:

| Speaker Slides & Notes | Assistant 1 (listens to speaker) Slides | Assistant 1 (listens to speaker) Speaker Notes | Assistant 2 Backup Slides (stays synced with Asst. 1) | Assistant 2 Backup Speaker Notes stays synced with Asst. 1) |
|---|---|---|---|---|
| Slide 1 - Click to cue back stage | Slide 1 - Click | Notes 1 - Auto | Slide 1 - Click | Notes 1 - Auto |
|  |  | Notes 1 - Manual Scroll |  | Notes 1 - Manual Scroll |
| Animation Click to cue back stage | Anim. 1 - Click | Notes 1 - Manual Scroll | Anim. 1 - Click | Notes 1 - Manual Scroll |
| Slide 2 - Click to cue back stage | Slide 2 - Click | Notes 2 - Auto | Slide 2 - Click | Notes 2 - Auto |
|  |  | Notes 2 - Manual Scroll |  | Notes 2 - Manual Scroll |
| Etc . . . | Etc . . . | Etc . . . | Etc . . . | Etc . . . |

As a result, when the decision to employ an extra assistant to help make sure the systems have stayed in sync hasn't worked, there have been many times where speakers have, at the last minute, just decided to go ahead and make their presentations without their speaker notes, which in some cases has led to very poor presentations. Thus, these problems with the current system have led to additional stress around presentations and shows and have also led to lower-quality presentations and shows.

But what if a speaker's assistant had already set up a presentation file, maybe even for the second or third time, only to have had the speaker decide for yet another last-minute change? Indeed, this has happened, and perhaps even more common is the situation where the speaker has come into the venue and has said, 20 minutes before the presentation, "Here are my speaker notes. Can you please integrate these into the presentation with the other speaker?" As will be appreciated from the foregoing explanation, this seemingly simple request would actually have required the assistant to re-open the edit mode of the presentation, and to have gone through all the steps described above, again—requiring the assistant to have re-entered previous edits to the speaker notes made in any prior presentation mode edits. This has had to be done while another speaker has been making last-minute edits to that speaker's slides and notes, and even having done all of the foregoing, the final output by prior-art systems still hasn't been easy to use by speakers.

While it has been possible in the past to edit in presentation mode the text size of all speaker notes at once associated with a presentation, this has not been possible for the text size of just some of the speaker notes, e.g., for just a few of the slides of the overall presentation for one of the co-presenters. Further, note that editing the size of all the speaker note text in a presentation mode, or showmode, hasn't actually involved saving the edited text with a larger font size in the sense of a font size that a person can articulate easily, e.g., 12-point, or 24-point, but rather the speaker has had to tell the back-stage assistant to make the speaker notes 2, or 3, etc., sizes, or clicks, bigger to make them big enough to see. And since the notes have changed size since the speaker last saw them (for example causing different paragraph layouts), it has been very difficult for speakers to have known where they were in their notes—leading to the speaker having become lost in the middle of a presentation. What this has meant in terms of presentation mode accommodations is that each speaker has needed to change the size of their speaker notes when it has been their turn to speak, whereas the next speaker has often had to change the size back to the originally-desired size for that next speaker—leading to stress, confusion, and sometimes poor presentations by requiring additional steps by a speaker, or the speaker's assistant, before the speaker has even begun speaking.

And more importantly, even when the text size of all the speaker notes have been changed, such changes many times have not been able to be saved for subsequent presentations, especially if the presentation system program has been closed. Rather, the speaker, or the speaker's assistant, has had to re-setup the presentation at each new venue when changes have been made in presentation mode. Thus, in sum, any time the speaker, or the speaker's assistant, has closed the presentation mode of the presentation, the presentation mode edits to the speaker notes, limited as these edits have been, they have been lost. Thus, the speaker has never really known how many clicks bigger to tell the assistant to make the speakers notes (because there has been no reference size—just small-sized). This, of course, has wasted time, effort and money for speakers and their companies over the course of multiple presentations.

And again, exacerbating the problem of the need for differently-sized speaker notes, is the fact that the speaker notes have needed to have been scrolled by the speaker, or the speaker's assistant, to date. This has led to the problem that it has been difficult for a speaker to gauge how many notes there have been prepared for any given slide, and this has also led to difficulty in making presentations. For example, if after going through the long series of steps described above for enlarging the speaker notes to say a significantly larger type, in order to be large enough to be readily visible and usable by the speaker during the presentation, this has led to an even-longer screen of scrollable notes which have required the speaker, or the speaker's assistant, to have actively moused to the correct location on the notes while trying to speak to an audience. Or, in a totally scripted speech, this has required an operator for a speaker notes monitor, as described above, to manage movement of the notes while listening to the speaker to be sure that the speaker and the speaker notes have remained in sync.

The aforementioned issues have been most poignant and difficult to surmount in larger show or presentation venues, where the speaker has not been able to have a computer screen on a table right in front of the speaker as might be the case in a smaller venue, and where the speaker is out on a stage with just a slide advance or recession (move back) clicker or remote. In such larger venues, the speaker is out on a stage often with 10 to 20 feet, or more, between the speaker and a confidence monitor, or a speaker-notes monitor. In such settings, the speaker has had to rely on one or more back-stage assistants to change slides and speaker notes.

Therefore, further exacerbating the aforementioned problems have been the fact of miscommunications which have occasionally taken place between the speaker and the speaker's back-stage assistant. This, for example, has happened if the speaker has accidentally hit a slide advance button, without having had access (via excessive scrolling) to all of the speaker notes available for the previous slide, and this has resulted in the speaker having accidentally missed seeing all of the speaker notes. This miscommunication problem has happened quite frequently as a result of the limitations of current, prior-art, systems, and such miscommunications have led to a large number of speaker upsets. Furthermore, back-stage speaker assistants have been somewhat powerless to have done anything about such miscommunications, since the speaker has been onstage, and therefore the speaker has been somewhat out of communication with the speaker's assistant, such that speakers' assistants have been left to wonder whether the speaker hadn't wanted to talk about the rest of the slide as the speaker's assistant has advanced to the next slide.

This state of the prior art, of course, has not been conducive to an efficient editing, formatting, management or display of speaker notes, and therefore the prior art has created an ineffective management of speaker notes scenario in the past, and thus a more effective system of managing development, formatting, editing, previewing, and management of speaker notes is needed. Thus, there would be appreciated a speaker notes creating, editing, saving, formatting and display system which would have allowed a user to easily create, manipulate the text or font size of, and format, the text of the speaker notes, and which also would have enabled a user to have saved and combined the resulting speaker notes, into an easy to see, preview, and use fashion, while also allowing the speaker to have easily operated the speaker notes for display purposes to the speaker during the presentation.

SUMMARY OF THE INVENTION

In accordance with an aspect of the invention, there is provided a plug-in-type software module, whether on media such as a thumb-drive, or a downloadable executable file, comprising a plug-in-type, click-cyclable, computer-enabled system for enabling of creating, editing, saving, and displaying of speaker notes pages, otherwise known herein in accordance with one or more aspects of the invention, as the speaker notes pages plug-in-type system, and adapted to function together with a prior-art speaker notes and slides presentation system, otherwise known herein as the prior-art system, the combined prior-art system and speaker notes pages plug-in-type system, in accordance with this aspect of the invention, being adaptable for use by speakers during a presentation mode, otherwise referred to herein and known as showmode. The speaker notes pages plug-in-type system comprises: a speaker notes pages creation and editing subsystem adapted for enabling creating, editing, and saving of a plurality of speaker notes pages per slide for a presentation file.

The speaker notes pages plug-in-type system also comprises: a speaker notes pages presentation subsystem adapted for functioning together with the speaker notes pages creation and editing subsystem such that, together and as part of the combined prior-art system and speaker notes pages plug-in-type system, there is provided click advancement and reverse/recession access by a speaker during a presentation to more than a single page of speaker notes per slide, each click-accessible speaker notes page being associated with a corresponding presentation slide, each click by a user cycling to another speaker notes page for presentment for view by the speaker together with the slide associated with the another speaker notes page.

The plug-in-type speaker notes pages system portion associated with this aspect of the invention addresses and helps to resolve the issue in the slides and speaker notes presentation software industry of requiring speakers, or their assistants, to have to scroll a single long page of speaker notes. Thus, this aspect of the invention alleviates the problem that a speaker, or a speaker's assistant, has had to divert attention away from the presentation to try and stay in sync with the presentation by scrolling while speaking, or having had an extra assistant to do the same. Thus, formerly-experienced miscommunications, such as have been experienced upon an errant click by a speaker followed by a back-stage assistant against the speaker's actual wishes, may more-easily be avoided in the future with the present invention.

In accordance with another aspect of the invention, there is provided the plug-in-type, click-cyclable, computer-enabled system for enabling of creating, editing, saving, and displaying of speaker notes pages as described in accordance with another aspect of the invention, wherein the speaker notes pages creation and editing subsystem is further adapted for creating, editing, and saving of, and wherein the speaker notes presentation subsystem is further adapted for presenting of, a less-than-complete portion of all speaker notes pages of a presentation file, the less-than-complete portion of all speaker notes pages having a specified different font size than other speaker notes pages of the presentation file. This aspect of the invention allows that different portions of all speaker notes pages may be adapted for use by a plurality of different speakers, each speaker having differing eyesight capabilities and speaker notes preferences for viewing relatively smaller text.

Further, in accordance with the aforementioned aspects of the invention, the plug-in-type, click-cyclable, computer-enabled system for enabling of creating, editing, saving, and displaying of speaker notes pages is preferably provided wherein each speaker notes page of a plurality of speaker notes pages for a given slide is adapted to be click-presentable to the speaker, together with any selectively varied and variable font-size edits to the speaker notes pages, to enable a plurality of different speakers having differing eyesight capabilities and speaker notes preferences to use a portion of the speaker notes pages in a single presentation file, all without having to manually vary the font size of the less than complete portion of the speaker notes pages in the presentation mode immediately before, or during, the presentation.

These aspects of the invention address the aforementioned issues of relatively differing eyesight capabilities among speakers and also associated with a speaker not having been able to have seen the speaker notes on a monitor during a presentation, because the speaker notes have been too small, the speaker in some cases only having realized that fact, that the speaker notes have been too small, after the presentation had already begun, thus there having been required an adjustment to the speaker note font size during the presentation, so that the speaker would have been able to have seen and to have more easily used the speaker notes. Indeed, in many situations such awareness, that the speaker notes have been too small of font size to see, has often only been made known to the speaker after having arrived at, and after having experienced the physical aspects of, the venue. Since many presentations have involved multiple speakers, with each speaker often having differing eyesight capabilities and slide formatting preferences, these aspects of the present invention allow such presenters to more easily tailor the speaker notes text size to the speaker's own preferences and abilities, for that speaker's portion of the presentation, and to save such changes with the presentation file.

Thus, before the invention speakers would have had to have adjusted, or would have asked their assistants to have adjusted, the size of all speaker notes of the presentation during, or immediately just before, the presentation at the venue. Or if the issue of too small speaker notes had been foreseen by the speaker and accommodated during development of that portion of the presentation by that speaker, by preforming the unduly complicated set of steps previously described hereinabove, but nevertheless minor fine-tuning type changes had still been determined to have been needed, such adjustments would have been accomplished by a relative number of clicks to have made the speaker notes relatively larger, or a relative number of clicks to have made them smaller (whether in edit mode or presentation mode of prior-art systems), and such changes would not have been able to have been saved for the next presentation if made during presentation mode.

But with this present aspect of the invention, the speaker is enabled in easily customizing that speaker's notes to a desired font size (relative to other differently-sized speaker's notes for the same presentation), whether in edit mode or presentation mode, and the speaker is thus enabled to save the changes with the presentation file. Thus, this aspect of the invention addresses the great deal of frustration, stress and anxiety that has been felt by speakers and their assistants regarding the making of last-minute changes to portions of speaker note text.

Further, in accordance with another aspect of the invention, the plug-in-type, click-cyclable, computer-enabled system for enabling of creating, editing, saving, and displaying of speaker notes pages of one or more aspects of the invention, further comprising as part of the speaker notes pages creation and editing subsystem and further comprising as part of the speaker notes pages presentation subsystem, the presentation of at least a portion of the speaker notes pages adaptable for at least one of selective font color and speaker notes page background characteristics edit.

Further, in accordance with one or more aspects of the invention, a plug-in-type, click-cyclable, computer-enabled system for enabling of creating, editing, saving, and displaying of speaker notes pages is provided wherein each speaker notes page is adapted to be click-presentable to the speaker together with one of any selectively varied and variable font-size edits to a portion of the speaker notes pages, any selectively varied and variable font-color edits to the speaker notes pages, and any selectively varied and variable background edits to the speaker notes pages, to enable a plurality of different speakers having differing eyesight capabilities and speaker notes preferences to easily use the speaker notes in a single presentation file.

The plug-in-type speaker notes pages system portion associated with this aspect of the invention addresses issues associated with prior art systems relating to having to have scrolled a single long page of speaker notes, not having been able to have seen the speaker notes on a speaker notes monitor because the speaker notes have been too small, having to have adjusted the size of the speaker notes during or immediately just before presentation at the show venue, and not having been able to have otherwise customized the speaker notes according to the speaker's preferences as to font color and speaker notes background characteristics.

In accordance with another aspect of the invention, there is provided a plug-in-type, click-cyclable, computer-enabled system for enabling of creating, editing, saving, and displaying of speaker notes pages, wherein the speaker notes pages presentation subsystem is further adaptable for presenting a plurality of discreet click-accessible speaker notes pages per slide to a speaker, and wherein the speaker notes pages presentation subsystem is formatted for showing representations of a current on-screen graphic and a next on-screen graphic together with at least one of the click-accessible speaker notes pages.

Further, in accordance with this aspect of the invention, there is provided a plug-in-type, click-cyclable, computer-enabled system for enabling of creating, editing, saving, and displaying of speaker notes pages, wherein the speaker notes pages presentation subsystem is further adaptable for presenting summary current speaker notes page number, of total number of speaker notes pages per slide page information together with the representations of current on-screen graphic and next on-screen graphic of this aspect of the invention.

The plug-in-type speaker notes pages system portion associated with this aspect of the invention provides further navigating features for speakers, and any back-stage speaker assistants, to more easily navigate presentations to help prevent miscommunications between speakers and their back-stage assistants and thus also help prevent the speaker from becoming lost in the speaker's speaker notes, or regarding which slide the speaker is on, during the presentation. This is facilitated by providing for correspondence between each discreet speaker notes page of the present invention and a slide.

In accordance with another aspect of the invention, there is provided a plug-in-type, click-cyclable, computer-enabled system for enabling of creating, editing, saving, and displaying of speaker notes pages in accordance with one or more prior aspects of the invention, wherein each click by a presenter prompts cycling to another speaker notes page for a given slide, wherein each speaker notes page is associated with at least one of a slide, an animation, and a build, and wherein said speaker notes pages creation and editing subsystem enables optional association of click-cyclable speaker notes pages with at least one of a new slide and one of an animation and a slide build.

Further, in accordance with an aspect of the invention, the plug-in-type, click-cyclable, computer-enabled system for enabling of creating, editing, saving, and displaying of speaker notes pages is provided wherein each click-accessible speaker notes page is associated with a presentation slide, wherein any presentation slide may be associated with one or more click-accessible speaker notes pages, wherein any click by a user cycles to another speaker notes page, and wherein upon clicking after presentation of a final speaker notes page for a given slide, the speaker notes pages presentation subsystem cycles to a next slide, if any, together with another speaker notes page corresponding with the next slide.

In accordance with another aspect of the invention, there is provided a plug-in-type, click-cyclable, computer-enabled system for enabling of creating, editing, saving, and displaying of speaker notes pages, wherein each click-accessible speaker notes page is associated with a slide, wherein any slide may be associated with one or more click-accessible speaker notes pages, wherein each click by a user cycles to one of a a next speaker notes page, if any, a slide, an animation, and a build, and wherein each click-accessible speaker notes page is adaptable for clickable advancement and simultaneous association and display together with one of a slide animation and a slide build, if any.

The plug-in-type speaker notes system portion associated with this aspect of the invention provides for presentations comprised of presentation slides presented to an audience, together with speaker notes pages presented only to the speaker (and any speaker assistants), which are easy to navigate and efficient, while reducing the potential for a speaker to become lost in speaker notes, slides, animations, or slide builds.

In accordance with another aspect of the invention, the plug-in-type, click-cyclable, computer-enabled system for enabling of creating, editing, saving and displaying of speaker notes pages of any of the other aspects of the invention described herein, may further comprise provision of a preview mode for allowing creating, editing, previewing, saving and displaying of speaker notes pages from a single data file during the presentation mode of a combined speaker notes pages and slides presentation system comprised of applying the plug-in-type system to a prior-art slides and speaker notes creation and display system. This aspect of the invention allows a user to preview changes relating to any of the foregoing aspects of the invention and to save such changes to the presentation file for later availability and use.

In accordance with another aspect of the invention, there is provided an integrated, speaker-notes-click-cyclable, computer-enabled slides and speaker notes pages creation and presentation system for enabling of creating, editing, and saving a combined speaker notes pages and slides presentation file, and for displaying of slides and speaker notes pages, adaptable for use by speakers, hereinafter also referred to as an integrated slides and speaker notes pages creation and presentation system. The integrated slides and speaker notes pages creation and presentation system in accordance with this aspect of the invention comprises: a slides creation and editing subsystem for enabling creating, editing, and saving of one or more slides of the presentation file for conveying messages to an audience, and a speaker notes pages creation and editing subsystem for enabling creating, editing and saving of at least one, or even a plurality of, speaker notes pages per slide in a presentation file.

The integrated slides and speaker notes pages creation and presentation system in accordance with this aspect of the invention further comprises a slides and speaker notes pages presentation subsystem, for click advancement and recession access by a speaker during a presentation to more than a single page of speaker notes pages per slide, each click-accessible speaker notes page being associated with a corresponding presentation slide. Accordingly, each click by a user may be enabled to cycle to another speaker notes page for presentment for view by the speaker together with a slide associated with the another speaker notes page.

The integrated slides and speaker notes pages creation and presentation system portion associated with this aspect of the invention addresses and helps to resolve the issue in the slides and speaker notes presentation software industry of requiring speakers, or their assistants, to have to scroll a single long page of speaker notes, thus alleviating the problem that a speaker, or a speaker's assistant, has had to divert attention away from the presentation to try and stay in sync with the presentation by scrolling while speaking, or having an assistant do the same. Thus, formerly-experienced miscommunications, such as have been experienced upon an errant click by a presenter followed by a back-stage assistant against the presenter's actual wishes, as well as the need for multiple back-stage assistants, may be avoided in the future with the present invention.

In accordance with another aspect of the invention, there is a provided an integrated, speaker-notes-click-cyclable, computer-enabled slides and speaker notes pages creation and presentation system, wherein the speaker notes pages creation and editing subsystem is further adapted for creating, editing and saving of a less-than-complete portion of all speaker notes pages of a presentation file, and wherein the slides and speaker notes pages presentation subsystem is further adapted for presenting the less-than-complete portion of all speaker notes pages of the presentation file, the less-than-complete portion of all speaker notes pages having a specified different font size than other speaker notes pages. In this way, the system provides for easy formatting of speaker notes pages so as to be adapted for a plurality of different speakers, each speaker having differing eyesight capabilities and speaker notes preferences for viewing relatively smaller text.

These aspects of the invention address the aforementioned issues of relatively differing eyesight capabilities among speakers and also associated with a speaker not having been able to have seen the speaker notes on a monitor, because the speaker notes have been too small, the speaker in some cases only having realized that fact after the presentation had already begun, thus having required an adjustment to the speaker note font size during the presentation, or even creation of a separate presentation file together with use of an additional back-stage assistant to keep the two files in sync, so that the speaker would have been able to have seen and to have more easily used the speaker notes. Indeed, in many situations such awareness by the presenter has only been made known to the presenter after having arrived at and having experienced the physical aspects of the venue.

Further, since many presentations have involved multiple presenters, each presenter often having had differing eyesight capabilities and slide formatting preferences, these aspects of the present invention allow the presenter to more easily tailor the speaker notes text size to the presenter's own preferences, for that presenter's portion of the presentation, and to save such changes in a single presentation file without the need for a separate presentation file and additional back-stage assistant just for the speaker notes portion of the presentation.

Thus, before the invention presenters often would have had to have adjusted, or would have asked to have been adjusted, the size of all speaker notes of the presentation during or immediately just before the presentation at the venue—further requiring adjusting the size of the speaker notes back for the next speaker. Or, if the issue of too small speaker notes had been foreseen by the presenter and accommodated during development of that portion of the presentation by that presenter by a complicated set of steps as set forth previously herein, but nevertheless minor fine-tuning, last-minute-type changes had still been needed, such adjustments would have been accomplished by a relative number of clicks larger, or a relative number of clicks smaller, and such changes would not have been able to have been saved for the next presentation if made during presentation mode. Thus, such presentation mode changes to speaker notes text size would need to have been changed back after the larger-notes-requiring-speaker had completed that speaker's portion of the presentation.

But with this aspect of the invention, speakers are enabled in easily customizing the speakers' speaker notes to a desired font size (relative to other speakers' notes for the same presentation), and the speakers are further enabled to save these changes with the presentation file. Thus, this aspect of the invention addresses the great deal of frustration, stress and anxiety that has been felt by speakers and their assistants regarding making last-minute changes to portions of speaker note text.

In accordance with another aspect of the invention, there is provided an integrated, speaker-notes-click-cyclable, computer-enabled slides and speaker notes pages creation and presentation system, further comprising as part of the speaker notes pages creation and editing subsystem the presentation of at least a portion of the speaker notes pages adaptable for at least one of selective font color and speaker notes page background characteristics edit and saving, and wherein each speaker notes page is adapted to be click-presentable to the speaker together with one of any selectively varied and variable font-size edits to a portion of the speaker notes pages, any selectively varied and variable font-color edits to the speaker notes pages, and any selectively varied and variable background edits to the speaker notes pages, to enable a plurality of different speakers having differing eyesight capabilities and speaker notes preferences to easily use the speaker notes in a single presentation file.

The integrated speaker notes pages system portion associated with this aspect of the invention addresses issues associated with prior art systems relating to having to have scrolled a single long page of speaker notes, not having been able to have seen the speaker notes on a monitor because the speaker notes have been too small, having to have adjusted the size of the speaker notes during or immediately just before presentation at the show venue, and not having been able to have otherwise customized the speaker notes according to the speaker's preferences as to font color and speaker notes background characteristics.

In accordance with another aspect of the invention, there is provided an integrated speaker-notes-click-cyclable, computer-enabled slides and speaker notes pages presentation system in accordance with one or more previously-described aspects of the invention, wherein the slides and speaker notes pages presentation subsystem is further adaptable for presenting a plurality of discreet click-accessible speaker notes pages per slide to a speaker, wherein the slides and speaker notes pages presentation subsystem is formatted for showing representations of a current on-screen graphic and a next on-screen graphic, together with at least one of the click-accessible speaker notes pages, and wherein the slides and speaker notes pages presentation subsystem is further adaptable for presenting summary current speaker notes page number, of total number of speaker notes pages per slide, page information together with the representations of current on-screen graphic and next on-screen graphic.

The integrated speaker notes system portion associated with this aspect of the invention provides further navigating features for speakers, and any back-stage speaker assistants, to more easily navigate presentations to help prevent miscommunications between speakers and their back-stage assistants and thus also help prevent the speaker from becoming lost in the speaker's notes, or regarding which slide the speaker is on, during the presentation. This is facilitated by providing for correspondence between each discreet speaker notes page of the present invention and a slide.

In accordance with another aspect of the invention, there is provided an integrated, speaker-notes-click-cyclable, computer-enabled slides and speaker notes pages creation and presentation system, wherein each click by a speaker prompts one of cycling to another of a plurality of speaker notes page for a given slide, presentation of a slide, presentation of an animation, and presentation of a build, wherein each speaker notes page is associated with at least one slide, and wherein the speaker notes pages creation and editing subsystem enables optional association of click-cyclable speaker notes pages with at least one of a new slide and one of an animation and a slide build.

The integrated speaker notes pages system portion associated with this aspect of the invention provides for presentations comprised of presentation slides presented to an audience, together with speaker notes pages presented only to the speaker (and any speaker assistants), which are easy to navigate and efficient, while reducing the potential for a speaker to become lost in speaker notes, slides, animations, or slide builds.

Still further, in accordance with this aspect of the invention, the integrated, speaker-notes-click-cyclable, computer-enabled slides and speaker notes pages creation and presentation system, further comprises a preview mode for allowing creating, editing, previewing, saving, and displaying of speaker notes pages from a single file of the speaker-notes-click-cyclable, computer-enabled slides and speaker notes pages presentation system. This aspect of the invention allows a user to easily preview relating to any of the foregoing aspects of the invention, and to save such changes to the presentation file for later availability and use.

In accordance with another aspect of the invention, there is provided a click-controlled, computer-enabled method of enabling display to a speaker of a plurality of speaker notes pages for a presentation slide of a presentation file for display to an audience, hereafter also referred to as the click-controlled speaker notes pages display method, comprising the steps of: capturing a click event by a user and determining responsive to the click whether there is at least one more speaker notes page of a plurality of speaker notes pages for a given slide to be presented for the given presentation slide. If there is at least one more speaker notes page to be displayed for the given presentation slide, responsive to the click displaying the at least one more speaker notes page to the speaker. Further, if there is not at least one more speaker notes page to be displayed for the presentation slide, responsive to the click determining whether there is at least one more presentation slide in the presentation file. If there is at least one more slide in the presentation file, responsive to the click displaying the at least one presentation slide to the audience together with responsive to the click displaying of a next speaker notes page to the speaker. If there is not at least one more presentation slide in the presentation file, responsive to the click ending the method.

Further, in accordance with this aspect of the invention, the click-controlled, computer-enabled method of enabling display to a speaker of a plurality of speaker notes pages for a presentation slide of a presentation file for display to an audience, further comprises the intermediate steps of, if there is at least one more speaker notes page to be presented for the presentation slide, responsive to the click determining whether there is an animation to be displayed to the audience and associated with the at least one more speaker notes page responsive to the click to be displayed to the speaker. If there is a next animation associated with the at least one more speaker notes page to be displayed for the presentation slide, responsive to the click displaying the next animation to the audience while responsive to the click displaying the at least one more speaker notes page to the speaker. If there is not a next animation to be displayed to the speaker and associated with the at least one more speaker notes page to be displayed for the presentation slide, responsive to the click displaying the at least one more speaker notes page to the speaker.

The click-controlled speaker notes display method associated with this aspect of the invention addresses and helps to resolve the issue in the slides and speaker notes presentation software industry of requiring speakers, or their assistants, to have to scroll a single long page of speaker notes, thus alleviating the problem that a speaker, or a speaker's assistant, has had to divert attention away from the presentation to try and stay in sync with the presentation by scrolling while speaking, or having an assistant do the same. Thus, formerly-experienced miscommunications, such as have been experienced upon an errant click by a presenter followed by a back-stage assistant against the presenter's actual wishes, may be avoided in the future with the present invention.

Further, the click-controlled speaker notes pages display method associated with this aspect of the invention provides for presentations comprised of presentation slides presented to an audience, together with speaker notes pages presented only to the speaker (and any speaker assistants), which are easy to navigate and efficient, while reducing the potential for a speaker to become lost in speaker notes, slides, animations, or slide builds. In this context, it will be appreciated that an animation may be considered the same as a build, since both require execution of at least another step to present additional information to an audience and/or a speaker.

The systems, methods and associated datasets and data files of the present invention are particularly important for presentations where the speaker is on a stage that is so big, and with varying lighting conditions, that the speaker is relatively far from any speaker notes monitor and has not been able to have a computer screen accessible to the speaker. In such situations, the speaker has had in the past only a clicker remote control device for indicating advancement, or recession (reversal), to the next slide, but not speaker notes. But the various aspects of the present invention set forth above, such as for example the ability to have a plurality of individual speaker notes pages per slide, each with varied text size and color, together with clearly associated "page of pages" of speaker notes types of prompts on a speaker notes monitor, or confidence monitor, for the speakers, helps alleviate the aforementioned issues associated with prior-art systems.

Further, together with giving the speaker more direct control over the advancement, and recession, of speaker notes, the foregoing aspects of the invention alleviate the problems that speakers have had of being able to determine and quantify how much larger their speaker notes should be, or what color they should be. This is because the aforementioned various aspects of the invention allow speakers to easily see specific font sizes and font colors of their speaker notes, and therefore speakers are better enabled to specify changes, such as for example changing from a 12-point black font to a 24-point red font, in order to allow the speakers to more easily see and follow the speaker notes. Thus, this aspect of the invention enables speakers to avoid having to communicate in more vague terms otherwise necessary without having clearer font size descriptions. Thus, this aspect of the invention helps speakers avoid having to use such vague speaker statements as, "please enlarge my speaker notes two clicks, or three clicks." This aspect of the invention gives a speaker more control over the speaker's notes, so that the speaker, or a single back-stage assistant, can more easily, and more consistently with the presenter's expressed wishes with the remote clicker, operate a speaker notes monitor, thus saving the cost of additional assistant wages and additional work and computer systems (plus backup computer systems) otherwise necessary to create and manage an extra slide deck exclusively for just a speaker's notes.

Further, one or more of the foregoing aspects of the invention makes more easily possible the provision of customized speaker notes for multiple speakers, speaker notes customized with more-easily-saved speaker note text font size, font color, highlighting, and other formatting, and that have been adjusted per speakers' wishes.

Still further, one or more of the foregoing aspects of the invention addresses, and largely eliminates, the need for setting up an additional set of speaker notes slides, thus alleviating the need for an additional backup computer (for the additional set of speaker notes slides), and also alleviating the need to reformat speaker notes presentations resulting in different, or altered, amounts of text showing and having sometimes differently scaled aspect ratios from one presentation to the next. Thus, again, one or more aspects of the invention alleviates what to date has been a common and expensive practice in the industry of hiring additional assistants and re-making of, and undoing, multiple edits of speaker notes.

Thus, in accordance with one or more aspects and embodiments of the invention, there is provided a click-controllable, computer-enabled system for enabling of creating, editing, saving, and displaying of a plurality of discreet speaker notes pages per slide, adaptable for use by a plurality of different speakers, each speaker having differing eyesight capabilities for viewing relatively smaller text. Such a system comprises: a speaker notes pages editing subsystem for enabling editing, preferably previewing, and saving of the font size and/or font color of a less-than-complete portion of speaker notes, and a speaker notes pages presentation subsystem. These subsystems enable for click advancement and recession access by a speaker during a presentation to provide for more than a single page of speaker notes per slide, each click-accessible speaker notes page being associated with a corresponding presentation slide and/or a corresponding animation/build, if any, each click by a user advancing to one or more of, one of a plurality of next speaker notes pages for a given slide, a new associated slide and/or an animation/build.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

DETAILED DESCRIPTION

Figure 7A:
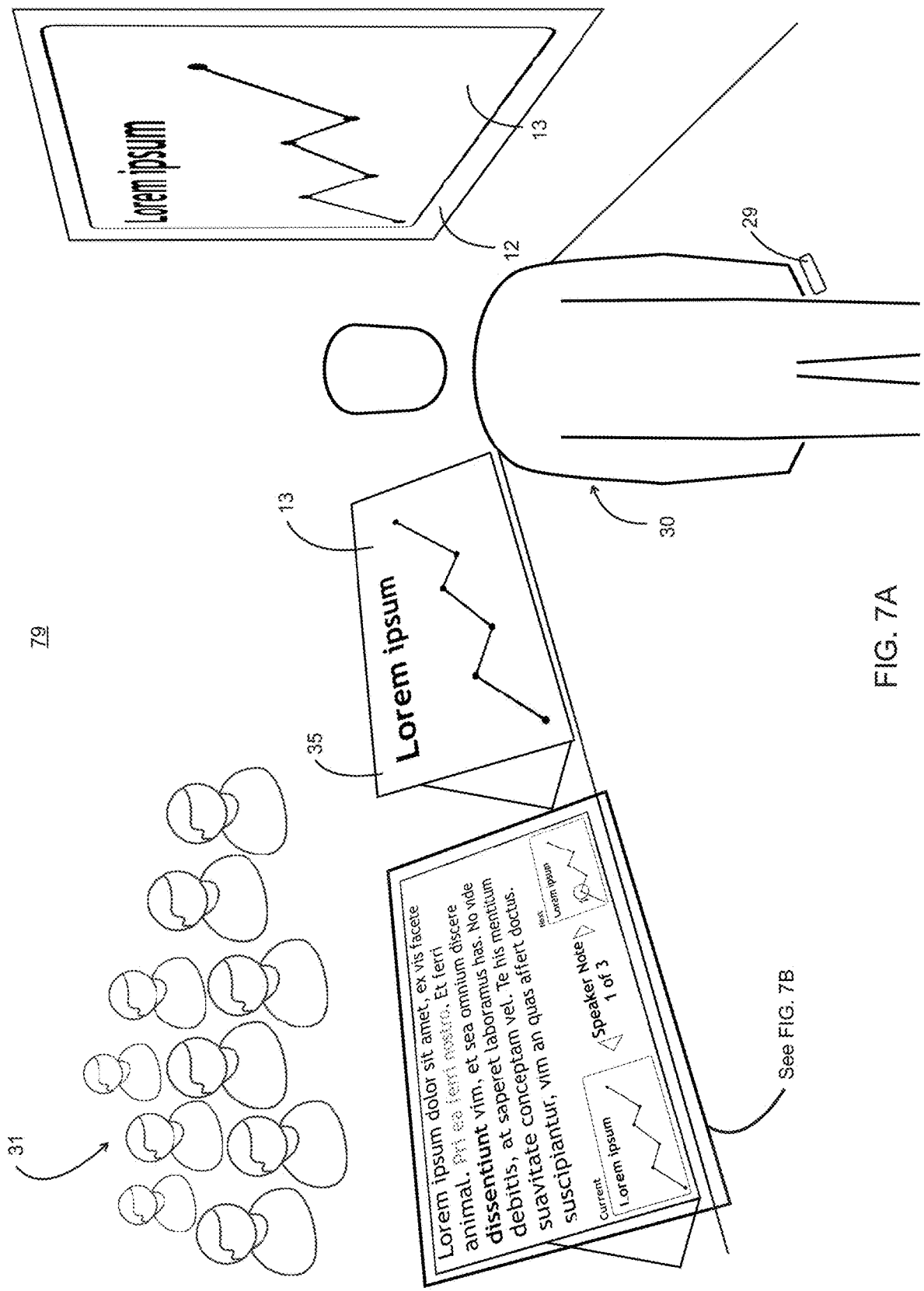
FIG. 7A is a perspective view of a speaking venue illustration showing the audience and speaker environment in which one or more aspects of a speaker notes pages creation, formatting and display system and method may be used, comprising an on-screen graphic of a current example slide intended for the audience, an on-screen graphic confidence monitor showing the speaker the same slide as is shown to the audience, and a speaker notes pages display monitor (further detailed in FIG. 7B) displaying example speaker's notes pages in speaker-notes-centric, click-accessible, fashion.

Referring now to FIGS. 7A and B, there is illustrated a typical speaking and presentation environment 79 in FIG. 7A suitable for use of either a plug-in-type or an integrated type of a slides and speaker notes pages creation, editing, saving, formatting and displaying system and method (also known herein as the slides and speaker notes system and method in accordance with the invention) in accordance with one or more aspects of the present invention. In many larger such speaking environments, there is provided a screen or monitor 12 for display of the current on-screen graphic of a current example slide 13 intended for an audience 31, an on-screen graphic confidence monitor 35 showing a speaker 30 the same slide 13 as is shown to the audience, and a speaker notes display monitor 37 displaying in speaker-notes-centric fashion example speaker's notes 70.

Figure 1:
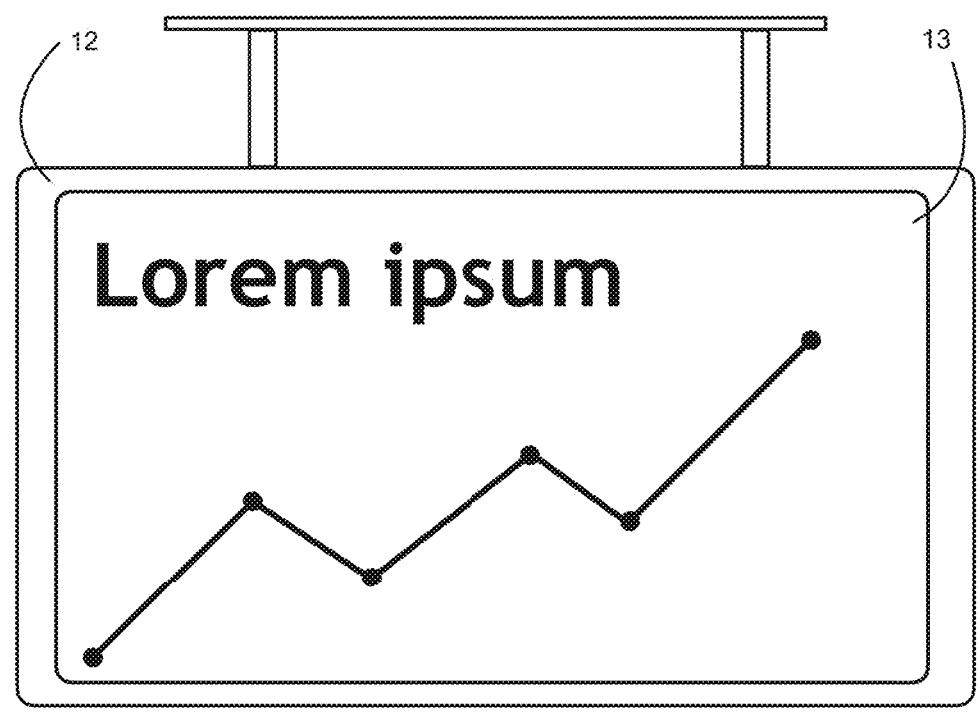
FIG. 1 is an illustration of side-by-side views of both an on-screen graphic of an example currently-displayed-to-the-audience slide, and an illustration of a screen of a computer display, confidence monitor, or speaker notes monitor, displaying to a speaker an example view of the current on-screen graphic of the current example slide and a smaller next slide with example speaker's notes associated with the current slide, the example speaker notes being positioned in scrollable fashion below the next slide in accordance with an example prior-art speaker notes and slide presentation system layout.
Figure 1:
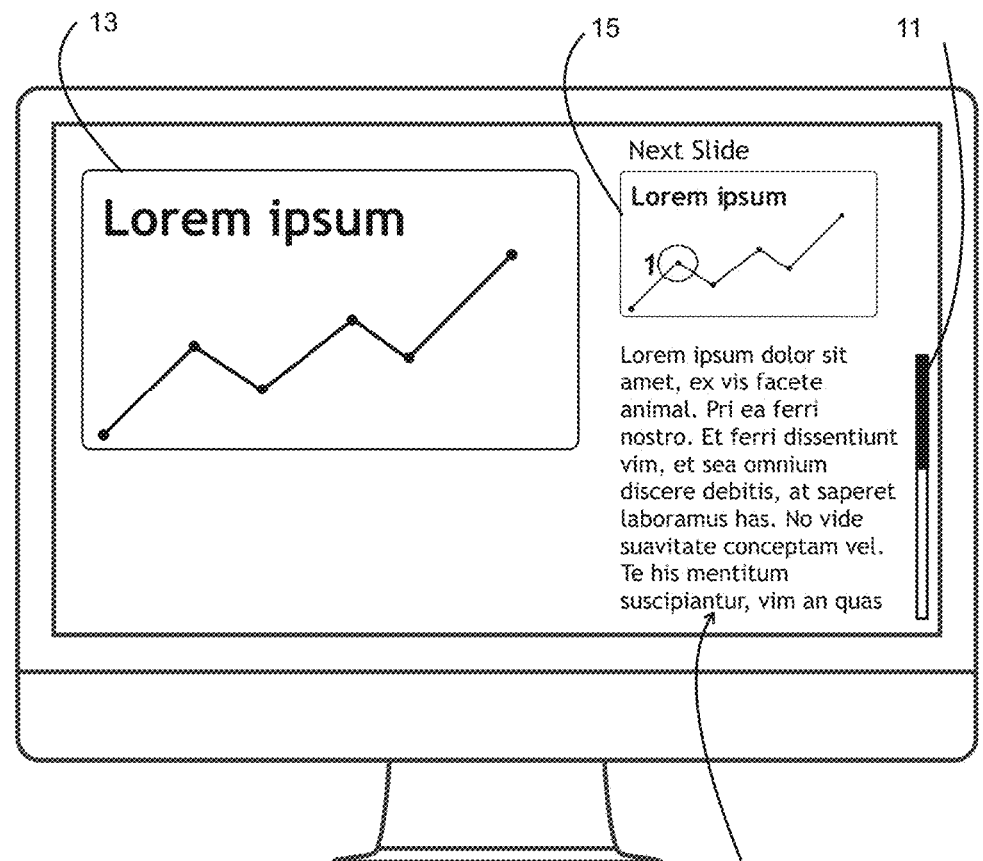
Figure 2:
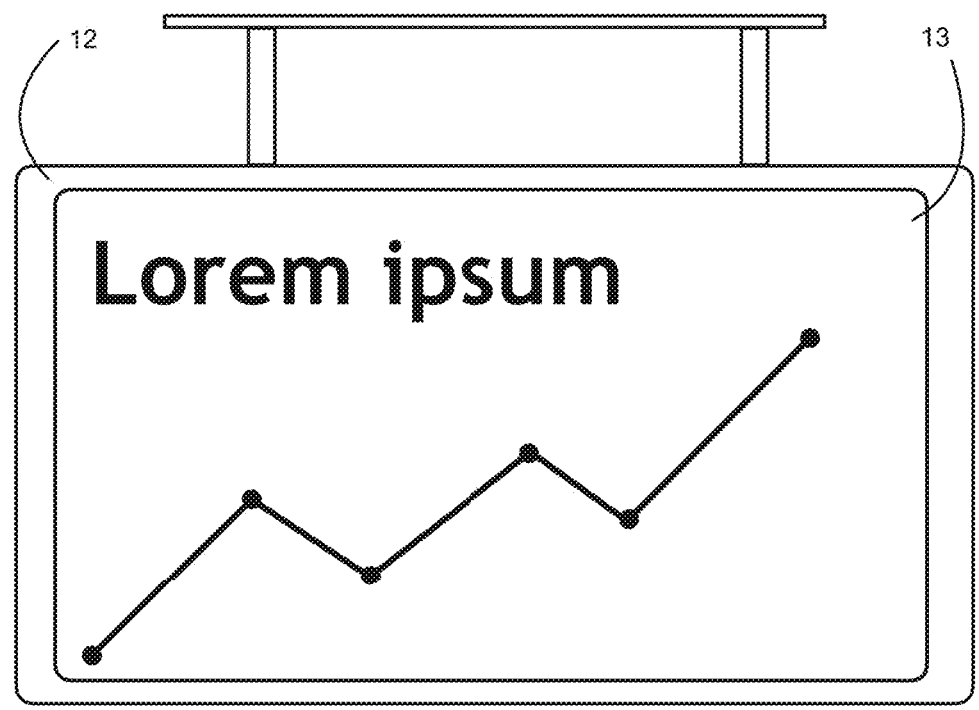
FIG. 2 is an illustration of side-by-side views of both an on-screen graphic of an example currently-displayed-to-the-audience slide, and an illustration of a screen of a computer display, confidence monitor, or speaker notes monitor, displaying to a speaker an example smaller view of the current on-screen graphic of the current slide and an example equally-small next slide, together with larger example speaker notes relative to those shown in FIG. 1 and associated with the current slide, the example speaker notes being positioned in scrollable fashion below the next slide in accordance with an alternative example prior-art speaker notes and slide presentation system layout.
Figure 2:
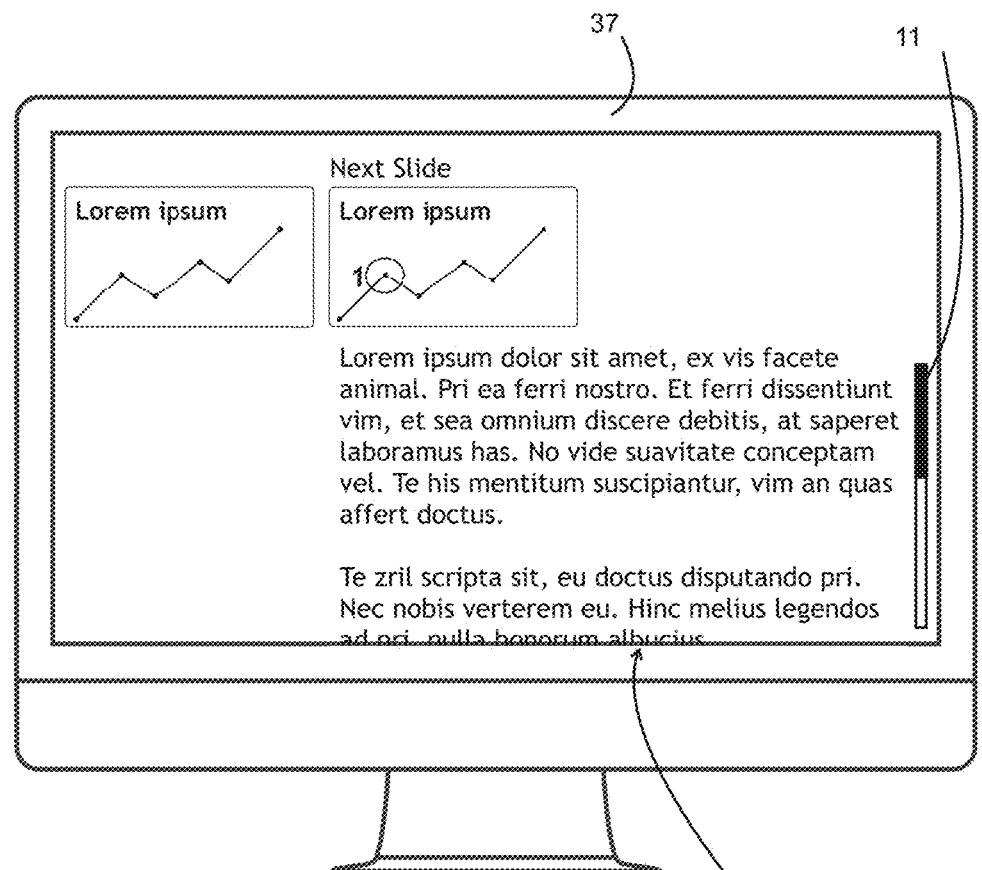
Figure 3:
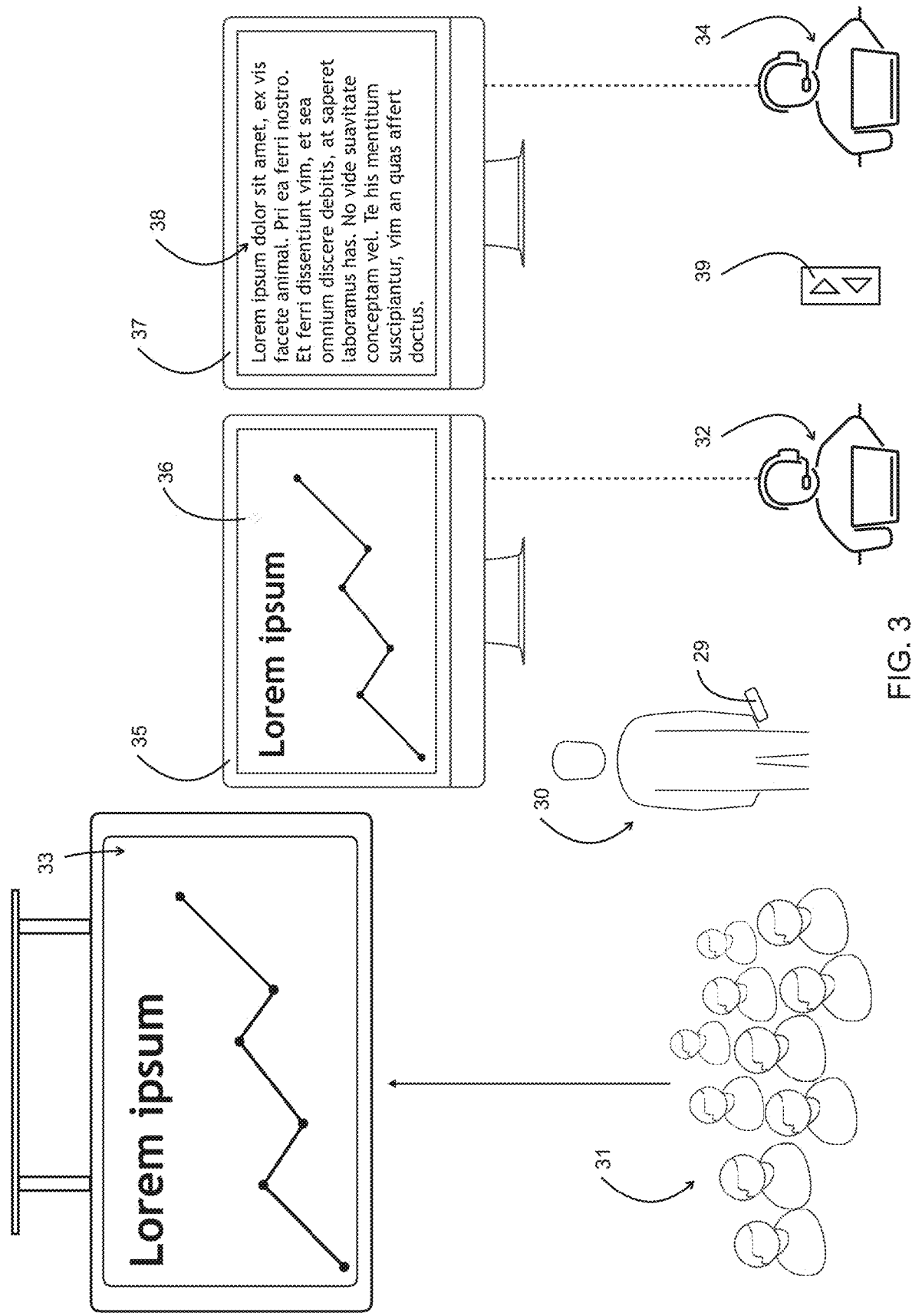
FIG. 3 is an illustration of both an on-screen graphic of a currently-displayed-to-an-audience example slide, and side-by-side views of a confidence monitor and a speaker notes monitor showing example speaker notes from a different file on a completely different computer in accordance with an example prior-art custom manual setup process requiring an extra assistant to be sure the speaker notes and audience slides stay in sync.
Figure 4:
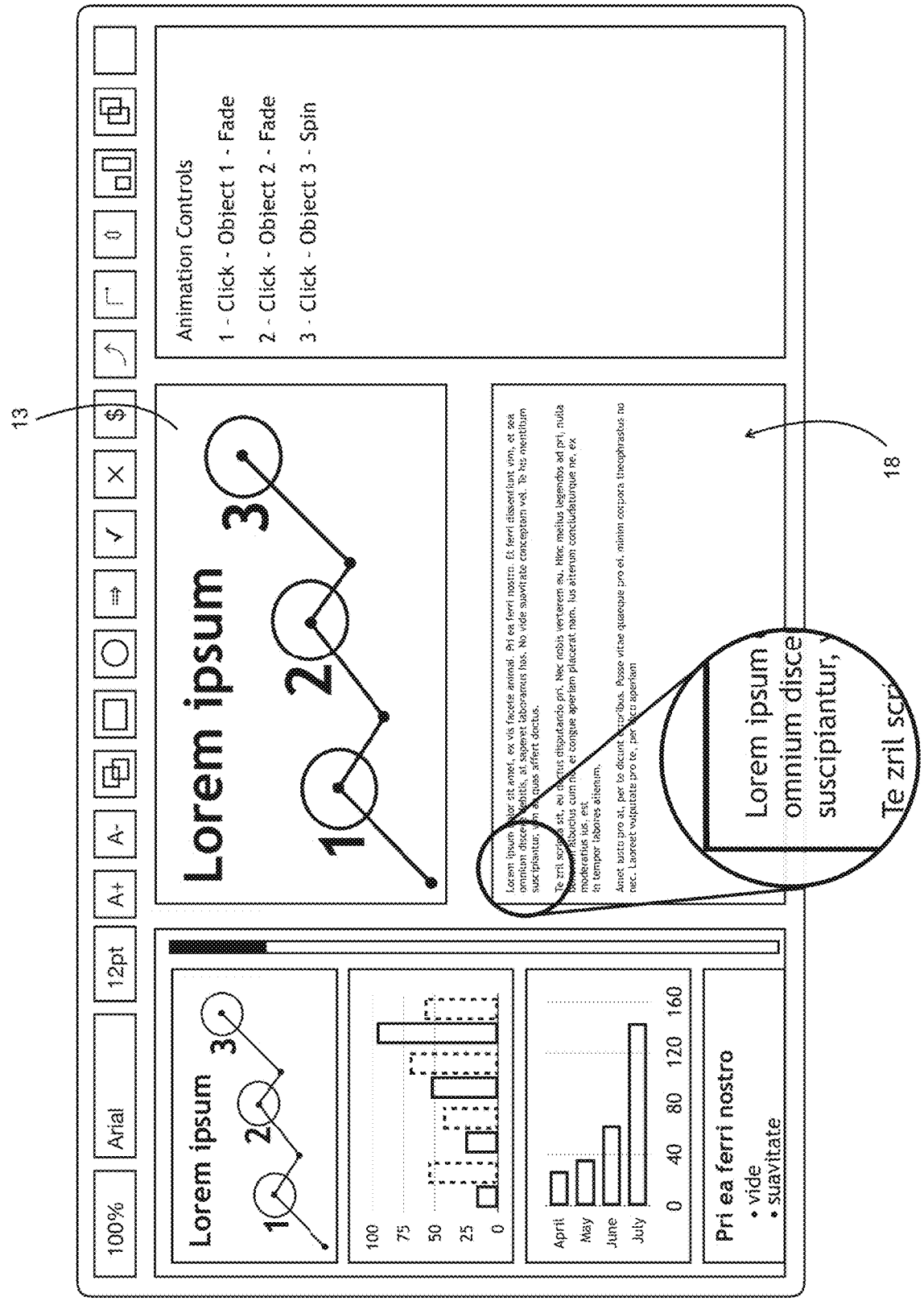
FIG. 4 is an illustration of an example prior-art edit-mode screen interface for allowing speakers and assistants to make edits to presentation slides, and speaker notes (though lacking in edit-mode preview capability), and to correlate edits with animations or slide builds.
Figure 5:
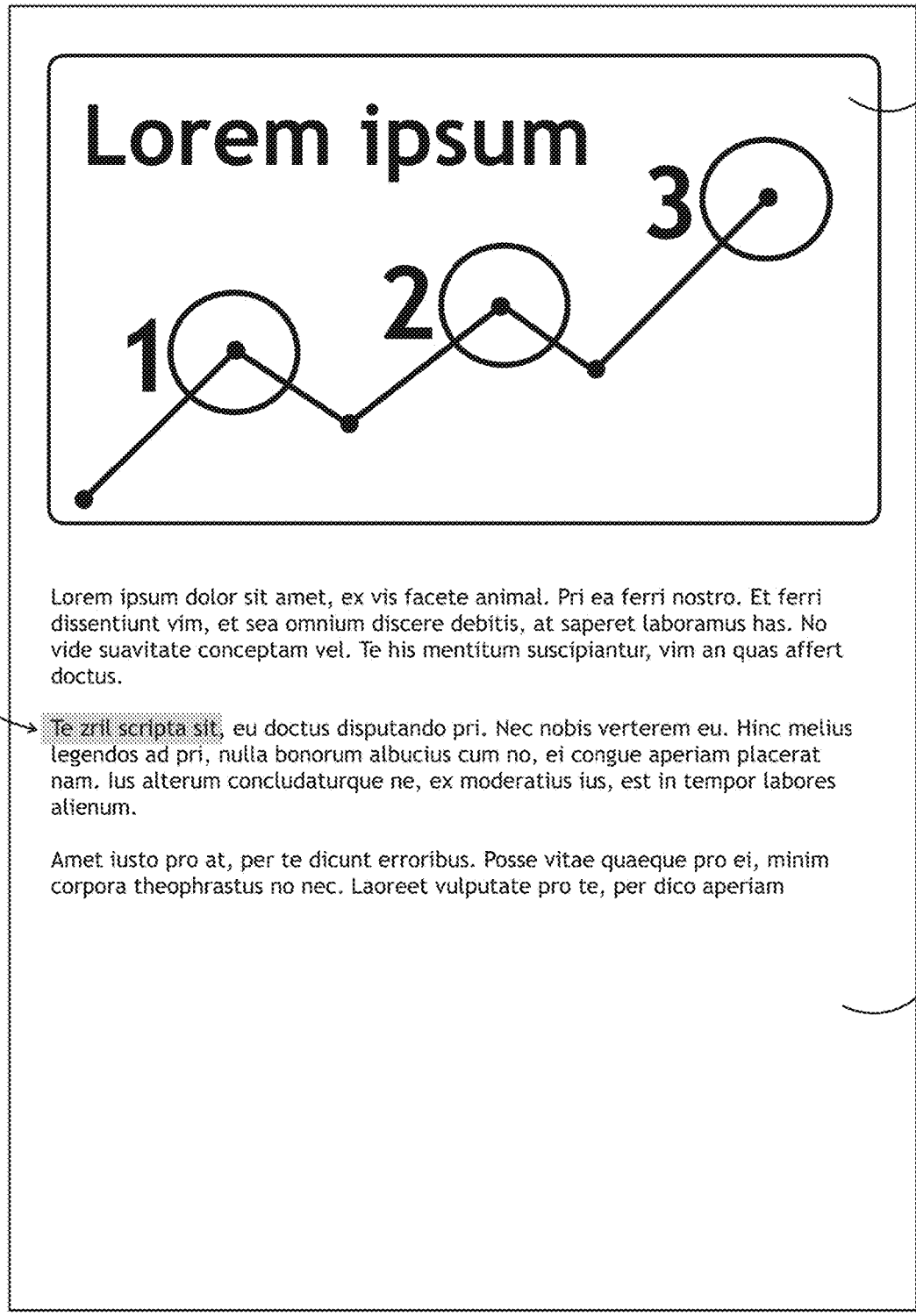
FIG. 5 is an illustration of an example prior-art printout showing some of the limited capabilities of speaker notes editing capabilities of prior-art systems.
Figure 6:
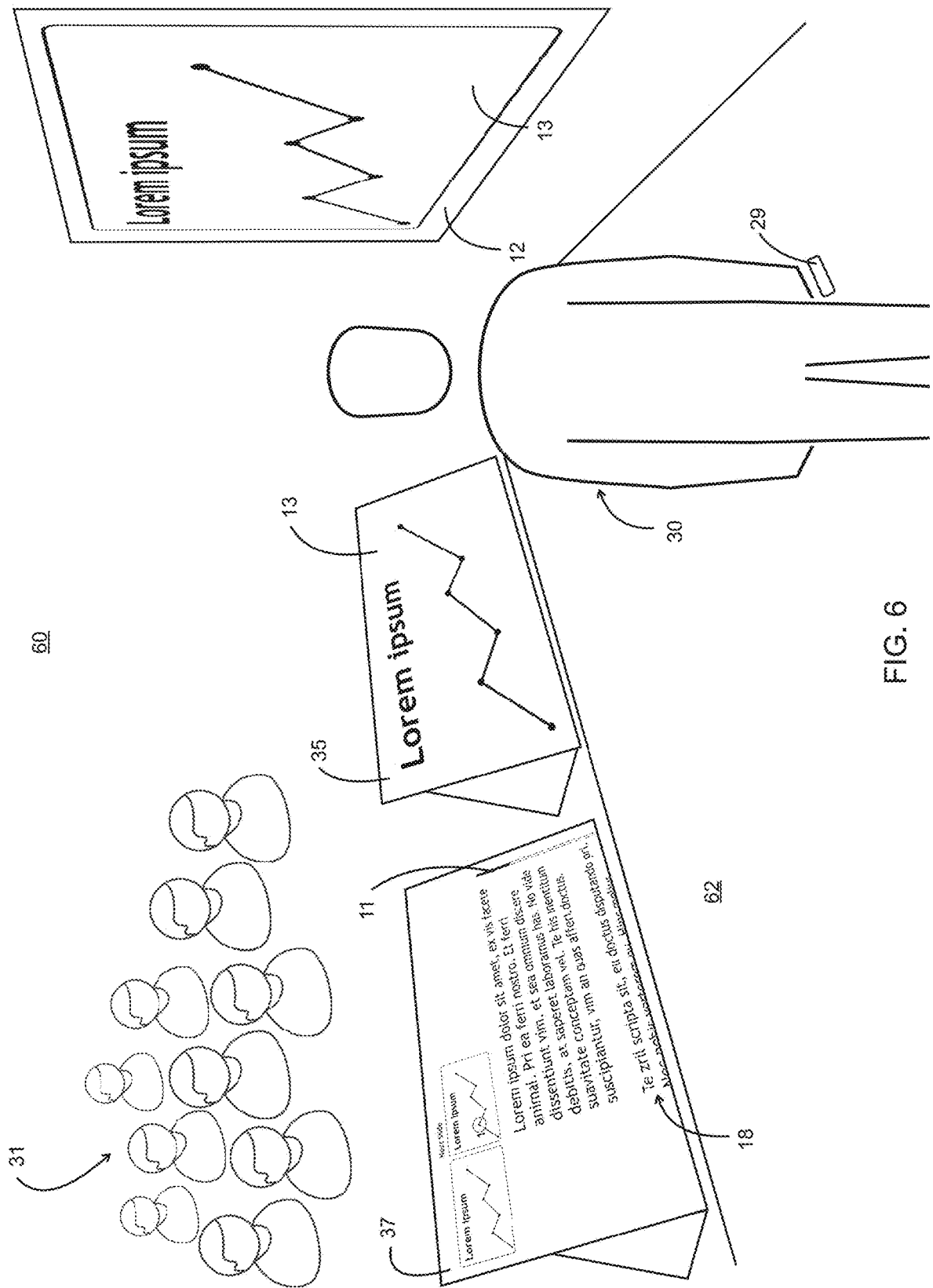
FIG. 6 is a graphical illustration of click and scroll characteristics of prior-art speaker note display and use.

Also, in accordance with one or more aspects of the invention, there is provided a current slide reminder 73, and a next slide reminder 75, for reinforcing and reassuring to the speaker where the speaker is in the presentation relative to upcoming material. The current slide reminder 73 and next slide reminder 75 are configurable so as to made larger or smaller, or in one location on a screen of the speaker notes display monitor 37, or another, all depending on preferences of the speaker 30. In accordance with an aspect of the invention, the speaker notes 70 are divided into click accessible (click advanceable and click reversable) speaker notes pages 72, with the use of a clicker remote 29 by the speaker 30. As shown in FIG. 3, the clicker remote 29 may also operate a cueing device 39 back stage for operation of speaker notes pages advancement, or recession, by an assistant 32, when using one or more aspects of the invention during a presentation.

In accordance with another aspect of the invention, there is preferably provided on the speaker notes monitor 37 for a speaker 30, a page of total pages indicator 74 and forward and back arrows 76, 77, respectively. As will be understood by those skilled in the art, the page of total pages indicator 74 (e.g., "Speaker Note 1 of 3") allows the speaker 30 to know what page the speaker is on and how many total pages of speaker notes there are for the current slide 13. The page 72 of speaker notes shows on the speaker notes pages monitor 37 until the speaker clicks the remote 29, advancing (or reversing) the page 72 of speaker notes to a next page of speaker notes. Thus, if as shown in FIG. 7A, the speaker notes page showing is Speaker Note (page) 1 of 3, then an advance click by the speaker 30 would advance the speaker notes page to page 2 of 3 as shown in FIG. 8B (whereas reversal would reverse to the last speaker notes page of the previous slide, if any). In such case the current slide indicator 73, and next slide indicator 75, may each stay the same, or alternatively, as further shown in FIGS. 8A and B, a new page of speaker notes 82, otherwise designated as "Speaker Note 2 of 3" by indicator 74, would be displayed as the new current slide 73 (for example showing the addition of a circled intermediate inflection point of a graph associated with a slide animation or build). It will be appreciated that, in accordance with one or more aspects of the invention, "Speaker Note 1 of 3" is actually a shortened version of "Speaker Note Page 1 of 3 Total Speaker Notes for this Slide", used in order to save space on the screen of the speaker notes monitor 37.

In this way, the speaker 30 is apprised of exactly where the speaker is in the presentation, and the speaker notes pages (e.g., 72, 82) are automatically, with the touch of a button or with the click of the remote 29, synced with the current slide and animation or build. Further, in this way, the speaker 30 is always apprised during a presentation of where the speaker is in the presentation so that the speaker is less likely to get lost or confused during the presentation.

Figure 8A:
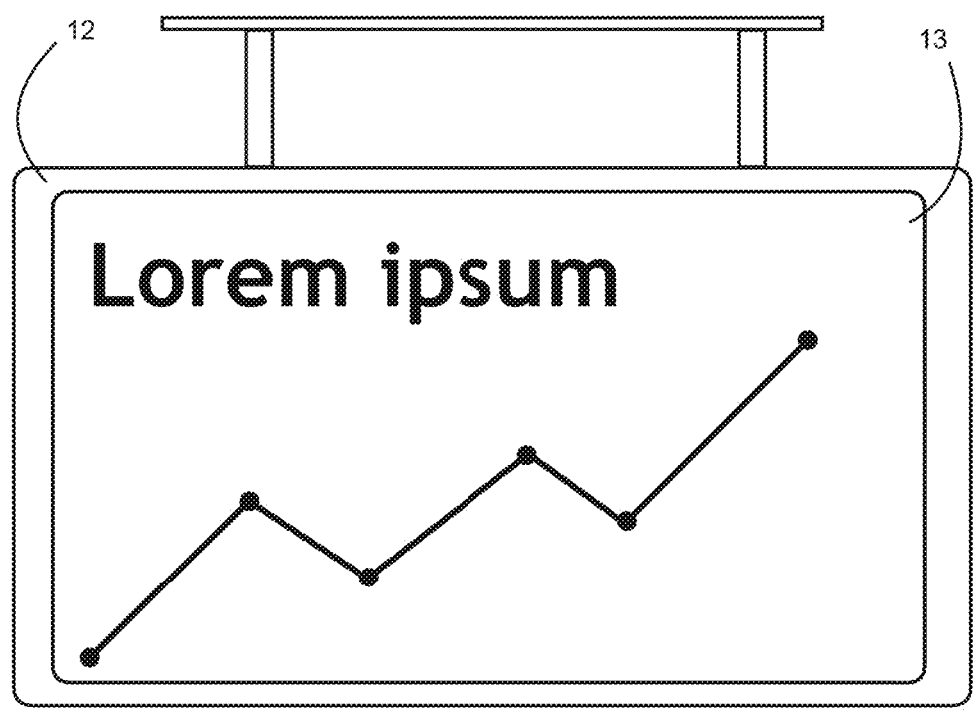
FIG. 8A is an illustration of an on-screen graphic of an example slide intended for an audience receiving a presentation and an illustration of the screen of a computer display, confidence monitor, or speaker notes pages monitor, displaying to a speaker a speaker-notes-centric view of one of a plurality of pages of example speaker notes (continued on FIG. 8B) that are all click-accessible, or keystroke-accessible, to the speaker as part of the system and method in accordance with one or more aspects of the invention, the system and method also displaying to the speaker the current slide and a next slide (including any animation or slide build)
Figure 8A:
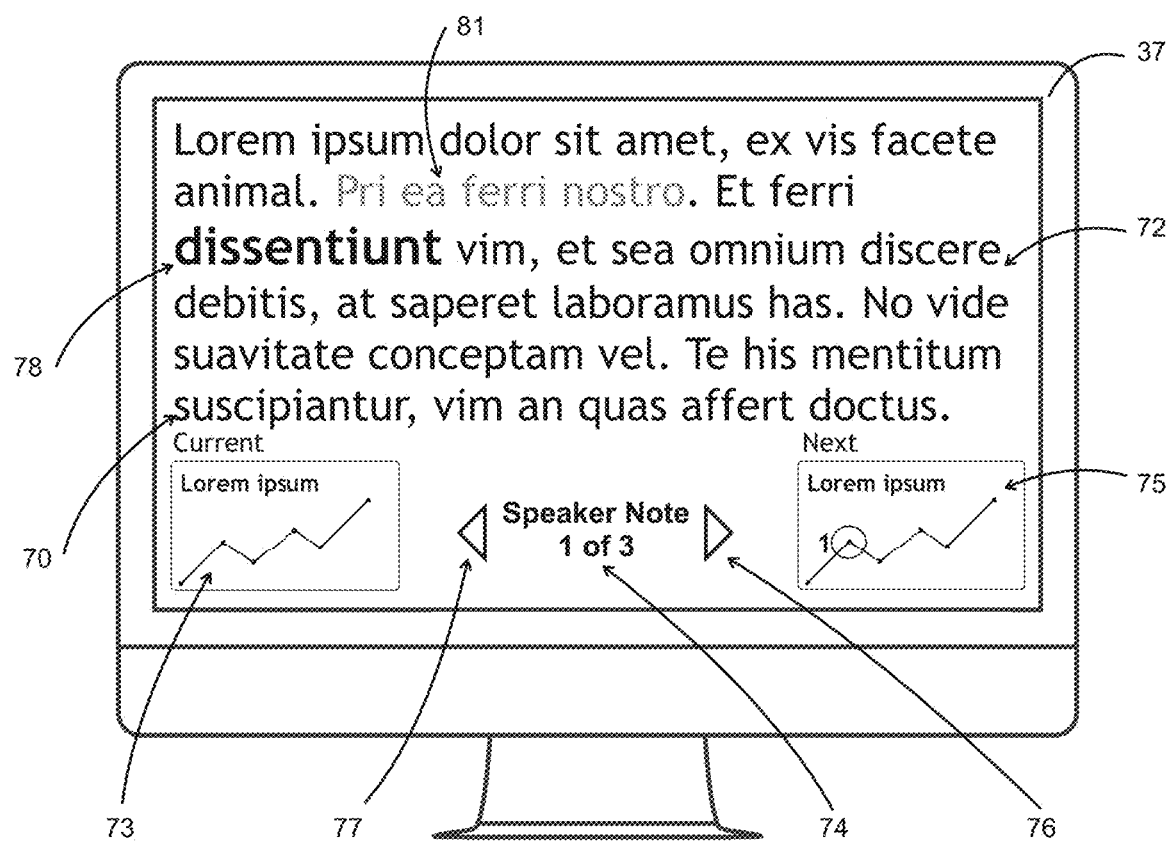
Figure 8B:
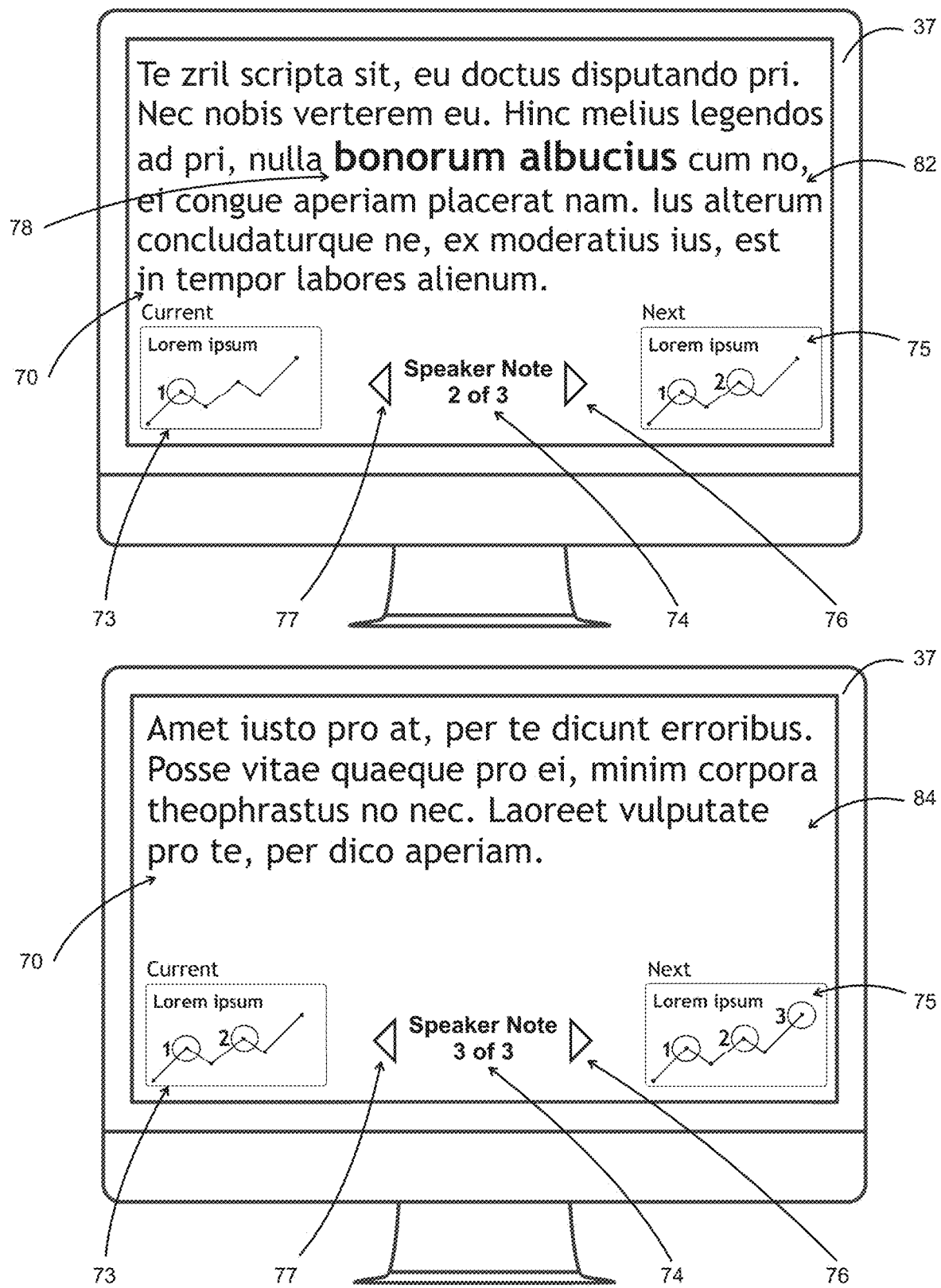
FIG. 8B is an illustration of screens of computer displays, confidence monitors, or speaker notes pages monitors, each displaying to a speaker a speaker-notes-centric view of one of a plurality of pages of example speaker notes that are click-accessible, or keystroke-accessible, to the speaker as part of the system and method in accordance with one or more aspects of the invention, the system and method also displaying to the speaker the current slide and a next slide (including any animation or slide build)

In accordance with an aspect of the invention, and as shown in FIGS. 7A and B and FIGS. 8A and B there are provided and shown speaker note text 70 which is bolded and enlarged as shown at 78, and which has a different font color as shown at 81. This aspect of the invention addresses short comings of prior art systems, thus making it easier for speakers to give effective presentations without getting lost or out of sync.

Referring further to FIGS. 8A and B, there are provided illustrations of a screen or monitor 12 displaying an on-screen graphic of an example slide 13 intended for an audience receiving a presentation, and there are also provided three illustrations of the screen of a computer display, confidence monitor, or speaker notes monitor 37, displaying to a speaker 30 a speaker-notes-centric view of a successive plurality of pages 72, 82, 84 of example speaker notes 70 that are all click-accessible, button-press-accessible, or keystroke-accessible, to the speaker as part of the system and method in accordance with one or more aspects of the invention, the system and method also displaying to the speaker in each example illustration of speaker notes pages, the current slide 73 and a next slide 75 (including any animation or slide build).

Figure 7B:
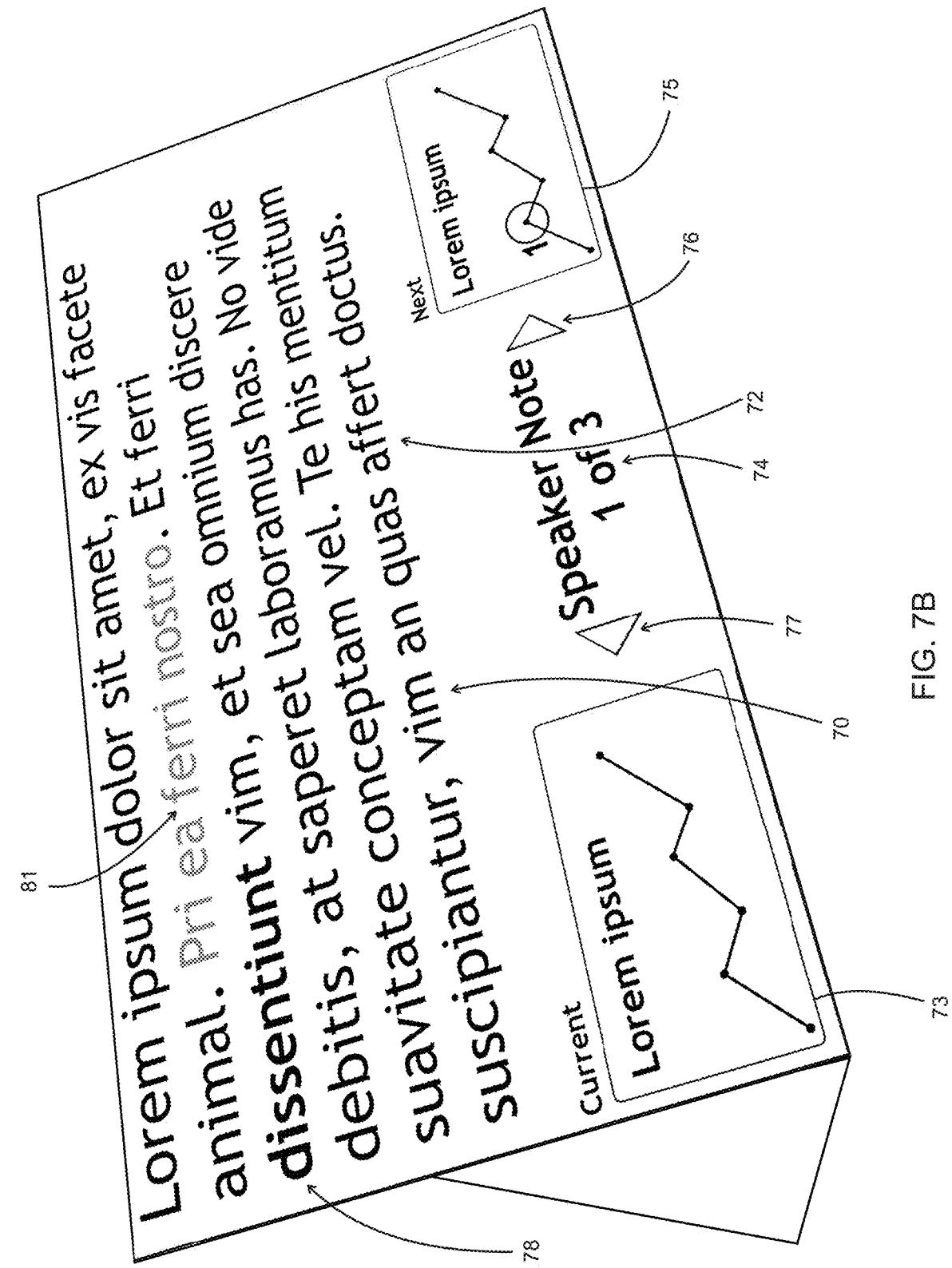
FIG. 7B is an illustration showing the details of the speaker notes pages display monitor of FIG. 7B and showing example speaker's notes pages in speaker-notes-centric, click-accessible fashion.

Still further, as shown in connection with FIGS. 8A and B, and as described in connection with FIG. 7, there is preferably provided on the speaker notes monitor 37 for a speaker 30 a page of total pages indicator 74, and forward and reverse (back) arrows 76, 77, respectively. The page of total pages indicator 74 allows the speaker 30 to know what page the speaker is on and how many total pages of speaker notes there are for the current slide. The page 72 of speaker notes 70 shows on the speaker notes pages monitor 37 until the speaker clicks the remote 29 (FIG. 7), advancing the page 72 of speaker notes to the next page of speaker notes 82. Thus, if as shown in FIGS. 8A and B, the speaker notes page showing is page 1 of 3, then an advance click by the speaker 30 would advance the speaker notes page to page 2 of 3 of speaker notes page 82. Further, as shown alternatively in FIGS. 8A and B, in such case the current slide indicator 73, and next slide indicator 75, each advance. Thus, for example, the current slide indicator 73 of notes page 82 advances showing the addition of a circled intermediate inflection point of a graph associated with a slide animation or build. And further, the next slide indicator 75 of notes page 82 advances showing, for example, the addition of a second circled intermediate inflection point at next slide indicator 75 associated with a second animation or build.

In this way the speaker 30 is apprised of exactly where the speaker is in the presentation, and the speaker notes pages (e.g., pages 72, 82) are automatically, with the touch of a button (e.g., with the click of a mouse on an on-screen button), or with the click of the remote 29, synced with the current slide and animation or build. Further, again, in this way the speaker 30 is always apprised during a presentation of where the speaker is in the presentation so that the speaker is less likely to get lost or confused during the presentation.

Still referring further to FIGS. 8A and B, upon a second click by the speaker 30 (FIG. 7A), page 82 of speaker notes 70 is advanced to page 84 of the speaker notes, otherwise designated as speaker note 3 of 3. As illustrated in FIGS. 8A and B and FIGS. 9A and B, in accordance with an aspect of the system and method of the invention, there is provided by the system and method in accordance with one or more aspects of the invention, automatic division into speaker notes pages 72, 82, 84 in accordance with a particular speaker notes font size chosen (and the quantity of speaker notes 70). Thus, as shown in FIGS. 8A and B, upon entry of sufficient text, there are automatically provided by the system and method in accordance with one or more aspects of the invention, for example, 3 pages of speaker notes, as may be associated with, for example, a specific speaker notes font size of 12-points. In other words, whereas before the invention users would enter speaker note text and it would simply be one long page of scrollable text, with the present invention, as users enter more and more text at a given font size, the text is automatically divided up by the system and provision is made for the user to associate each such automatically generated page with a specific slide and/or animation or build.

Figure 9A:
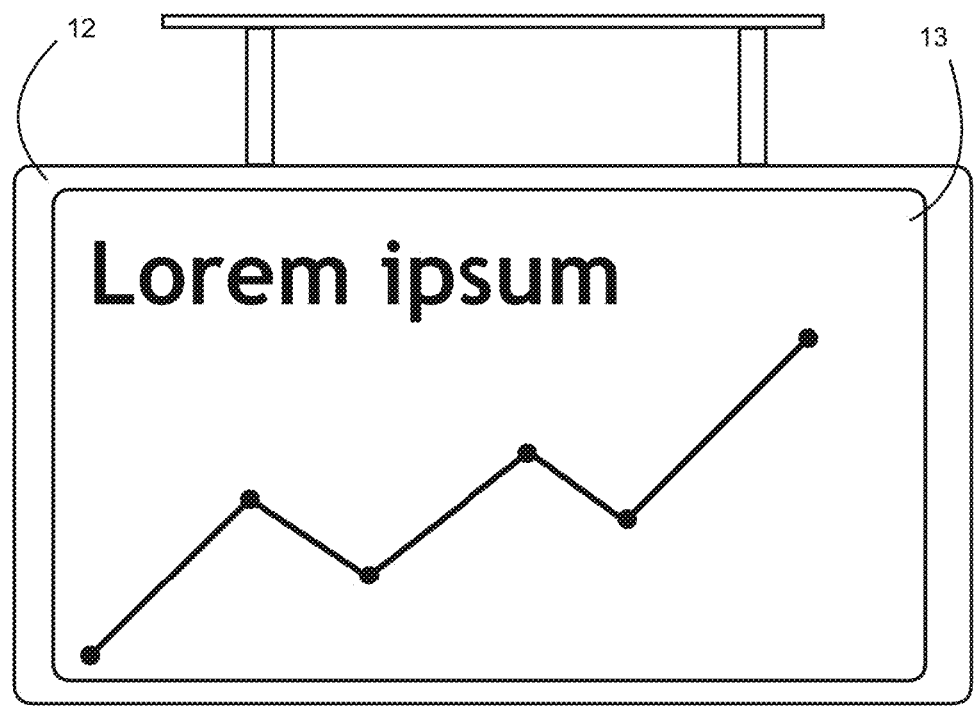
FIG. 9A is an illustration of an on-screen graphic of an example slide intended for an audience receiving a presentation and an illustration of the screen of a computer display, confidence monitor, or speaker notes pages monitor, displaying to a speaker an enlarged speaker-notes-centric view of one of a plurality of pages of example speaker notes pages that are click-accessible, or keystroke-accessible, to the speaker as part of the system and method in accordance with one or more aspects of the invention, the system and method also displaying to the speaker the current slide and a next slide (including any animation or slide build)
Figure 9A:
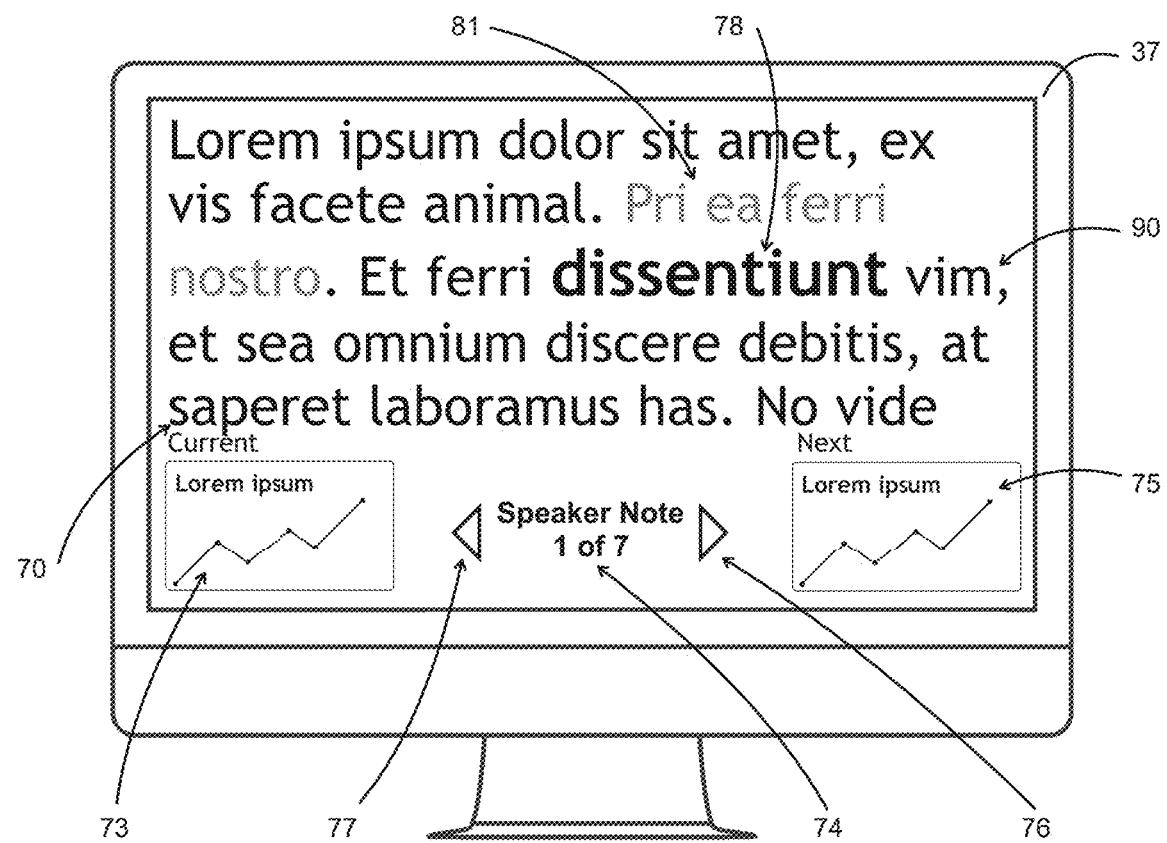
Figure 9B:
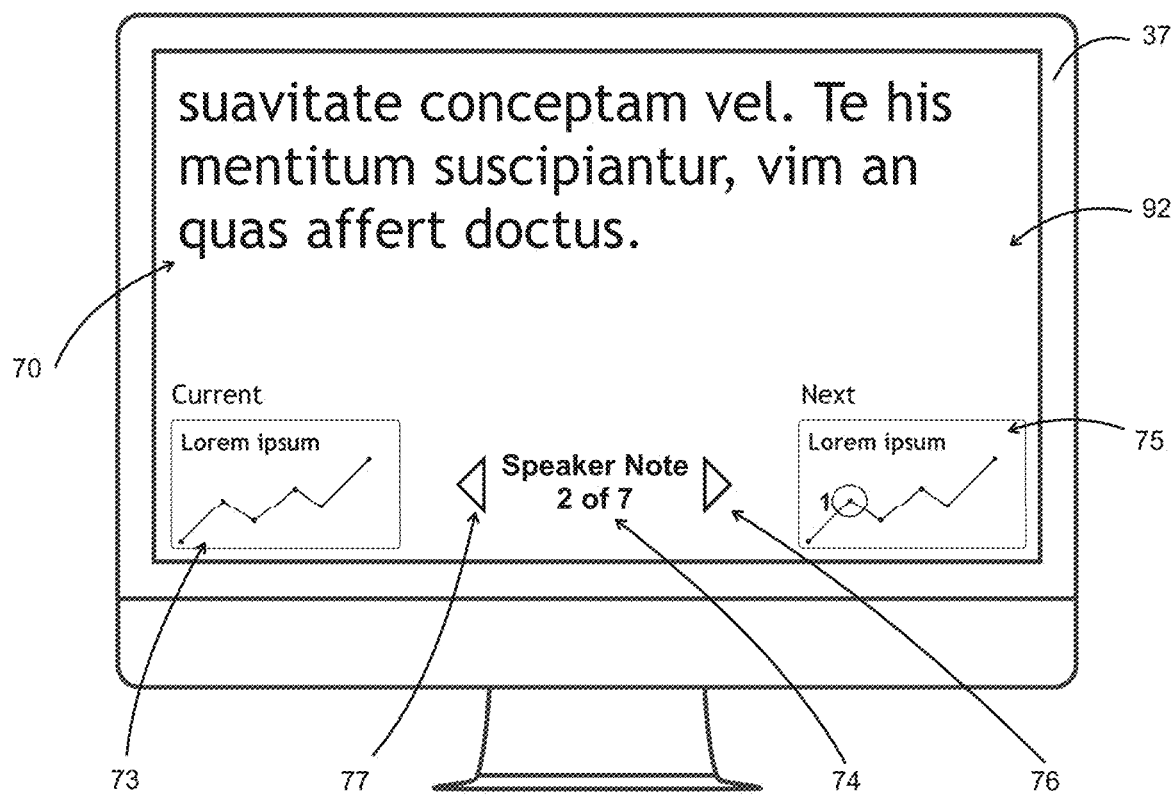
FIG. 9B is an illustration of the screens of computer displays, confidence monitors, or speaker notes pages monitors, each displaying to a speaker a speaker-notes-centric view of one of a plurality of pages of example speaker notes that are click-accessible, or keystroke-accessible, to the speaker as part of the system and method in accordance with one or more aspects of the invention, each monitor also displaying to the speaker the current slide and a next slide (including any animation or slide build)
Figure 9B:
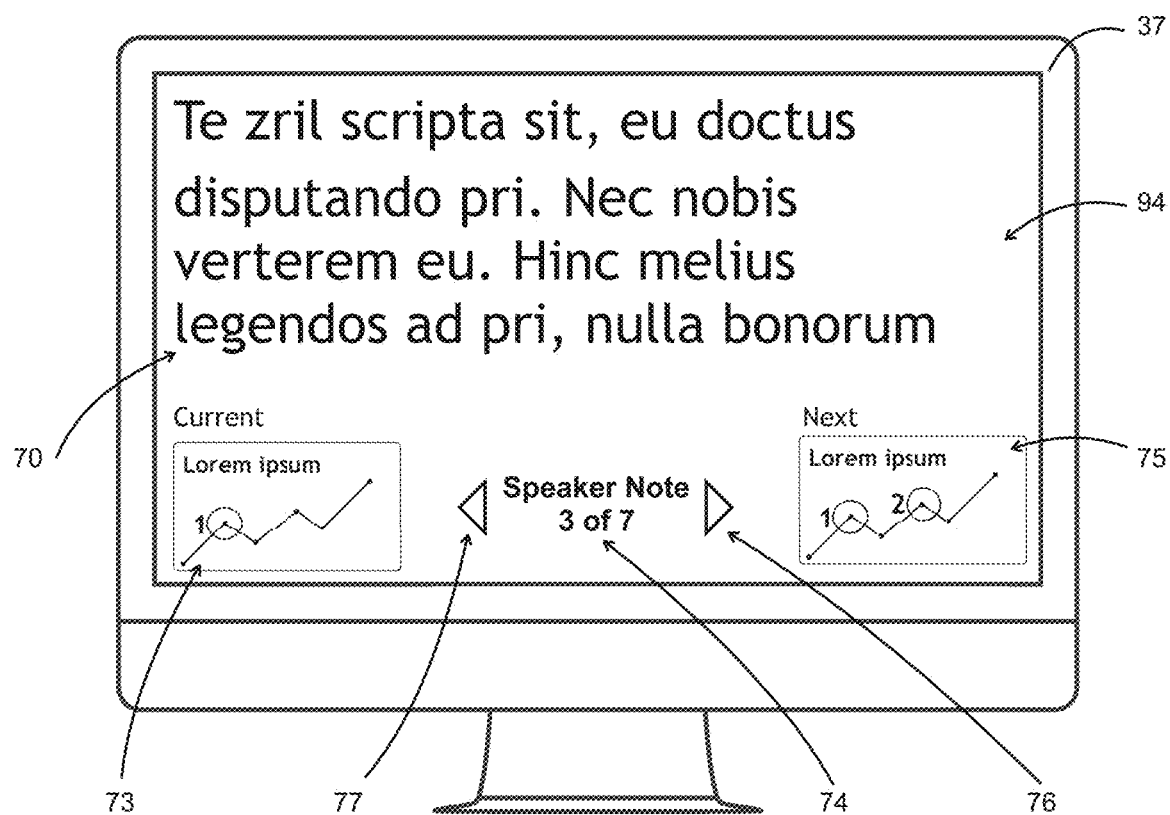

As illustrated in FIGS. 9A and B, there are automatically provided in this way, for example, 7 pages of speaker notes, as may for example be associated with an alternative specific larger speaker notes font size of 18-24 points. In this way, during an edit-type subsystem mode operation of a slides and speaker notes creation, editing, saving, and display system and method in accordance with one or more aspects of the invention, there is provided for automated division of speaker notes into a corresponding number of speakers notes pages per slide, depending on the font size and current quantity of speaker notes entered by a user of the system and method.

Thus, FIGS. 9A and B, taken together, provide illustrations of an on-screen graphic of an example slide 13 intended for an audience receiving a presentation and three illustrations of the screen of a computer display, confidence monitor, or speaker notes monitor 37, displaying to a speaker 30 (FIG. 7A) an enlarged speaker-notes-centric view of a plurality of pages 90, 92, 94 of example speaker notes 70 that are all click-accessible, button-accessible, or keystroke-accessible, to the speaker as part of the system and method in accordance with one or more aspects of the invention, the system and method also displaying to the speaker the current slide 73 and a next slide 75 (including any animation or slide build). It will be appreciated that since the speaker notes text is of a smaller font type in FIGS. 7A and B, and FIGS. 8A and B, there are only required division into three total pages of speaker notes, whereas in FIGS. 9A and B, there are required division into seven pages of speaker notes since the speaker notes text is of a larger font type as shown in the latter figures of FIGS. 9A and B.

Whether in FIGS. 7A and B, 8A and B, or 9A and B, if the monitor 37 is simply a computer screen accessible with a mouse used by a speaker/presenter 30, then advance arrow 76 may be used (i.e., clicked on with a mouse) to advance to a next page of speaker notes and that speaker note page's associated slide, animation, or build. And, of course, those skilled in the art will appreciate that this may be exactly what is happening on a monitor back stage that may be operated by a speaker's assistant. Thus, for example, as shown in FIG. 9A, clicking of arrow 76 may serve in advancing from speaker note 1 of 7 (speaker note 90), to speaker note 2 of 7 (speaker note 92), and later to speaker note 3 of 7 (speaker note 94), etc., to the end of the slide, and successive slides and speaker notes, until the end of the presentation. Or alternatively, clicking by the speaker 30 of reverse, or recession arrow 77, may serve to reverse from speaker note 3 of 7 (speaker note 94), to speaker note 2 of 7 (speaker note 92), and later to speaker note 1 of 7 (speaker note 90).

Figure 15:
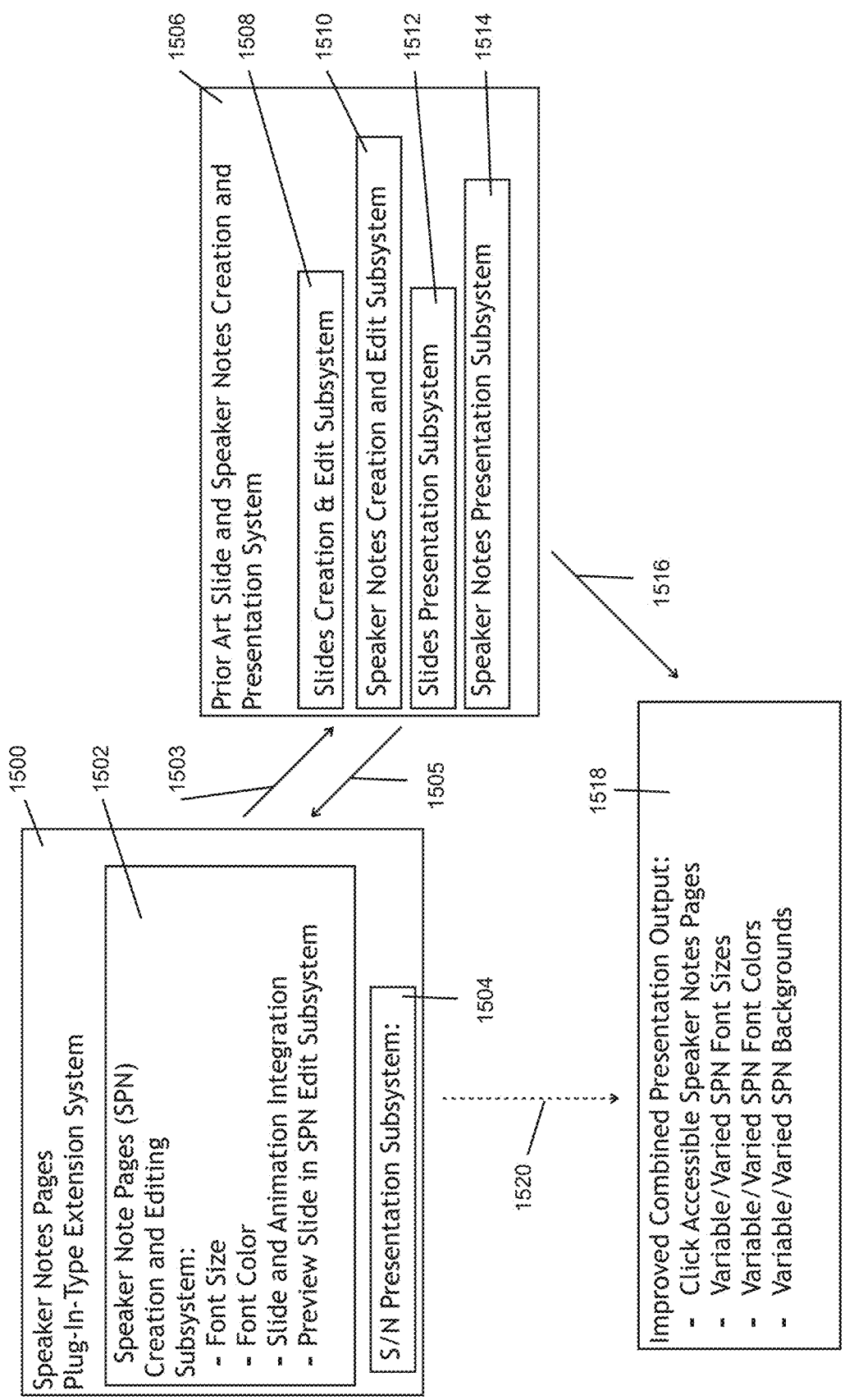
FIG. 15 is block diagram illustration showing architecture and features for a plug-in-type embodiment of the invention.
Figure 16:
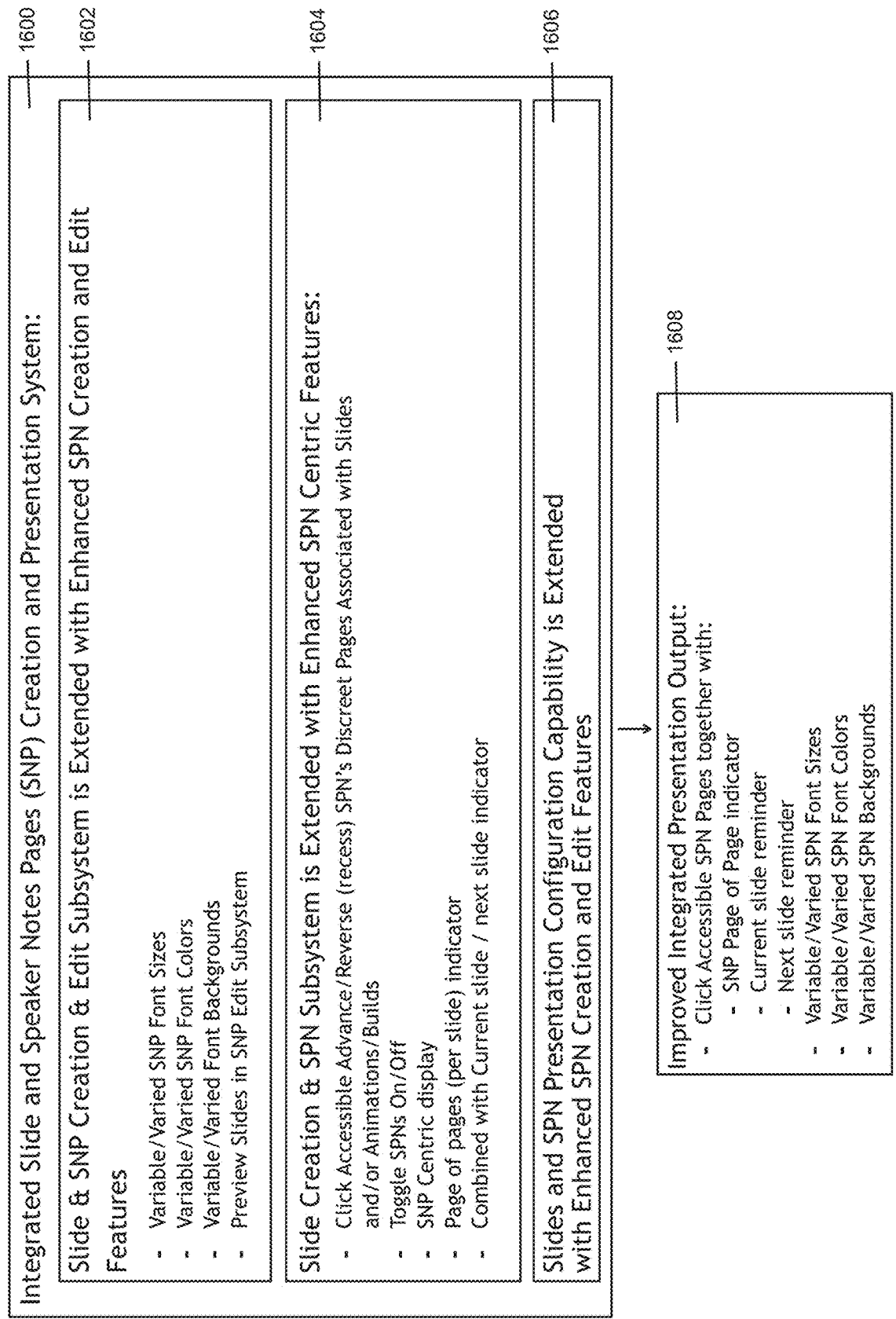
FIG. 16 is a block diagram illustration showing architecture and features for an integrated program embodiment of the invention.

Thus, as shown in FIGS. 7A and B, 8A and B, and 9A and B, there is provided an aspect of the invention wherein the system and method, whether embodied as a plug-in-type of system as shown and described below in connection with FIG. 15, or an integrated type of system as shown and described in connection with FIG. 16, provides for a plurality of discreet speaker notes pages per slide according to the font size of the particular speaker notes, the quantity (i.e., the number of characters or words) of speaker notes, and optionally a speaker notes page size designation.

In accordance with this aspect of the invention, the speaker 30 is enabled in being apprised of exactly where in the presentation the speaker is located, so that the speaker is less likely to become lost or confused. Thus, this aspect of the invention provides a great improvement over prior art slides and speaker notes creation, edit and display systems, where the speaker is required to scroll through the speaker notes, all while receiving from the system little, if any, indication of how long the speaker notes are, or how much given speaker note content is remaining for a given slide. And thus, of course, lends to potential confusion of the speaker during a presentation.

Figure 10A:
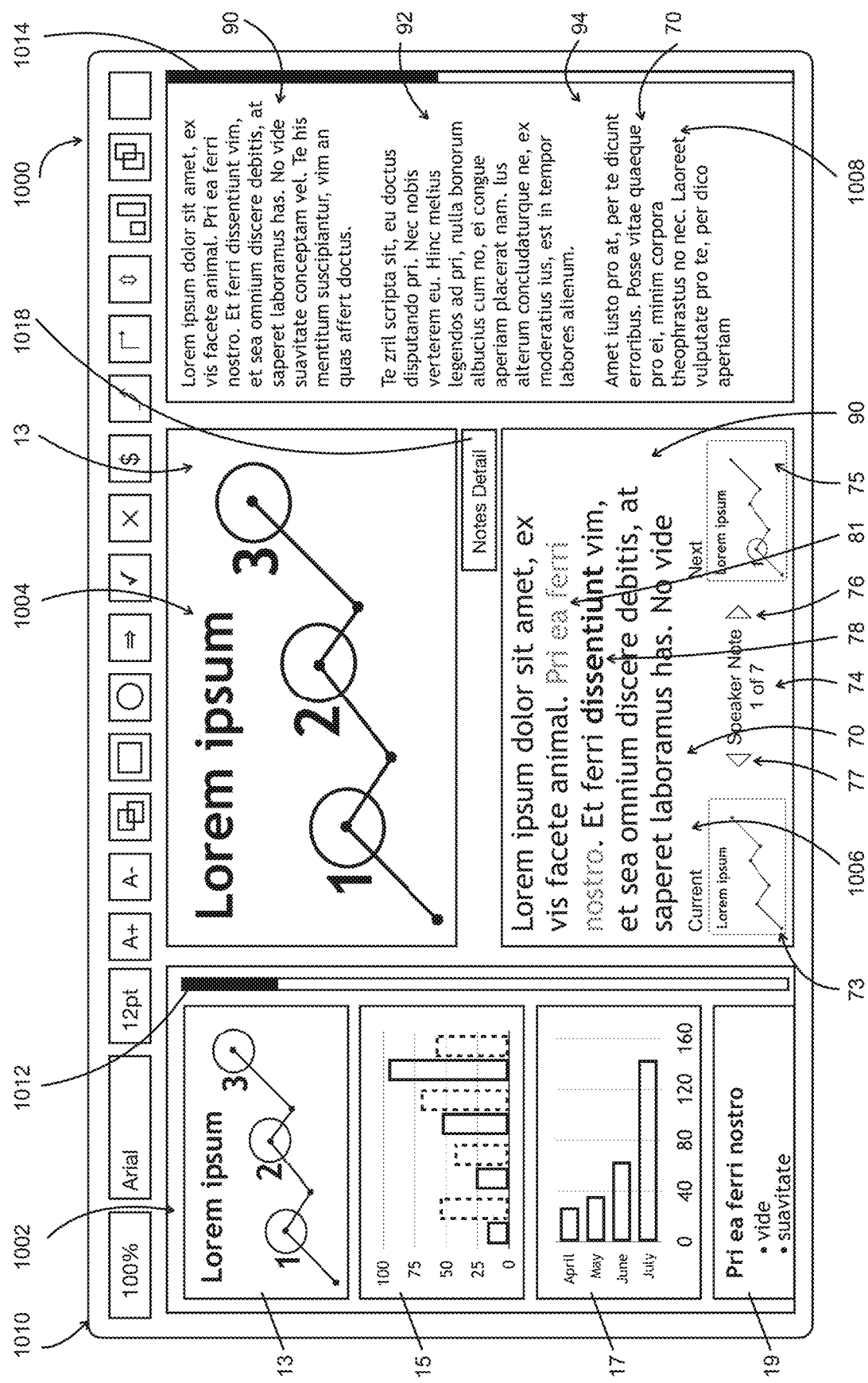
FIG. 10A is an illustration of an editing screen view in accordance with the system and method in accordance with one or more aspects of the invention, the editing screen view showing a scrollable slide sorting pane, a current slide editing pane, an associated speaker notes page editing pane, a speaker notes page text pane showing in scrollable fashion all speaker notes pages for the slide, and a speaker notes "Notes Detail" capability, all of which present material in true what-you-see-is-what-you-get (WYSIWYG) preview fashion.
Figure 10B:
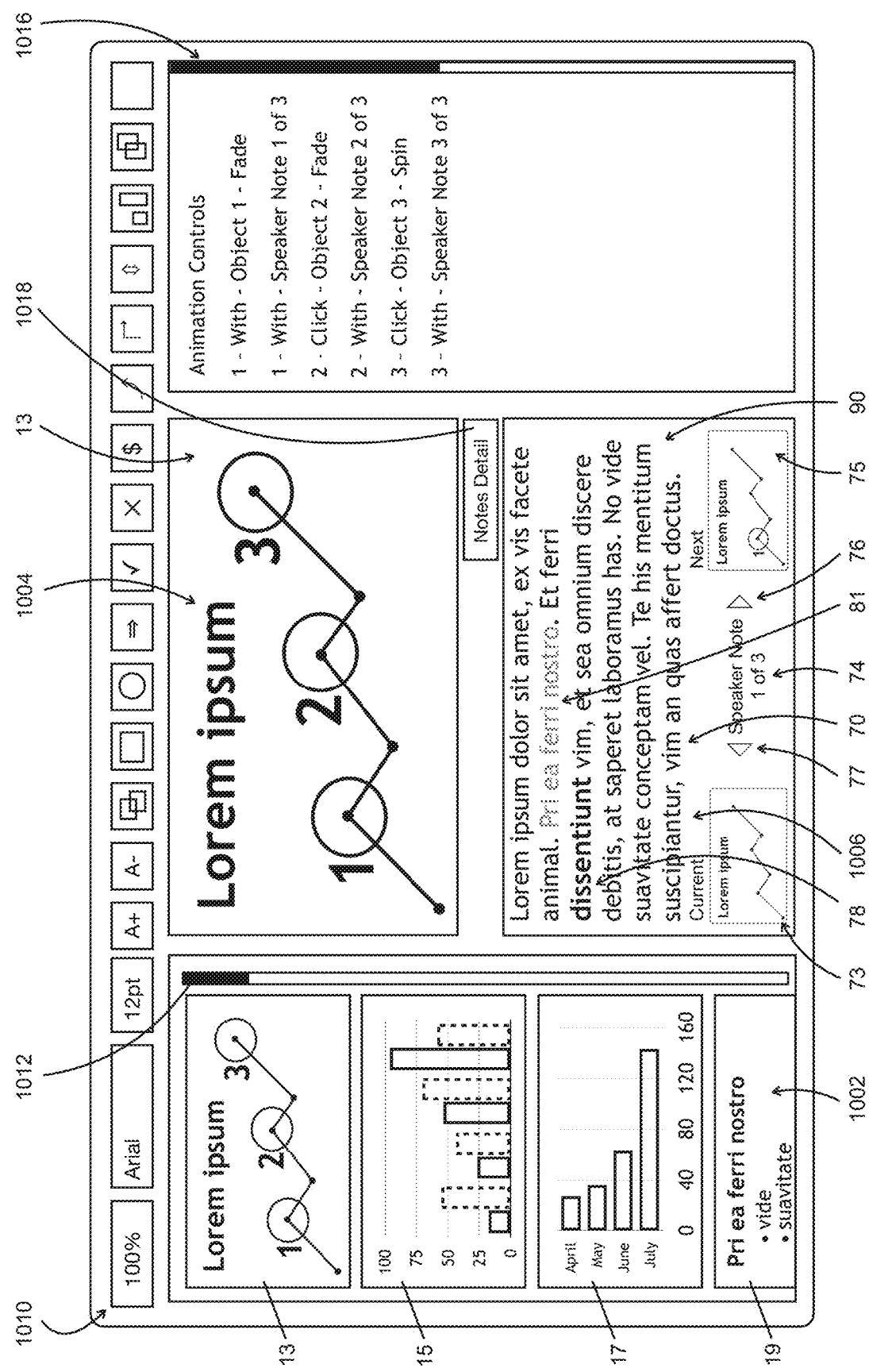
FIG. 10B is an illustration of an editing screen view in accordance with the system and method in accordance with one or more aspects of the invention, the editing screen view showing a scrollable slide sorting pane, a current slide editing and associated speaker notes pages editing pane showing larger font-size speaker notes and a correspondingly larger number of speaker notes pages, an animation selection and controls pane, and a speaker notes pages "Notes Detail" capability, all intended for use by a speaker, or a speaker's assistant, in preparing for a slide show presentation, and all of which present material in true what-you-see-is-what-you-get (WYSIWYG) preview fashion.
Figure 10C:
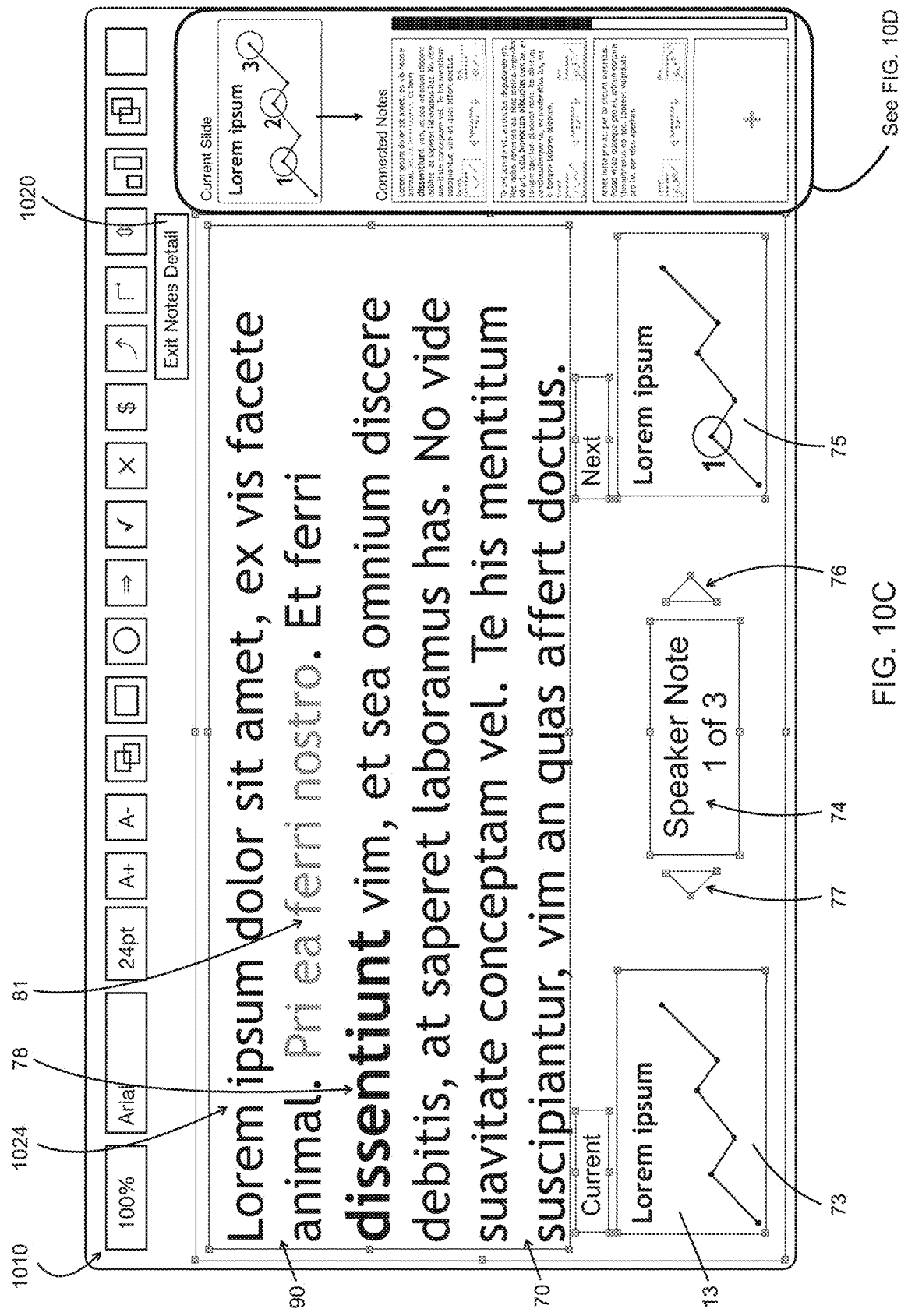
FIG. 10C is an illustration of a speaker notes pages detail, or preview, view of a configurable speaker notes editing screen view in accordance with the system and method in accordance with one or more aspects of the invention, the screen allowing for editing of speaker notes, and configuration and removal, if desired, as well as preview of sizes of the speaker notes pages pane, current slide, next slide, and other configurable presentation elements, there also being specified for further detailed view in FIG. 10D a detailed slide and speaker notes pages association and review pane.
Figure 10D:
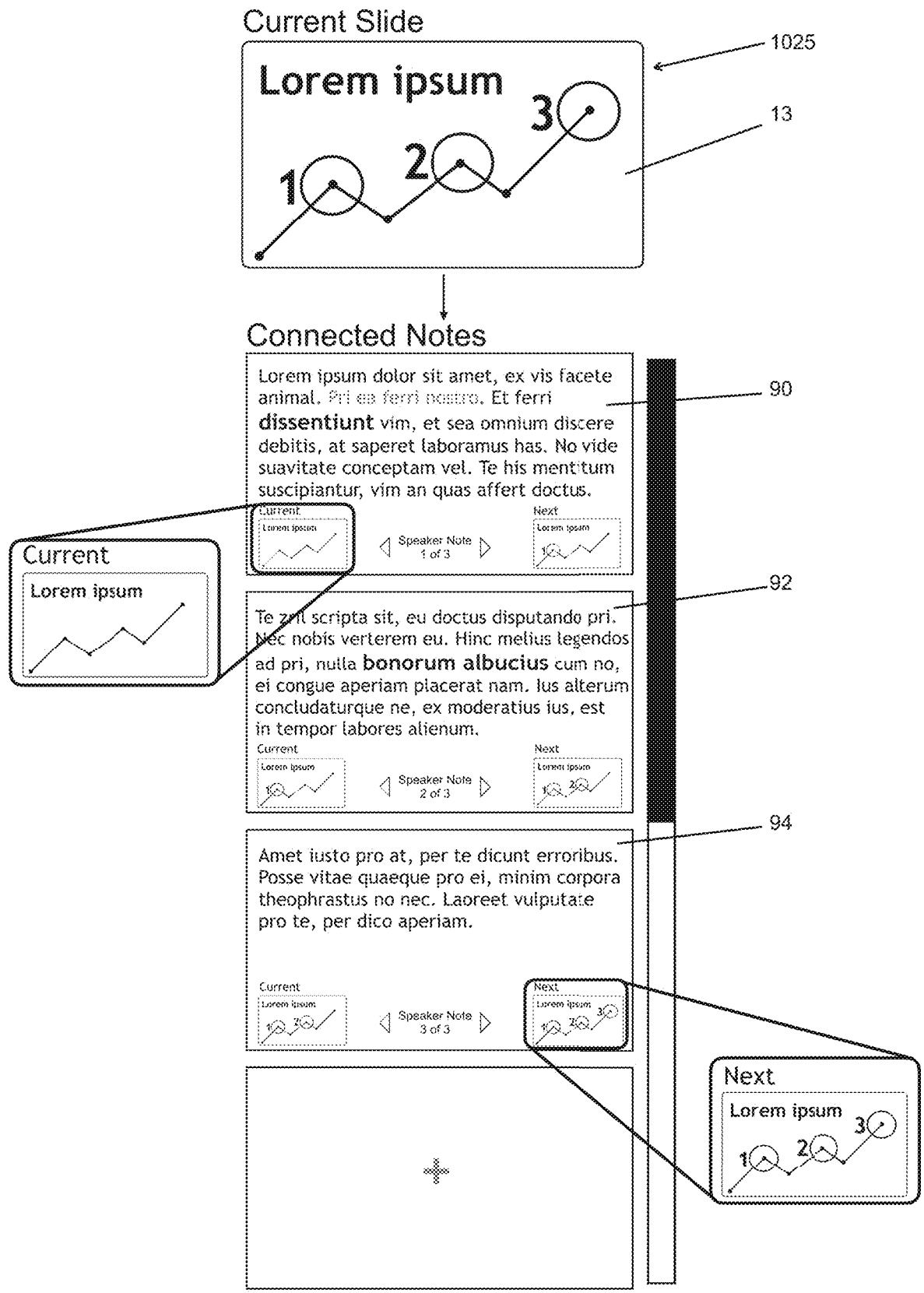
FIG. 10D illustrates a detailed view of the slide and speaker notes pages association and review pane of FIG. 10C, wherein users are enabled to view and change the layouts of speaker notes pages and the speaker note pages monitor configuration.

Referring now to FIGS. 10A-C, there are shown illustrations of a novel editing screen views, including editing screen view 1000 in FIG. 10A, in accordance with a preferred slides and speaker notes creation, editing, saving, previewing, formatting, and displaying system and method in accordance with one or more aspects of the invention (also known herein as "preferred slides and speaker notes system and method in accordance with the invention"). The editing screen view provides a scrollable slide sorting pane 1002, a current slide editing pane 1004 for slide 13 (build 3), an associated speaker notes editing pane 1006 showing speaker notes 70, and a speaker notes text pane 1008 showing all speaker notes 70 associated with the slide 13 and in scrollable fashion with scroll bar 1014.

As shown at tool bar 1010 in FIG. 10A, the editing subsystem of the preferred slides and speaker notes system and method in accordance with one or more aspects of the invention provides several formatting options to, for example, zoom in and out of a particularly selected pane, to insert new slides and speaker notes, to increase or decrease font size of slide and speaker note text, to advance to a next slide or speaker note, to insert a text box or other object in a slide or speaker notes, to insert new shapes in a slide or speaker note, to format text of a slide or speaker note, to delete a slide or speaker note text, etc. Unlike prior slides and speaker notes creation, editing, saving, formatting, and display systems and methods, the edit subsystem of the present invention allows for selecting of a portion of speaker notes text and changing the font size, bold/italic, and/or font color thereof as shown at 78, 81. As a user changes the font size of speaker notes 70 associated with a particular slide, the edit mode of the speaker notes creation, editing, saving previewing, formatting, and saving subsystem (also referred to herein as the "edit subsystem") automatically creates for later display to the speaker a plurality of speaker notes pages 90, 92, 94.

The slides preview pane 1002 provides a view of slides 13, 15, 17, 19 and is scrollable with the use of scroll bar 1012 to enable a view of all slides in a presentation. Each slide 13, et. seq., is selectable in the edit subsystem, and upon such selection, the slide is featured in slide editing pane 1004, along with a page 90 of the slide's associated speaker notes 70 in speaker notes editing pane 1006. As with standard slide editing modes in prior art systems, the system and method of the present invention allows editing of slides in the slides editing pane 1004, but unlike the prior art, the present invention also provides association of certain slides with certain discreet and multiple pages of speaker notes text wherein there is provided the ability to associate a plurality of speaker notes pages with a given slide. Thus, for example, as shown in FIG. 10A, slide 13 is associated first with speaker notes page 90 (also known as, Speaker Note 1 of 7 for that slide), one of 7 speaker notes pages associated with that slide.

Also in the speaker notes editing pane 1006, there are displayed a forward (advance) arrow 76 and a back (reverse, recess) arrow 77, together with a page of pages indicator 74 for facilitating navigation to and from a particular speaker notes page, e.g., from page 90 to pages 92 and 94, or in reverse from speaker notes page 94 to pages 92 and 90.

Speaker notes text 70 may be added in the speaker notes editing pane 1006 or 1008 by clicking a cursor in the editing pane and beginning to type therein. Edits to speaker notes text 70, may be made by selecting portions of text and changing the font size, font color, or highlight of the selected text, whether with the use of the tool bar 1010, or by using menus and keyboard commands as known in the art. As more and more speaker notes text 70 is added to the speaker notes editing pane 1006 (and/or 10008), the speaker notes text 70 is automatically broken into a plurality of separate speaker notes pages, and accordingly the page of pages indicator 74 is updated to reflect each additional new page of speaker notes text 70 added. Still further, text may be copied from other locations and pasted into either of the text editing panes 1006 or 1008.

Then, as speaker note text 70 is added, and formatted to different sizes for different portions of text as newly facilitated by the present invention, and/or designated with a certain font color for the same or different portions of text, and/or highlighted for the same or different portions of text, the text is displayed in the text editing pane 1006 in true what-you-see-is-what-you-get (WYSIWYG) preview fashion to assist the user with editing and evaluating the creation of speaker notes text. Furthermore, this WYSIWYG preview capability is repeated, whether the user is in FIG. 10A, 10B, or 10C.

Further, in the speaker notes editing pane 1006 there are displayed current slide 73 and next slide 75 indicators (reminders) to assist with editing of slides and navigation to various points of a presentation within the subsystem. Thus, the slides and speaker notes system and method of the present invention allows for creation of, navigation among, and editing of speaker notes pages, e.g., pages 90, 92, 94, with the use of the aforementioned editing, formatting and navigation tools in tool bar 1010 and within the speaker notes editing panes 1006 and 1008.

Thus, for a particular slide, for example slide 13 shown in FIG. 10A, there is shown in a speaker notes overview mode of the edit subsystem of the slides and speaker notes system and method of the invention, wherein a discreet page 90 of speaker notes text 70 is made available for edit and formatting.

As part of the editing subsystem of the slides and speaker notes system and method disclosed herein in accordance with the present invention, there is provided in speaker notes overview and alternate input/editing pane 1008, for the purpose of providing continuous scrollable pages 90, 92, 94 of speaker notes text 70. This pane 1008 also allows the user to get a quick overview of all the speaker notes content accessible with the scroll bar 1014.

Similar to FIG. 10A, FIG. 10B is an illustration of an alternate aspect and screen of the novel editing screen view 1000 in accordance with the slides and speaker notes system and method in accordance with one or more aspects of the invention. The editing screen view 1000 of this FIG. 10B shows an animation controls pane 1016. The animation controls pane 1016 allows association of various animations and/or slide builds, e.g., such as are shown at the circled numbers 1, 2, and 3, in slide editing/display pane 1004. Thus, as shown by the slide editing and display pane 1004, and the animation controls pane 1016, each animation control is associated with a slide and a speaker notes page. Thus, for example, a first slide 13 is associated with three different animations as listed in the animation controls pane. The first such animation is listed as "1—With—Object 1—Fade" (meaning that the first circled 1 of slide 13 will fade into view and be displayed to the audience and speaker as a first animation together with Speaker Note 1 of 3, as further shown by the second line of text in the animation controls pane listing "1—With—Speaker Note 1 of 3". Similarly, the second animation is listed as "2—Click— Object 2—Fade" (meaning that the second animation, the circled 2 of the slide 13, will upon receipt by the system of a click, fade into view and be displayed to the audience and speaker as a second animation together with Speaker Note 2 of 3, as further shown by the $4^{th}$ line of text in the animation controls pane listing "2—With—Speaker Note 2 of 3". Still further, the third animation is listed as "3—Click—Object 3—Spin" (meaning that the circled 3 of the slide 13 will, upon receipt by the system of a click, spin and be displayed to the audience and speaker as a third amination together with Speaker Note 3 of 3, as further shown by the $6^{th}$ line of text in the animation controls pane listing "3—With—Speaker Note 3 of 3". In this way, the user is enabled in associated particular animations/builds with particular speaker notes pages associated, in turn, with a particular slide (e.g., slide 13) of the presentation. This aspect of the invention is further shown and described in connection with FIG. 14B, showing how slides, speaker notes, and animations/builds are associated with user clicks for display to a speaker 30 during a presentation.

Referring now to FIGS. 10C and D, there are shown an illustration of a speaker notes detail view of a speaker notes editing screen view in accordance with the slides and speaker notes system and method in accordance with one or more aspects of the invention, the screen allowing for configuration and preview of sizes of the speaker notes pane, current slide, next slide, and other configurable presentation elements.

Further, in accordance with one or more aspects of the slides and speaker notes system and method in accordance with the invention as shown on this notes detail screen of the edit subsystem shown in FIGS. 10C and D, it can be seen that certain of the speaker notes 70, i.e., speaker notes page 90, may be enlarged to 24 pt text, and certain of the text 81 may be provided in a different color. Still further, this aspect of the invention allows for configuration of the size of view of each of the centralized speaker notes monitor view 1024, the current slide indicator (reminder) 73, the next slide indicator (reminder) 75, the forward button 76, the reverse button 77, and the page of pages indicator 74. In this notes detail screen, there is provided a slide association pane 1025 wherein the user is enabled in viewing in scrollable fashion all speaker notes 70, e.g., speaker notes pages 90, 92, 94, together with the speaker monitor screen view (including current/next slides 73, 75, page of pages indicator 74, and advance/reverse arrow 76, 77 configuration, associated with the selected current slide 13. In this way, the user is able to view in summary fashion very quickly how the speaker notes monitor will look for each click-accessible stage and page of the presentation.

In accordance with an aspect of the invention, the slides and speaker notes system and method provides for speaker/ user/assistant click access to discreet pages of speaker notes. In accordance with this aspect of the invention, a click of an advance button on a remote-control device 29 would perform, or alternatively signal to a back-stage assistant 32, the same action of advancing a speaker notes page, and/or a slide and/or an animation/build as further shown and described below in connection with FIGS. 14A and B. This same functionality may also be provided by clicking a computer key press (i.e., a key), or a mouse click on advance button 76 on the speaker notes monitor screen 37.

Also, in accordance with this aspect of the invention, a click of a reverse (recess) button on the remote-control device 29 would perform, or alternatively signal to a back-stage assistant 32, the same action of reversing a speaker notes page, and/or a slide and/or an animation/build. This same functionality may also be provided by clicking a computer key press (i.e., a F key), or it may ensue from a mouse click on the reverse button 77 on the speaker notes monitor screen 37. In this way, speakers 30 are enabled in simply navigating their presentation slides, and associated speaker notes, with ease, and wherein all of the slides, speaker notes pages, and animations/builds, are automatically kept in sync. This aspect of the invention minimizes the likelihood associated with prior art systems that speakers will become lost, or out of sync, between their speaker notes pages and their slides of their presentations, and this in turn leads to more effective presentations.

Also, in accordance with one or more aspects of the invention, it will be seen that a particular speaker may enlarge only that speaker's portion of the speaker notes, so as to be able to see them more easily for example, whereas other speaker notes for other speakers may be left smaller in accordance with that other speaker's comfort level with having smaller speaker notes.

Figure 11A:
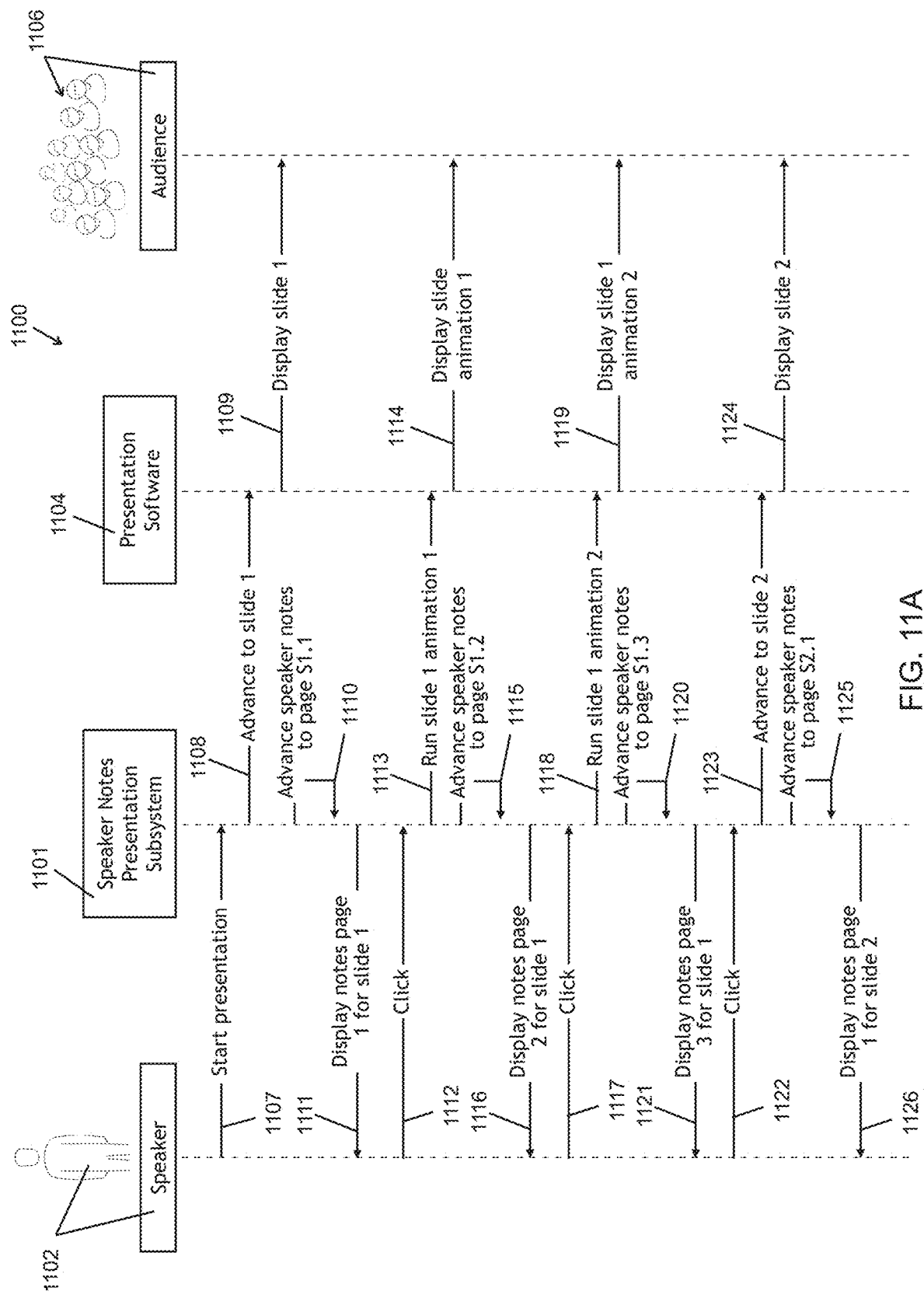
FIG. 11A is a logic control diagram showing the interaction and control of operations of a portion of the system and method in accordance with one or more aspects of the present invention relative to advancement of speakers notes pages and presentation slides among various presentation entities and programs.

Referring to FIG. 11A, there is shown a logic and control diagram 1100 showing the interaction and control of operations of a portion of the system and method 1101 of the invention allowing click-operating of presentation slides and associated speaker notes pages, as part of a slide show with a remote-control device, a mouse click, or a computer keystroke, in accordance with one or more aspects of the present invention. FIG. 11A shows interaction and control of operations of one or more aspects of the invention system portion 1101 relative to various presentation entities, such as a speaker 1102, presentation software 1104, and an audience 1106. Thus, FIG. 11A shows such interaction and control of operations by the system and method in accordance with a portion and aspect of the system and method 1101 during processing of multiple speaker note clicks for a plurality of slides.

As a speaker 1102 begins the presentation at 1107 (for example by opening the slide show presentation subsystem), the speaker notes presentation subsystem advances to slide 1 and sends a control command at 1108 to the presentation software 1104 to display slide 1. Responsive to this command 1108, the presentation software 1104 displays slide 1 to the audience 1106 as shown at 1109, and the speaker notes presentation subsystem 1101 advances and displays to the speaker 1102 speaker notes page 1 for slide 1 (S1.1) as shown at 1110 and 1111.

After the speaker 1102 (or back-stage assistant) clicks (or mouses) on an advance button as shown at 1112, the speaker notes presentation subsystem 1101 runs slide 1 animation 1 and sends a control command to the presentation software to display slide 1 animation 1 to the audience 1106 as shown at 1113. Responsive to this command 1113, the presentation software 1104 displays slide 1 animation 1 to the audience 1106 as shown at 1114. Further, the speaker notes presentation subsystem 1101 advances and displays to the speaker 1102 speaker notes page 2 for slide 1 (S1.2) as shown at 1115 and 1116.

Then, after the speaker 1102 (or back-stage assistant) clicks (or mouse clicks) on an advance button as shown at 1117, the speaker notes presentation subsystem 1101 is prompted to run slide 1 animation 2 as shown at 1118. Responsive to this command 1118, the presentation software 1104 displays slide 1 animation 2 to the audience 1106 as shown at 1119. Further, the speaker notes presentation system 1101 advances and displays to the speaker 1102 speaker notes page 3 for slide 1 (S1.3) as shown at 1120 and 1121.

After the speaker 1102 (or back-stage assistant) clicks (or mouse clicks) on an advance button as shown at 1122, the speaker notes presentation system 1101 is prompted to send a control command 1123 to the presentation software 1104 two advance to slide 2. Responsive to this command 1123, the presentation software 1104 displays slide 2 to the audience 1106 as shown at 1124. Further, the speaker notes presentation subsystem 1101 advances and displays to the speaker 1102 speaker notes page 1 for slide 2 (S2.1) as shown at 1125 and 1126.

Figure 11B:
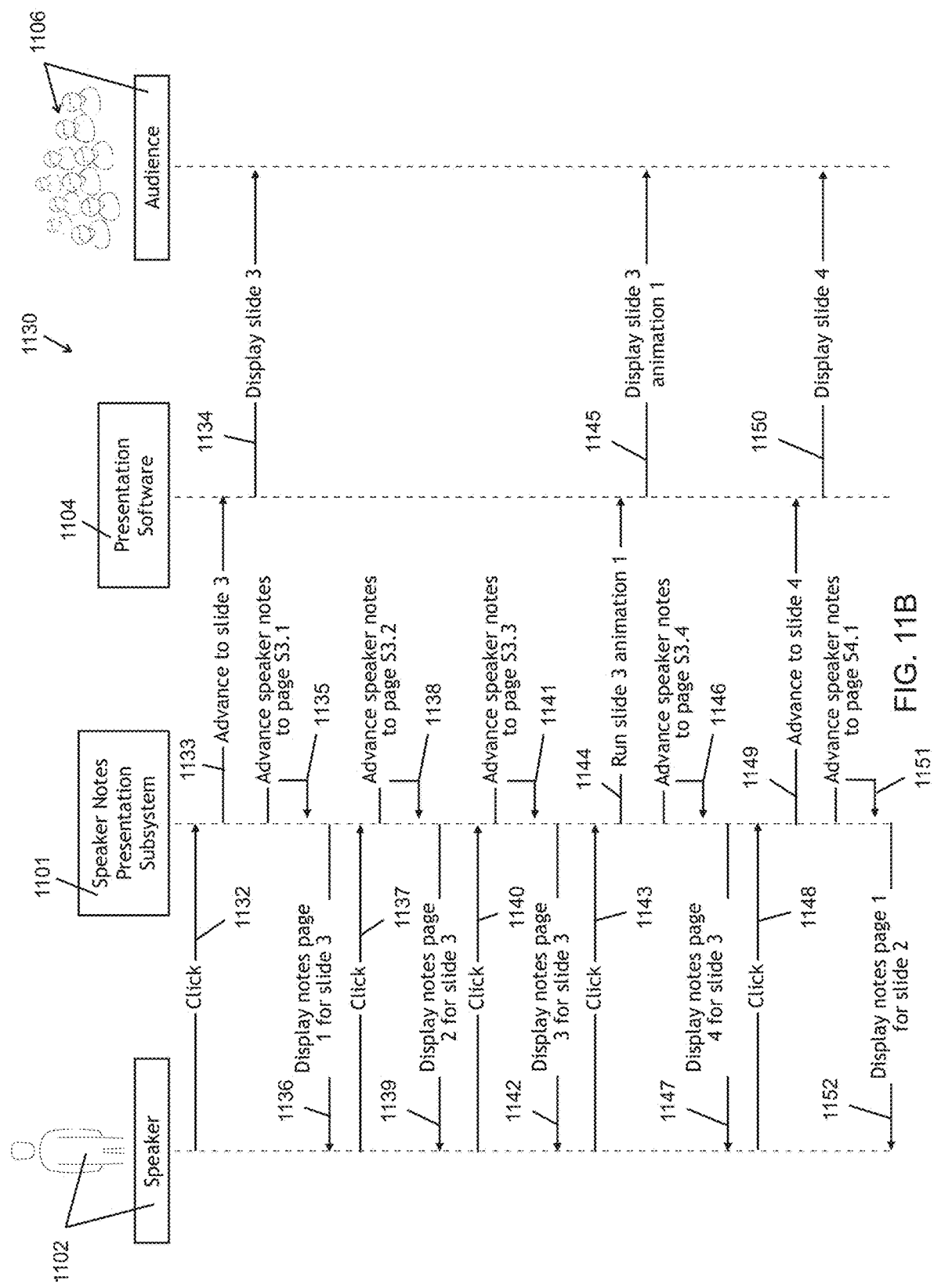
FIG. 11B is a logic control diagram showing the interaction of control of operations of a portion of the system and method in accordance with one or more aspects of the invention relative to advancement of speaker notes pages, slides, animations and slide builds among various presentation entities and programs.

Referring now to FIG. 11B, there is shown a continuation logic and control diagram 1130 of the logic and control diagram 1100 shown in FIG. 11A. Logic and control diagram 1130 begins with a remote click (mouse click) as shown at 1132, which in turn prompts the speaker notes presentation subsystem 1101 to advance to slide 3 as shown at 1133 and to command the presentation software 1104 to display slide 3. Responsive to this command 1133, the presentation software 1104 displays slide 3 to audience 1106 as shown at 1134. Further, speaker notes presentation system 1101 also advances and displays to the speaker 1102 speaker notes page 1 for slide 3 (S3.1) as shown at 1135 and 1136.

Then, as the speaker 1102 clicks, or mouse clicks, as shown at 1137, the speaker notes presentation subsystem 1101 advances, as shown at 1138, the speaker notes page to page S3.2 (meaning slide 3 speaker notes page 2) and displays speaker notes page 2 for slide 3 to the speaker as shown at 1138 and 1139. Note that in this case a slide has not advanced responsive to the most recent click, nor has an animation happened, since there was neither a new slide nor an animation or build. But rather the click at 1137 simply caused the speaker notes presentation subsystem to advance the next speaker note for the speaker 1102 to see.

Next, as the speaker 1102 clicks, or mouse clicks again, as shown at 1140, the speaker notes presentation subsystem 1101 advances, as shown at 1141, to the next speaker notes page 3 for slide 3 (S3.3) and displays, as shown at 1142, that speaker notes page to the speaker. Again, as with the previous click 1137, with this click 1140 there is no animation or new slide, and the click only advances and displays the next speaker notes page (S3.3) for view by the speaker 1102. This illustrates one way that the system in accordance with one or more aspects of the invention enables click access to a plurality of speaker notes pages associated with a single slide, in a manner unlike prior-art systems.

Upon receiving another click, as shown at 1143, the speaker notes presentation subsystem 1101 advances to slide 3 animation 1, as shown at 1144, and the subsystem commands the presentation software 1104 to display the animation (animation 1 of slide 3). Responsive to this command 1144, the presentation software displays slide 3 animation 1 to the audience 1106 as shown at 1145. Further, the speaker notes presentation subsystem 1101 advances and displays to the speaker 1102 the speaker notes page 4 for slide 3 (S3.4) as shown at 1146 and 1147.

Thereafter, when the speaker 1102 clicks as shown at 1148, the speaker notes presentation subsystem 1101 advances to slide 4 and commands, as shown at 1149, the presentation software 1104 to display slide 4 to the audience 1106. Responsive to this command at 1149, the presentation software 1104 displays slide 4 to the audience 1106 as shown at 1150. Further, the speaker notes presentation subsystem 1101 advances to page 1 of slide 4 (S4.1) as shown at 1151 and displays speaker notes page 1 to the speaker 1102 as shown at 1152.

Figure 11C:
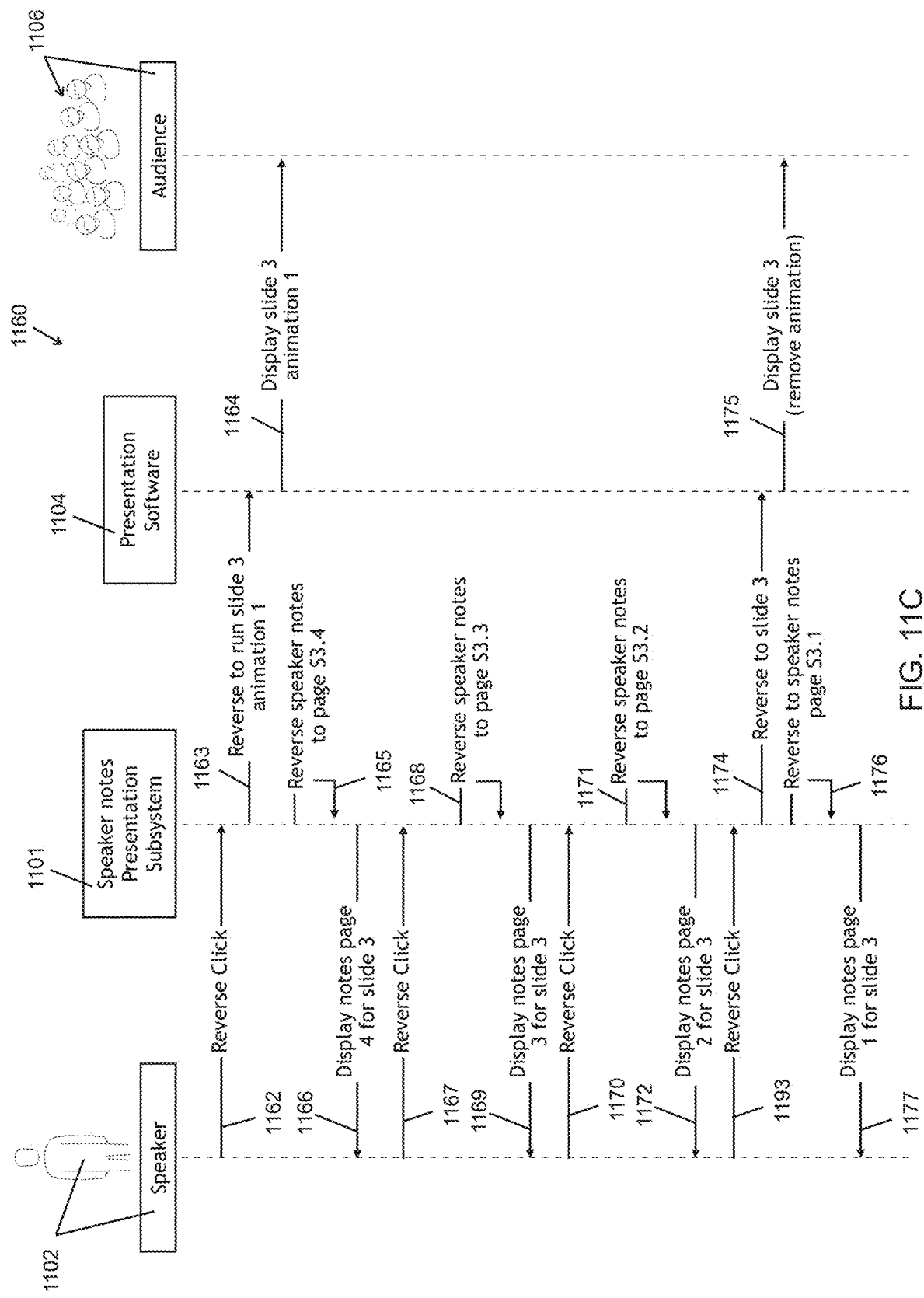
FIG. 11C is a logic control diagram showing the interaction of the control of operations of a portion of the system and method in accordance with one or more aspects of the invention relative to reversing, or recession, of speaker notes pages, slides, animations and slide builds among various presentation entities and programs.

Referring now to FIG. 11C, there is shown a continuation logic and control diagram 1160 of the logic and control diagrams 1100 and 1130 shown in FIGS. 11A and 11B. Logic and control diagram 1160 of FIG. 11C begins with a remote reverse click (mouse click or the reverse button— e.g., button 77) as shown at 1162, which in turn prompts the speaker notes presentation subsystem 1101 to reverse to slide 3 animation 1 and to command (at 1163) the presentation software 1104 to display slide 3 animation 1 to the audience 1106. Responsive to this command 1163, the presentation software 1104 displays slide 3 animation 1 to the audience 1106 as shown at 1164. Further, speaker notes presentation system 1101 also advances and displays to the speaker 1102, speaker notes page 4 for slide 3 (S3.4) as shown at 1165 and 1166 respectively.

Then, as the speaker 1102 reverse clicks, or reverse mouse clicks, as shown at 1167, the speaker notes presentation subsystem 1101 reverses, as shown at 1168, the speaker notes page to page S3.3 (meaning slide 3 speaker notes page 3) and displays speaker notes page 3 for slide 3 to the speaker as shown at 1169. Note that in this case that another previous slide has not been displayed responsive to the most recent reverse click, nor has an animation happened, since there was neither a previous slide nor a previous animation or build. Rather the click at 1167 simply reversed to the previous speaker note (speaker notes page 3 for slide 3) for the speaker 1102 to see.

Next, as the speaker 1102 reverse clicks, or reverse mouse clicks again, as shown at 1170, the speaker notes presentation system 1101 again only reverses, as shown at 1171, to the previous speaker notes page (speaker notes page 2 for slide 3, or S3.2) and displays, as shown at 1172, that speaker notes page to the speaker. Again, as with the previous click, there being no previous animation or previous slide, the click at 1170 only reverses and displays the next speaker notes page for view by the speaker 1102. This is one way that the system in accordance with one or more aspects of the invention enables reverse click access to a plurality of speaker notes pages associated with a single click and in a manner unlike prior-art systems.

Thereafter, when the speaker 1102 reverse clicks as shown at 1193, the speaker notes presentation system 1101 reverses to slide 3 (without animation 1) and commands, as shown at 1174, the presentation software 1104 to display slide 3 to the audience 1106. Responsive to this command at 1149, the presentation software 1104 displays slide 3 (i.e., including removing animation 1) to the audience 1106, as shown at 1175. Further, the speaker notes presentation system 1101 reverses to speaker notes page 1 for slide 3 (S3.1), as shown at 1176, and displays speaker notes page 1 to the speaker 1102, as shown at 1177.

Thus, in accordance with an aspect of the invention, there is shown in FIGS. 11A-11C command and control by a speaker notes presentation system 1101 embodiment, wherein the system is designed to control the presentation software 1104 for certain aspects of indirectly presenting and displaying information to an audience 1106, but controlling directly the management of, and display of, speaker notes to the speaker 1102, as further shown in connection with a plug-in-type system architecture as shown and described further below in connection with FIG. 15. Of course, it will be appreciated by those skilled in the art that this is just one way of accomplishing such command and control. For example, such command and control may be also accomplished by way of an integrated architecture as shown and described further below in connection with FIG. 16.

Figure 12A:
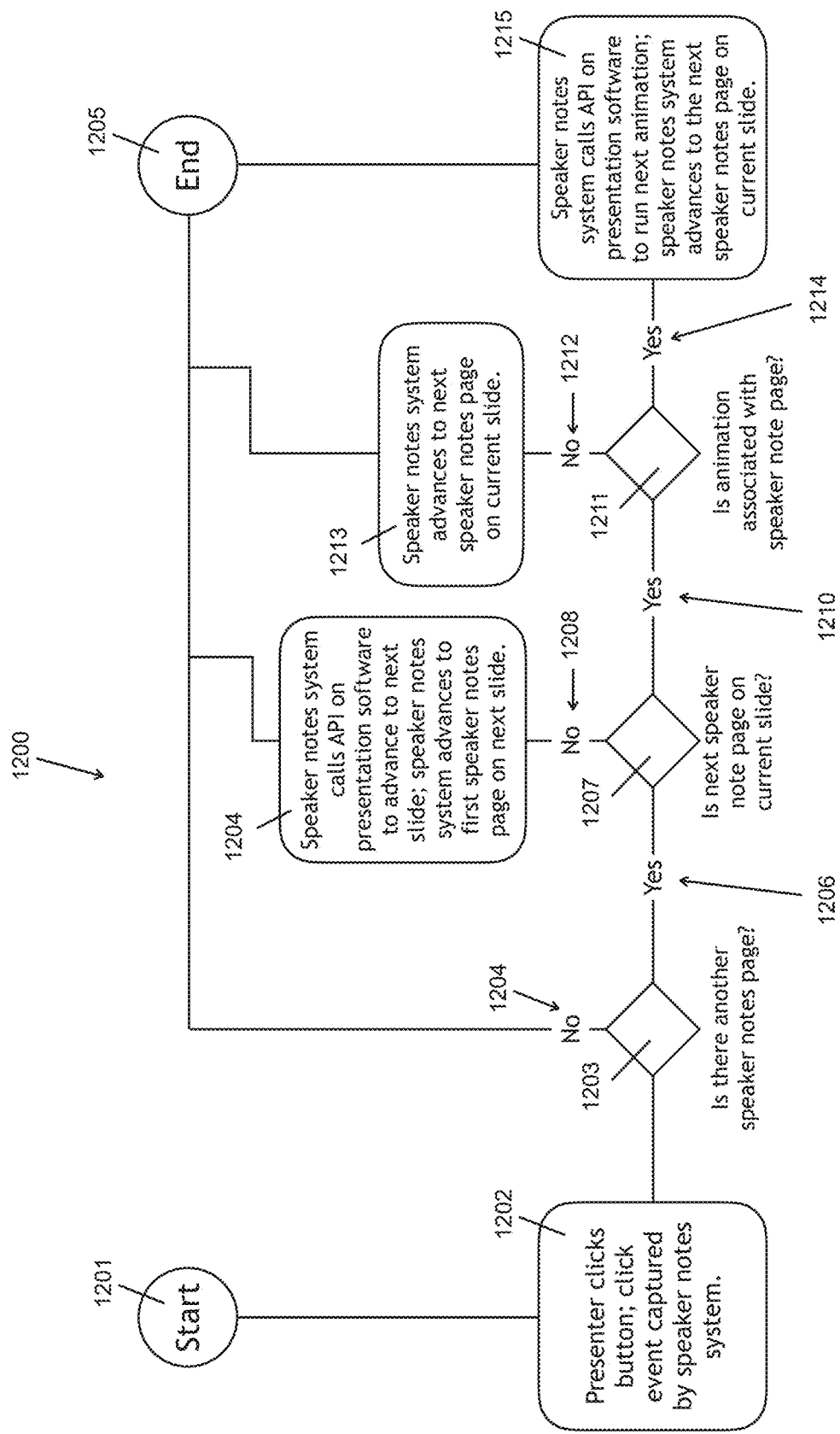
FIG. 12A is a flow chart diagram showing the interaction, control and processing of a per-click program control protocol as part of a system and method relating to presenting speaker notes pages relative to a corresponding slide and/or animation, or build, responsive to a speaker's click, in accordance with one or more aspects of an embodiment of the present invention.

Referring now to FIG. 12A, there is provided a flow chart diagram showing the interaction, control and processing of a per-click program control protocol 1200 as part of the system and method for creating, editing, saving, formatting and displaying to an audience and a speaker, and providing advancing of a speaker notes page relative to any corresponding slide and/or animation/build, responsive to a speaker click, in accordance with one or more aspects of an embodiment of the present invention.

The per-click program control protocol 1200 is shown as starting, or restarting, at 1201 and capturing, by the speaker notes system, a presenter click event as shown at 1202. The per-click program control protocol 1200 determines at decision diamond 1203 whether there is another speaker notes page in the current presentation. If not, as shown at 1204, then the protocol 1200 ends at 1205. If so, as shown at 1206, then the protocol 1200 determines at decision diamond 1207 whether the next speaker notes page is for the current slide. If not, as shown at 1208, the speaker notes system calls an application programming interface (API) on the presentation software to advance to the next slide in order to display the slide to the audience, and meanwhile, the speaker notes system advances to the first note on that next slide, as shown at 1204. Then, the protocol 1200 ends at 1205. If, however, responsive to decision diamond 1207, the protocol determines that the next speaker note is on the current slide, as shown at 1210, then the protocol 1200 next determines whether an animation or build is associated with the current speaker notes page as shown at decision diamond 1211.

If, as determined at decision diamond 1211, there is no animation or build associated with the current speaker notes page as shown at 1212, then the speaker notes system advances to the next speaker notes page for the current slide as shown at 1213 and the protocol ends at 1205. If, however as determined at decision diamond 1211, there is an animation or build associated with the current speaker notes page as shown at 1214, then the speaker notes system calls the API on the presentation software as shown at 1215 to execute and display the next animation/build, and the speaker notes system advances to the next speaker notes page for the current slide (including the animation/build), also as shown at 1215, and the protocol 1200 ends as shown at 1205. This per-click protocol allows the speaker notes system to control display of speaker notes pages to a speaker, and to control, albeit indirectly in accordance with a plug-in-type embodiment, display of associated slides and animations, or builds, to an audience.

Figure 12B:
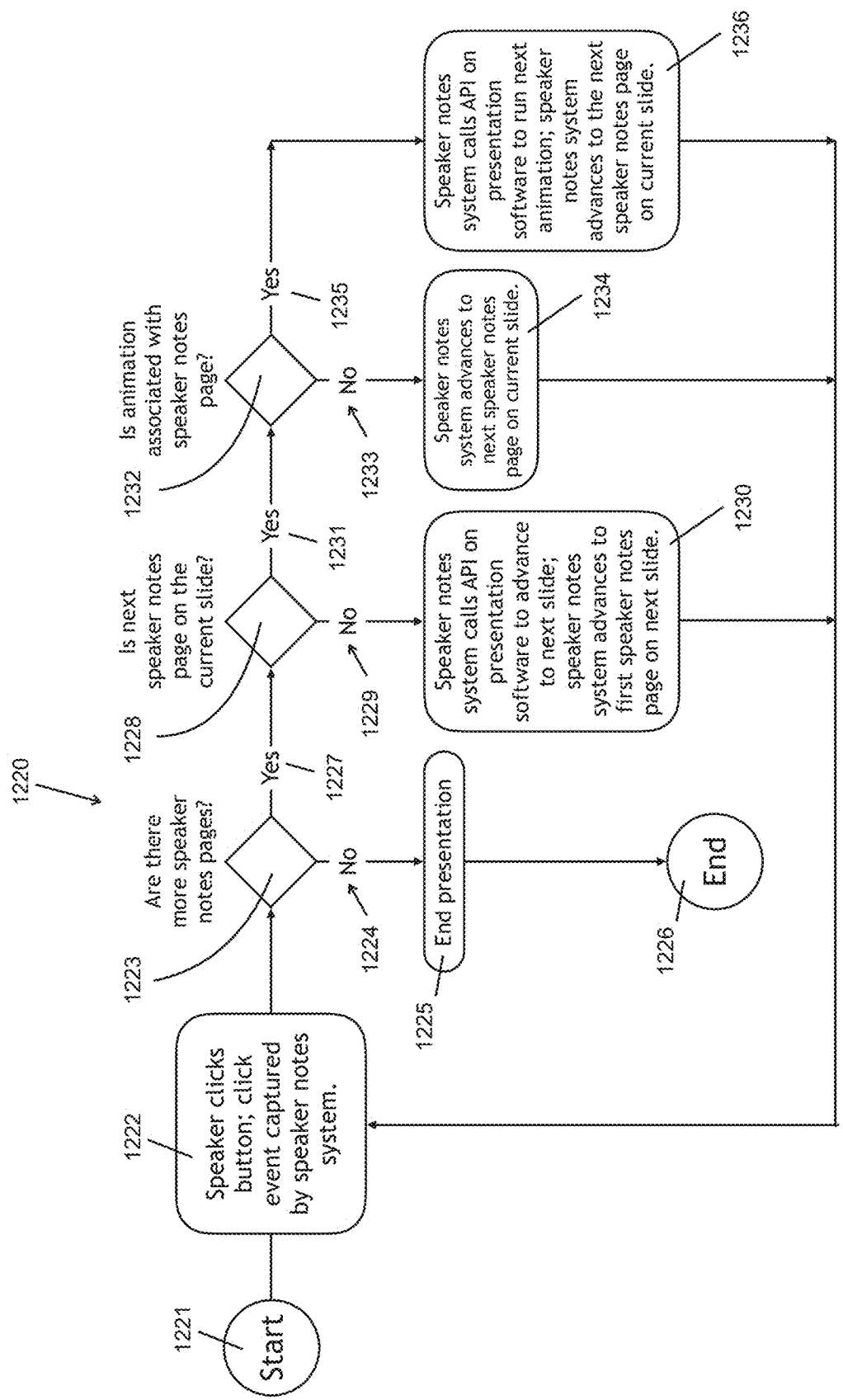
FIG. 12B is a flow chart diagram showing the interaction, control and processing of a portion of a system and method for relating to presenting speaker notes pages, and providing advancing of speaker notes pages relative to corresponding slides, animations, and/or builds, responsive to multiple speaker clicks, in accordance with one or more aspects of an embodiment of the present invention.

Referring now to FIG. 12B, there is provided a flow chart diagram showing the interaction, control and processing of a portion of a system and method 1220 for creating, editing, saving and displaying to an audience and a speaker, and providing advancing of speaker notes pages relative to corresponding slides, animations, and/or builds responsive to multiple speaker note clicks in accordance with one or more aspects of an embodiment of the present invention.

The portion of the system and method 1220 starts initially as shown at 1221. Starting, or restarting, this portion of the system and method 1220 begins when a speaker clicks a remote forward advance button, such as may be found on a remote 29 shown in FIG. 3, or as may be accomplished with a mouse button click or press. Thus, the speaker either directly controls advancement, or signals to an off-stage assistant to advance, to a next speaker note, as indicated by 1222. After an advance button is pressed by a speaker, the portion of the system and method 1220 determines whether there are more speaker notes pages, or perhaps better said, another speaker notes page, as shown at decision diamond 1223. If not, as shown at 1224, then the presentation is ended as shown at 1225 and by 1226. Thus, it can be seen that the system of the present invention is speaker notes pages oriented. In other words, at the heart of the portion of the system and method shown in FIG. 12B, is the per-click command and control protocol 1200 as shown in FIG. 12A for managing and controlling display of slides and/or animations or builds determined relative to association with the availability of another particular speaker notes page. And while those skilled in the art may conceive another means of determining advancement (or reversal) of slides, the dividing of speaker notes into pages, or otherwise a plurality of discreet chunks of speaker notes, each advanceable (or reversable) with a click, such would not avoid the spirit of the invention as claimed herein.

If, responsive to the determination of whether there are more speaker notes pages made at decision diamond 1223, the system determines that yes there is another speaker notes page, as shown at 1227, the portion of the system and method 1220 further determines, as shown at decision diamond 1228, whether the next speaker notes page is on, or associated with, the current slide. If not, as shown at 1229, the speaker notes system calls the API on the presentation software to advance to the next slide of the presentation, whereas the speaker notes system advances to the first note on the next slide of the presentation, as shown at 1230, and the system waits for a next click by the speaker at 1222.

If, however, responsive to decision diamond 1228, the portion of the system 1220 determines that, yes, the next speaker notes page is on, or associated with, the current slide, as shown at 1231, the portion of the system and method 1220 next determines at decision diamond 1232 whether an animation, or build, is associated with the next speaker notes page. If not, as shown at 1233, then the speaker notes system advances to the next speaker notes page on the current slide as shown at 1234, and the portion of the system and method 1220 waits for another click by the presenter at 1222.

If, however, responsive to decision diamond 1232, the portion of the system and method 1220 determines that, yes, there is an animation/build associated with the next speaker notes page, as shown at 1235, the speaker notes system calls the API on the presentation software to execute the next animation/build, and the speaker notes system advances to the next speaker notes page on the current slide, as shown at 1236, and the portion of the system and method 1220 waits for a next click by a speaker as shown at 1222.

Figure 12C:
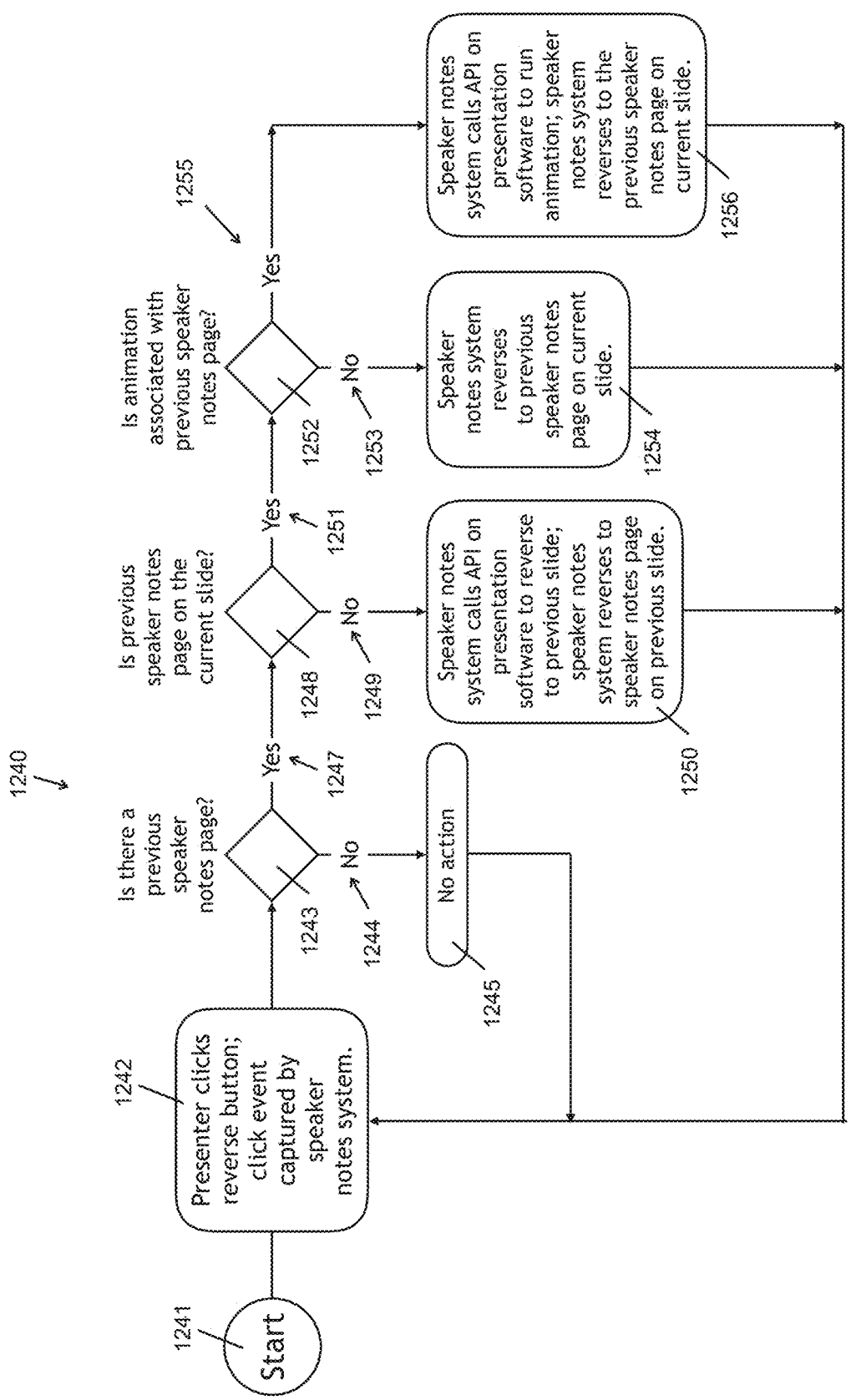
FIG. 12C is a flow chart diagram showing the interaction, control and processing of a portion of a system and method relating to presenting speaker notes pages, and providing reversing of, or recessing of, speaker notes pages relative to corresponding slides, animations, and/or builds, responsive to multiple speaker clicks in accordance with one or more aspects of an embodiment of the present invention.

Referring now to FIG. 12C, there is provided a flow chart diagram showing the interaction, control and processing of a portion of the system and method 1240 for creating, editing, saving, formatting, and displaying to an audience and a speaker, and further providing for reversing of, or recessing of, speaker notes pages relative to corresponding slides, animations, and/or builds, responsive to multiple speaker reverse clicks in accordance with one or more aspects of an embodiment of the present invention.

The portion of the system and method 1240 starts initially as shown at 1241. Starting, or restarting, this portion of the system and method 1240, begins when a speaker clicks a remote reverse button, such as may be found on a remote 29 shown in FIG. 3, or as may be accomplished with a mouse button click or press. Thus, the speaker either directly controls reversal, or signals to an off-stage assistant to reverse, to a previous speaker notes page, as indicated by 1242. After a reverse button is pressed by a speaker, the portion of the system and method 1240 determines whether there is a previous speaker notes page, as shown at decision diamond 1243. If not, as shown at 1244, then no action is taken as shown at 1245, and the portion of the system and method 1240 waits for a next reverse click (whereas the portion of the system and method 1220 waits for a forward click, thus implicating the portion of the system and method 1220 shown in FIG. 12B) by a speaker.

If, responsive to the determination of whether there are previous speaker notes pages made at decision diamond 1243, the system determines that yes there is another previous speaker notes page as shown at 1247, the portion of the system and method 1240 further determines as shown at decision diamond 1248, whether the previous speaker notes page is on, or associated with, the current slide. If not, as shown at 1249, the speaker notes system calls the API on the presentation software to reverse to the previous slide of the presentation, and the speaker notes system reverses to the last speaker notes page on the previous slide as shown at 1250.

If, responsive to decision diamond 1248, the portion of the system and method 1240 determines that, yes, the previous speaker notes page is on, or associated with, the current slide, as shown at 1251, the portion of the system and method 1240 next determines at decision diamond 1252 whether an animation, or build, is associated with the previous speaker notes page. If not as shown at 1253, then the speaker notes system reverses to the previous speaker notes page on the current slide as shown at 1254, and the portion of the system 1240 waits for another click by the presenter at 1242.

If, however, responsive to decision diamond 1252, the portion of the system 1240 determines that yes, there is an animation/build associated with the previous speaker notes page, as shown at 1255, the speaker notes system calls the API on the presentation software to execute the next animation/build, and the speaker notes system reverses to the previous speaker notes page on the current slide, as shown at 1256, and the portion of the system and method 1240 waits for a next click by speaker as shown at 1242.

Figure 13A:
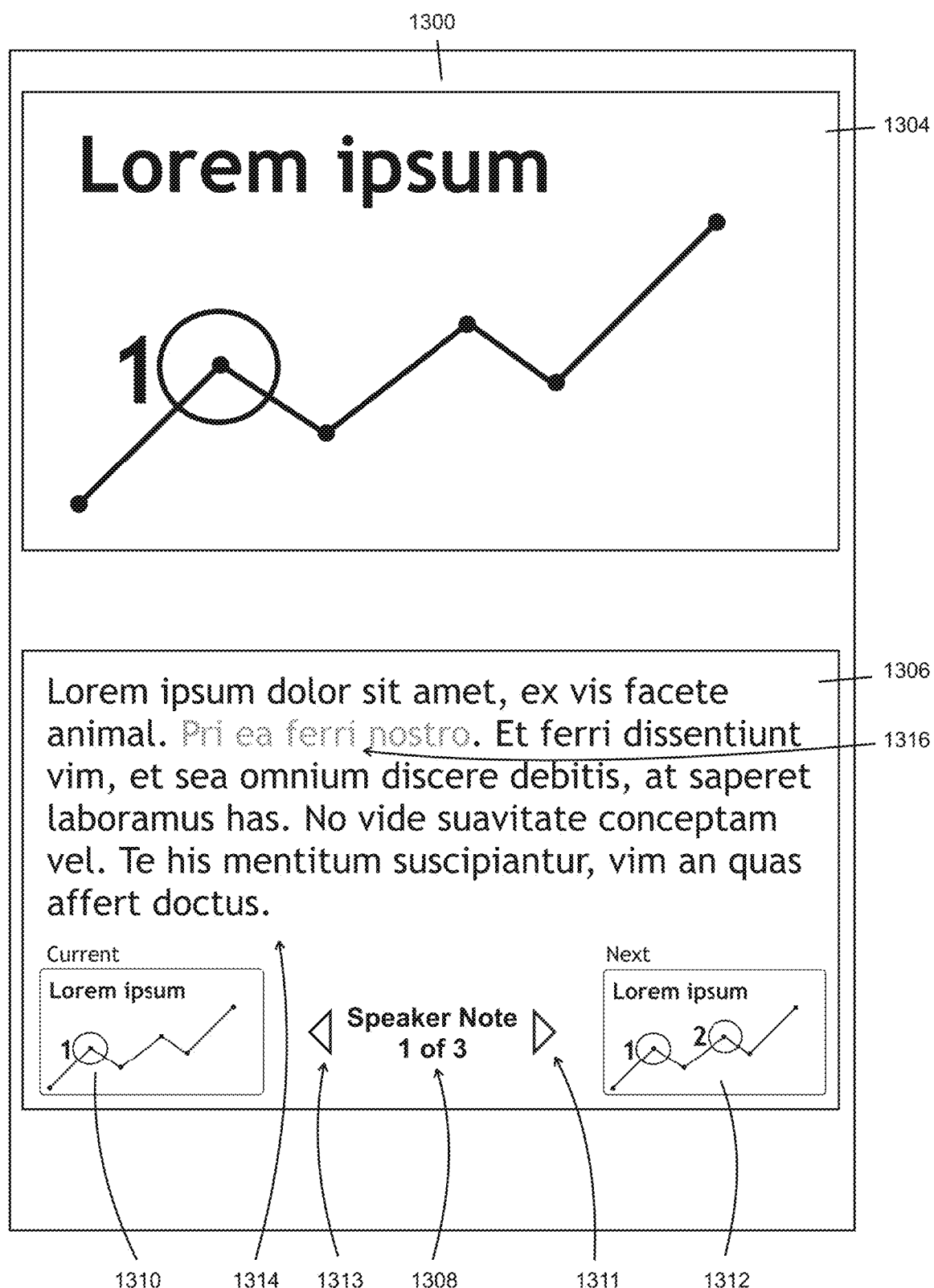
FIGS. 13A and B are illustrations of sample printouts of slides and speaker notes pages showing various types of speaker notes pages text editing, display, and preview capabilities of the system and method for slides and speaker notes pages creation, editing, formatting, display, and printing, in accordance with one or more aspects of the invention.

Referring to FIGS. 13A and B, there is shown an illustration of a sample printout of slides and associated speaker notes pages showing various types of speaker notes pages text editing and display capabilities of a portion of the system and method for slides and speaker notes creating, editing, saving, formatting, previewing, displaying, and printing, in accordance with one or more aspects of the invention.

Thus, there is shown a first printout page 1300 and a second printout page 1302 in FIGS. 13A and B. Printout page 1300 shows on an upper half of the page a slide 1304 comprising substantively an example graph with a first inflection point circled and labeled "1". Below the printout of slide 1304, there is shown a printout of a speaker notes monitor view 1306 as it relates to a first speaker notes page 1314. At the bottom of the first printed speaker notes page monitor view 1306, showing, among other things, a page of pages indicator 1308, designated "Speaker Note 1 of 3", meaning "Speaker Notes Page 1 of 3 total speaker notes pages for this slide." Thus, it will be appreciated that the total speaker notes pages count preferably includes speaker notes pages for a given slide, irrespective of animations or builds for that slide. Further, it will be appreciated that the system and method in accordance with one or more aspects of the invention preferably processes a preconfigured list of records, or commands, that instruct to advance a slide, run an animation, and/or advance a speaker notes page, and these could conceivably be presented to the system as any combination of these, or order where possible, without departing from the true scope and spirit of the invention as claimed. And thus, for example, when advancing a slide, the advancement of a discreet speaker notes page is also likely, though not absolutely necessary, as for example in the case where the speaker has chosen to not include any speaker notes with that slide.

Figure 13B:
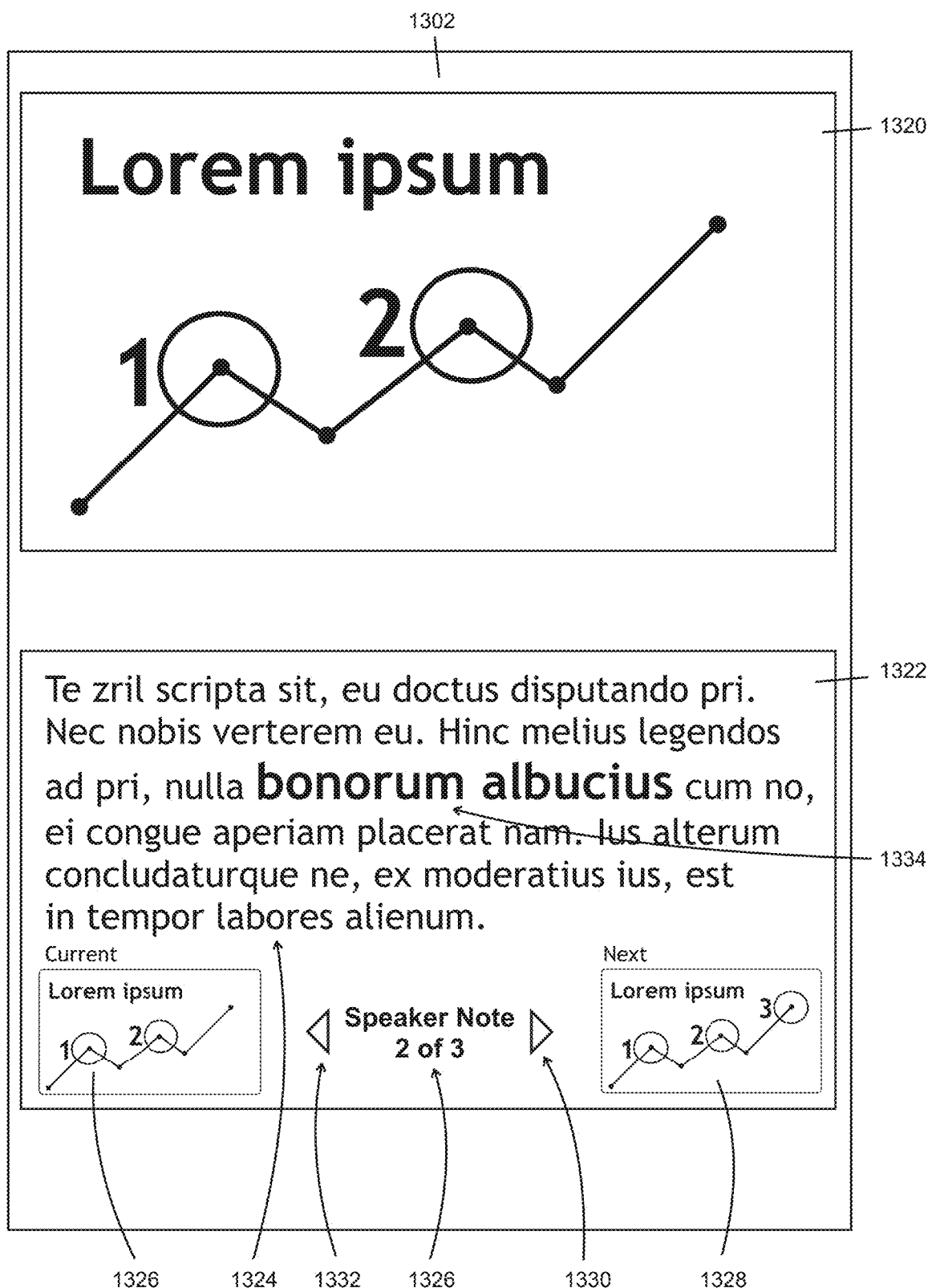

Further, at the bottom of the first printed speaker notes page monitor view 1306, there is shown the current slide reminder 1310, and a next slide reminder 1312. Current slide reminder 1310, of course, shows a thumbnail of the current slide 1304 shown above on the printed page 1300. Next slide reminder 1312 shows a thumbnail of the next slide (slide 1320 printed on printout page 1302 of FIG. 13B). Still further, at the bottom of the speaker notes page monitor view 1306, there are shown printed advance and reverse arrows, 1311, 1313, respectively, which serve to further disclose that the these arrows, or buttons, in the actual speaker notes page monitor view (not the hardcopy paper printout version as shown in FIG. 13A or B), are available for advancing to a next speaker notes page, or reversing to a previous speaker notes page, as described previously in connection with FIGS. 11A-C and 12A-C.

Similarly, page printout 1302 comprises slide 1320 on an upper half of the page comprising substantively the example graph shown on slide 1304, but with an additional build/animation comprising a second additional inflection point circled and labeled "2". Below the printout of slide 1320, there is shown a printout of a speaker notes page monitor view 1322, as it relates to a second speaker notes page 1324. At the bottom of the second printed speaker notes page monitor view 1322, there is a page of pages designation 1326, designated "Speaker Note 2 of 3", meaning "Speaker Note Page 2 of 3 total speaker notes pages for this slide." Further, at the bottom of the second printed speaker notes page monitor view 1322, there is shown the current slide reminder 1326, and the next slide reminder 1328. Current slide reminder 1326, of course, shows a thumbnail of the current slide 1320 shown above on the printed page 1302. Next slide reminder 1328 shows a thumbnail of the next slide, wherein as shown on the next slide reminder, a third labeled inflection point with a circled "3" is included, for example, to indicate another animation/build coming up in the presentation. Still further, at the bottom of the speaker notes page monitor view 1322, there are shown printed advance and reverse arrows 1330, 1332, respectively, which serve to further disclose that these arrows, or buttons, in the actual speaker notes page monitor view (not the hardcopy paper printout version as shown in FIGS. 13A and B), are available for advancing to a next speaker notes page, or reversing to a previous speaker notes page as described previously in connection with FIGS. 11A-C and 12A-C.

As shown on the printout pages 1300 and 1302, the speaker notes page monitor views 1306, 1322, respectively, are considered speaker-notes-page-centric, since the speaker notes pages 1314, and 1324, are in relatively large type, and they are centrally located in their respective speaker notes page monitor views.

As may be seen on the speaker notes page 1314, the text of the speaker note "Pri ea ferri nostro" at 1316 is shown printed in a different font color (indicated by the lighter gray text). Further, as may be seen on the speaker notes page 1324, the text of the speaker note "bonorum albucious" at 1334 is printed with a larger type-font of text, and is also bolded (indicated by the larger and darker black text). In this way, the slides and speaker notes creation, editing, saving, formatting, and display system and method allows for what-you-see-is-what-you-get (WYSIWYG) type preview of editing and formatting which is often very helpful for speakers to stay in sync with their slides and speaker notes. This, in turn, leads to better presentations.

Figure 14A:
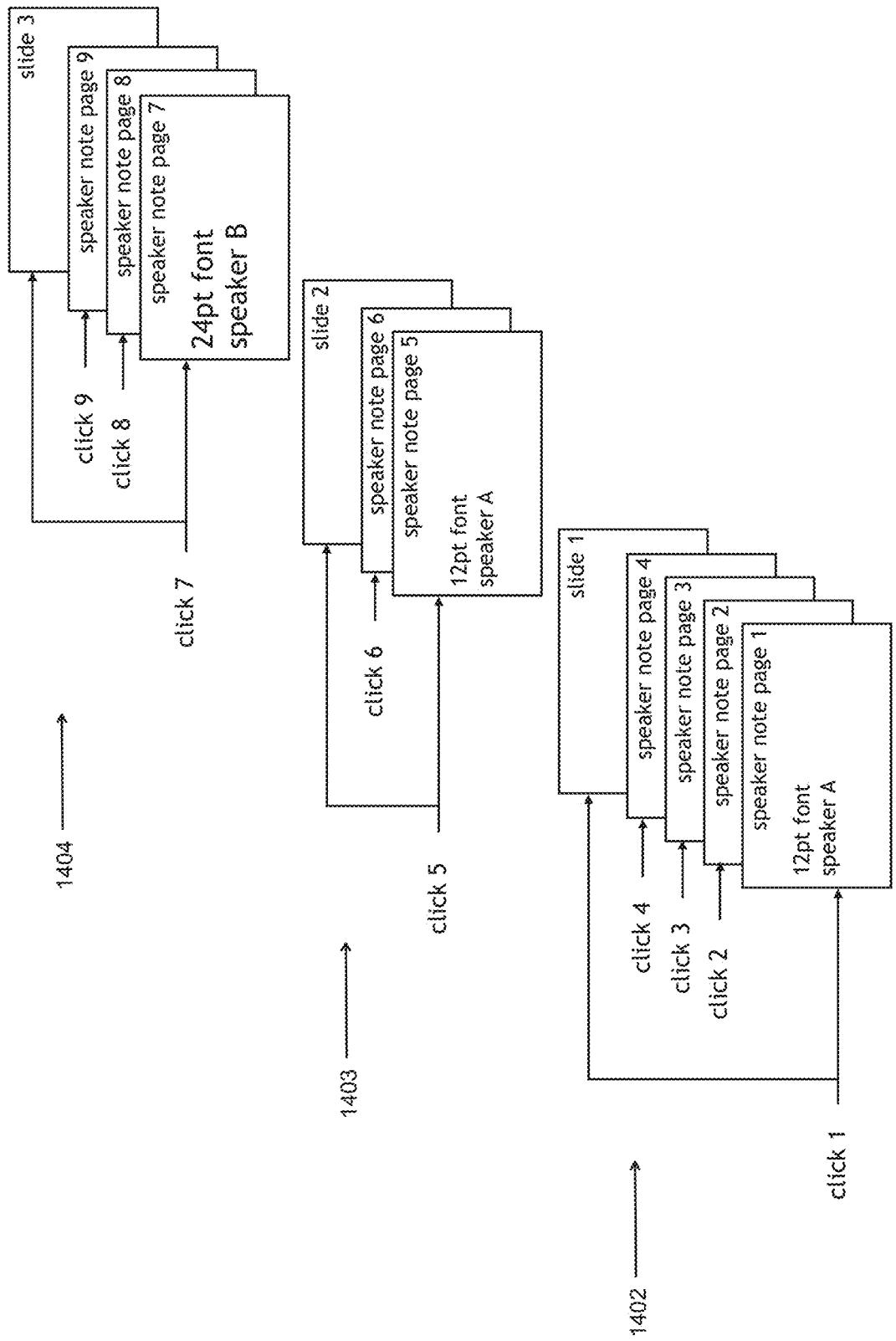
FIG. 14A is an illustrative diagram showing association between various-sized font speaker notes pages and slides, suitable for use by a plurality of different speakers having differing eyesight capabilities for seeing smaller-sized speaker notes and having different speaker notes preferences, together with speaker clicks/button presses as associated with advancement to a next speaker notes page and/or slide in accordance with one or more aspects of the present invention.
Figure 14B:
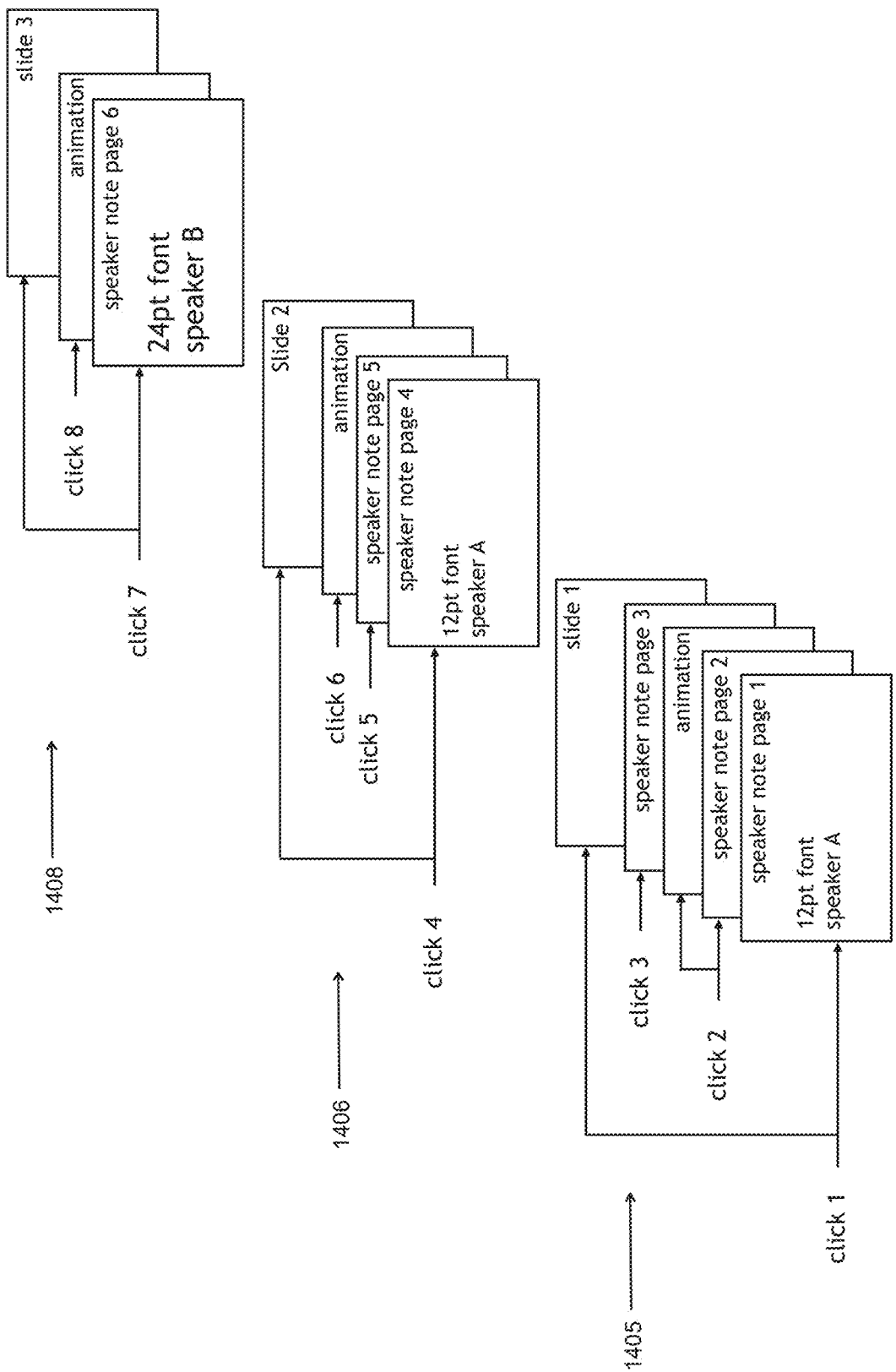
FIG. 14B is an illustrative diagram showing association between various-sized font speaker notes pages, slides, and animations/builds, suitable for use by a plurality of different speakers having differing eyesight capabilities for seeing smaller-sized speaker notes and having different preferences, together with speaker clicks/button presses as associated with advancement to a next speaker notes page, slide, and/or animation/build in accordance with one or more aspects of the present invention.

FIG. 14A is an illustrative diagram showing that the slides and speaker notes creation, editing, saving, formatting and display system and method uses a certain data structure wherein remote clicks (clicks 1-9), mouse clicks initiate certain actions as indicated by associated leader lines and arrows. Thus, as shown at grouping 1402 for a first slide, slide 1, it may be seen that click 1 advances and displays a 12-point font type first speaker notes page, note 1 (speaker note 1 of 4), together with a first slide, labeled slide 1, for speaker A. Thereafter, click 2 advances for display to the speaker the second speaker notes page, speaker note 2 of 4 for slide 1. Similarly, thereafter, click 3 advances for display to the speaker the third speaker notes page, speaker note 3 of 4. And again, thereafter, click 4 advances for display to the speaker the fourth speaker notes page, speaker note 4 of 4. All the while, while advancing to notes pages 1, 2, 3, and 4, slide one remains visibly displayed for an audience.

Next, as may be seen at a second grouping 1403 for a second slide, labeled slide 2, click 5 displays both for the speaker a 12-point font type speaker note page 5, which is speaker note page 1 of 2 for slide 2 for speaker A, together with slide 2 being displayed to the audience. Thereafter, click 6 is shown as displaying speaker notes page 6, (speaker notes page 2 of 2 for the current slide).

Still further, as shown at grouping 1404 for a third slide, labeled slide 3, it may be seen that click 7 advances and displays a larger, 24-point font type, speaker note page 7, otherwise known as speaker note page 1 of 3 for slide 3, for speaker B. This larger type speaker notes font may assist speaker B in more easily seeing the speaker's notes in order to be able to give a more effective and smooth presentation. Click 8 is shown as advancing the speaker notes page to speaker notes page 8 (or speaker notes page 2 of 3 for slide 3), and click 9 is shown as advancing the speaker notes page to speaker notes page 9 (or speaker notes page 3 of 3 for slide 3).

In this way, as shown in FIG. 14A, there is made a demonstration of various-sized fonts in speaker notes pages for slides, suitable for use by a plurality of different speakers having differing eyesight capabilities for seeing smaller-sized speaker notes, and perhaps having different speaker notes formatting preferences. And further, FIG. 14A helps in understanding a preferred data structure and program action for the system and method of a part of the invention, showing how these relate together with speaker clicks/button presses for advancement to a next speaker note and/or slide in accordance with one or more aspects of the present invention.

Referring now to FIG. 14B, similarly there is shown an illustrative diagram showing various-sized fonts for speaker notes pages and how they are associated with, slides and animations/builds, so as to be suitable for use by a plurality of different speakers having differing eyesight capabilities for seeing smaller-sized speaker notes and having different preferences. As can be seen with FIG. 14B, the speaker notes pages are advanced together with the associated speaker clicks/button presses slide, and/or animation/build, in accordance with one or more aspects of the present invention.

Thus, as shown at grouping 1405, a first click, labeled click 1, displays to a speaker A, a 12-point font type, first page of speaker notes, together with displaying to an audience the first slide, labeled slide 1. Then, upon receiving a second click, click 2, the system displays a second speaker notes page associated with slide 1, but also associated with a particular animation, or build, associated with slide 1.

Then, click 3 advances the speaker notes page to speaker notes page 3 (of 3) for display to the speaker and for slide 1 of the presentation which is displayed to the audience. Thus, in other words, speaker A has 3 speaker notes pages and 1 animation demonstrated to the speaker, whereas slide 1, is later joined by the animation, in being displayed to the audience—that is, the animation is displayed to the audience when speaker notes page 2 is displayed to the speaker.

Referring to grouping 1406 of exemplary representative actions and datasets shown in FIG. 14B, it can be seen that click 4 displays a 12-pt font type speaker notes page 4 to the speaker (speaker notes page 1 of 2 for slide 2), for Speaker A, and slide 2 of the presentation is presented to the audience. Then, click 5 displays a 12-point speaker notes page 5 (speaker notes page 2 of 2 for slide 2) to Speaker A, while leaving slide 2 on the display for the audience. Then, click 6 displays animation 2.1 for slide 2 to the audience, while leaving speaker notes page 5 on a speaker notes pages monitor for the speaker (Speaker A).

As shown at grouping 1408, click 7 then launches for display to the audience a third slide, together with a sixth speaker notes page displayed to a new speaker (Speaker B). Click 8 then executes an animation for the audience, and though the speaker notes page 6 remains on the speaker notes pages monitor, the current slide and next slide reminders are updated on the speaker notes monitor in order to help Speaker B to stay in sync with the overall presentation.

Thus, it will be appreciated that animations and builds may be freely associated with different slides and speaker notes pages, and a click by a speaker will always advance at least one of a slide, an animation, and/or a speaker notes page, while each click will also update (if necessary) the current slide and next slide reminders, and the page of pages designation will also be updated where appropriate.

Thus, it may be appreciated that a certain click may simply advance the speaker notes page of pages designation, for example where the same page of speaker notes is associated with more than one slide, or a slide and animation where a speaker notes page is designated intentionally as to be omitted. Those skilled in programming will appreciate how best to advance relevant program parameters in order to accomplish this result without departing from the broader aspects of the invention as claimed. In this way, the slides and speaker notes creating, editing, saving, formatting, previewing, and displaying system and method in accordance with one or more aspects of the invention will automatically keep the speaker notes in sync with the slides and any animations. Still further, speakers will be relieved of having to scroll through longer speaker notes as at present (especially when the size of the speaker notes is increased to allow readability of the notes by the speaker during the presentation) and while trying to speak to the audience.

Referring now to FIG. 15, there is shown a block diagram illustration showing architecture and features for a plug-in-type embodiment of the invention as will be programmable and able to be coded by those skilled in the art to achieve the benefits and features of the invention in an extension-type architecture. Thus, with this embodiment of the invention, there is provided a speaker notes plug-in-type extension system 1500, as may be implemented a plug-in extension for use in connection with a prior art slide and speaker notes creation and presentation system 1506. In the plug-in-type extension system 1500, there are two primary subsystems, the speaker notes creation and editing subsystem 1502, and the speaker notes pages presentation subsystem 1504. The speaker notes creation and editing subsystem 1502 allows input 1503 to, and receives output 1505 from, the prior-art slides and speaker notes creation and presentation system 1506. System 1506 is comprised generally of a slides creation and edit subsystem 1508, a speaker notes creation and edit subsystem 1510, a slides presentation system 1512, and a speaker notes presentation subsystem 1514.

Data transfer 1516 from the enhanced/combined slides and speaker notes pages creation, editing, formatting and display systems 1500/1506 yields an output shown at 1518 comprising the following benefits and features: click-accessible speaker notes pages (forward and reverse) associated with slides and animations/builds as described herein, variable/varied SNP font sizes for SNPs, or portions of SNPs, enabling use and effective presentation by speakers having varying eyesight capabilities and preferences, variable/varied SNP font colors enabling easier detection by co-speaker speakers whose slide is being displayed to the audience and thus who is to be speaking, and variable/varied SNP backgrounds, whether colored, black (with white text), or white (with black text). Other preferred features include an edit mode WYSIWYG-type speaker notes pages preview capability, and speaker notes pages toggling on/off for any given slide.

As shown at 1520, an alternate output capability is referenced, wherein the system 1500 is also capable of directly printing and previewing for the speaker what the speaker's notes pages would look like in their showmode display.

Referring now to FIG. 16, there is shown a block diagram illustration showing architecture and features for an alternate integrated program 1600 embodiment of the invention as will be programmable and able to be coded by those skilled in the art to achieve the benefits and features of the invention with such an integrated architecture. Thus, with this embodiment of the invention, there is provided an integrated slide and speaker notes pages creation and presentation system 1600. The system 1600 comprises three primary subsystems 1602, 1604, 1606, each extended with enhanced SNP creation and edit features.

The first primary subsystem 1602 comprises a slide and SNP creation and edit subsystem is extended and enhanced with SNP creation and edit features, such as Variable/Varied SNP font sizes, variable/varied SNP font colors, variable/varied SNP backgrounds, and preview mode for slides and SNPs in an edit subsystem.

The second primary subsystem 1604 of the integrated system 1600 comprises a slide and SNP presentation subsystem extended with enhanced SNP-centric features, such as click-accessible advance/reverse discreet SNPs associated with slides and/or animations/builds, toggle on/off of SNPs features, SNP page of pages (per slide) indicators, and a SNP-centric display on a speaker notes pages monitor (and for printed speaker notes pages) combined with current slide/next slide data.

The third primary subsystem 1606 of the integrated system 1600 comprises an improved slides and SNP presentation configuration capability. Such configuration includes the ability to change in a WYSIWYG preview fashion the various features of a data screen presented to a speaker on a speaker notes monitor, such as custom re-sizing and positioning/re-positioning of the speaker notes centric view pane, custom re-sizing and positioning/re-positioning of current slide and next slide reminders, custom re-sizing and positioning/re-positioning of the advance and reverse arrows, and custom re-sizing and positioning/re-positioning of page of pages data regarding each speaker notes page.

The integrated system 1600 also includes an improved integrated presentation output capability 1608 comprising enhanced integrated presentation output capability over prior art systems, including click-accessible SNP's together with SNP page of pages data and current slide/next slide reminders, variable/varied SNP font sizes, variable/varied SNP font colors, and variable/varied SNP background characteristics.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A plug-in-type computer-enabled system comprising a processor and memory for enabling of creating, editing, saving, and displaying of speaker notes pages for use by speakers during a presentation mode, further comprising:
   a speaker notes pages creation and editing subsystem enabling creating, editing and saving of speaker notes text that is automatically broken into a plurality of discreet speaker notes pages by said speaker notes pages creation and editing subsystem, wherein each discreet speaker notes page is associated with a slide for a presentation file; and
   a speaker notes pages presentation subsystem functioning together with said speaker notes creation and editing subsystem to provide controlled sequential advancement and recession of the presentation, wherein each advancement of the presentation to a corresponding slide having having a plurality of discreet speaker notes pages associated with the corresponding slide automatically presents a first discreet speaker notes page associated with the corresponding slide for view by the speaker on a display together with the corresponding slide to help keep the plurality of discreet speaker notes pages automatically in sync with the presentation.

2. The plug-in-type computer-enabled system of claim 1, wherein said speaker notes pages creation and editing subsystem creates, edits, and saves a portion of speaker notes text having a specified different font size than other speaker notes text.

3. The plug-in-type computer-enabled system claim 2, wherein said speaker notes presentation subsystem presents speaker notes text having varied font-sizes to enable a plurality of different speakers having differing eyesight capabilities to more easily use discreet speaker notes pages during a presentation.

4. The plug-in-type computer-enabled system of claim 2, further comprising as part of the speaker notes pages creation and editing subsystem, and further comprising as part of the speaker notes pages presentation subsystem, the creation, editing, and presentation of at least a portion of the speaker notes pages to have at least one of varied font color and varied speaker notes page background characteristics edit.

5. The plug-in-type computer-enabled system of claim 4, wherein each discreet speaker notes page is presented to any of a plurality of speakers together with the corresponding slide and together with one of a speaker notes text portion having varied font size, a speaker notes text portion having varied font color, and a speaker notes text portion having varied background edits, to enable a plurality of different speakers having differing eyesight capabilities and speaker notes preferences to easily use the speaker notes pages during a presentation.

6. The plug-in-type computer-enabled system of claim 1, wherein said speaker notes pages presentation subsystem further shows to a speaker on a display representations of a current audience on-screen graphic and a next audience on-screen graphic together with a speaker notes page.

7. The plug-in-type computer-enabled system of claim 6, wherein said speaker notes pages presentation subsystem further presents to a speaker on a display summary current speaker notes page number and of total number of speaker notes pages per slide information.

8. The plug-in-type computer-enabled system of claim 1, wherein said speaker notes pages creation and editing subsystem further enables optional association of each discreet speaker notes page with one of an animation and a build, and wherein upon advancement of the presentation said speaker notes pages presentation subsystem further enables presentation of a discreet speaker notes page for view by the speaker on a display together with one of an animation and a build.

9. The plug-in-type computer-enabled system of claim 1, wherein each speaker notes page is associated with a slide, wherein any slide may be associated with a plurality of speaker notes pages.

10. The plug-in-type computer-enabled system of claim 1, wherein each discreet speaker notes page is associated with a corresponding slide and shown to a speaker on a display with the corresponding slide, wherein any slide of the presentation may be associated with and shown to a speaker on a display with any of a plurality of corresponding discreet speaker notes pages, wherein each discreet speaker notes page is associated with and shown to a speaker on a display with one of an animation and a build, and wherein any animation and any build is associated with and shown to a speaker on a display with any of a corresponding plurality of discreet speaker notes pages.

11. The plug-in-type computer-enabled system of claim 1, wherein the speaker notes pages creation and editing subsystem further comprises a preview mode for displaying of speaker notes pages and slides as they would be shown during a presentation.

12. An integrated computer-enabled slides and speaker notes pages creation and presentation system comprising a processor and memory for enabling of creating, editing, and saving a combined speaker notes pages and slides presentation file, and for displaying of slides and speaker notes pages, adaptable for use by speakers, further comprising:
   a slides creation and editing subsystem for enabling creating, editing and saving of one or more slides of the presentation file for conveying messages to an audience;
   a speaker notes pages creation and editing subsystem for enabling creating, editing and saving of speaker notes text that is automatically broken into a plurality of discreet speaker notes pages by said speaker notes pages creation and editing subsystem, wherein each discreet speaker note page is associated with a slide in a presentation file;
   a slides and speaker notes pages presentation subsystem, for controlled sequential advancement and recession of the presentation, wherein each advancement of the presentation to a corresponding slide having having a plurality of discreet speaker notes pages associated with the corresponding slide automatically presents a first discreet speaker notes page associated with the corresponding slide for view by the speaker on a display together with the corresponding slide to help keep the plurality of discreet speaker notes pages automatically in sync with the presentation.

13. The integrated computer-enabled system of claim 12, wherein said speaker notes pages creation and editing subsystem further creates, edits, and saves a portion of speaker notes text having a specified different font size than other speaker notes text.

14. The integrated computer-enabled system of claim 13, further comprising as part of said speaker notes pages creation and editing subsystem, the creation, editing, and presentation of at least a portion of the speaker notes text to have at least one of varied font size, varied font color, and varied speaker notes page background characteristics, and wherein each discreet speaker notes page is presented to any of a plurality of speakers automatically together with the corresponding slide and together with a speaker notes portion having one of varied font size, font color, and varied background edits, to enable a plurality of different speakers having differing eyesight capabilities and speaker notes preferences to easily use the speaker notes pages during a presentation.

15. The integrated computer-enabled system of claim 13, wherein each discreet speaker notes page is associated with a corresponding slide and displays to a speaker on a display with the corresponding slide, wherein any slide of the presentation may be associated with and displayed for a speaker with any of a plurality of corresponding discreet speaker notes pages, wherein each discreet speaker notes page is associated with and displayed to a speaker with one of an animation and a build, and wherein any animation and any build is associated with and displayed for a speaker with any of a corresponding plurality of discreet speaker notes pages.

16. The integrated computer-enabled system of claim 12, wherein said slides and speaker notes pages presentation subsystem shows to a speaker on a display representations of a current audience on-screen graphic and a next audience on-screen graphic, together with a speaker notes page, and wherein said slides and speaker notes pages presentation subsystem presents summary current speaker notes page number and of total number of speaker notes pages per slide information.

17. The integrated computer-enabled system of claim 12, wherein said speaker notes pages creation and editing subsystem further enables optional association of each discreet speaker notes page with one of an animation and a build, and wherein upon advancement of the presentation said slides and speaker notes pages presentation subsystem further enables presentation of a discreet speaker notes page for view by the speaker on a display together with one of an animation and a build.

18. The integrated computer-enabled system of claim 12, wherein the speaker notes pages creation and editing subsystem further comprises a preview mode for displaying of speaker notes pages and slides as they would be shown during use of the prior-art speaker notes and slides presentation system.

* * * * *